| 
US008862487B2

(12) United States Patent
Stephens et al.

(10) Patent No.: US 8,862,487 B2
(45) Date of Patent: *Oct. 14, 2014

(54) METHOD AND SYSTEM FOR PROVIDING AND ADMINISTERING ONLINE RENTAL VEHICLE RESERVATION BOOKING SERVICES

(71) Applicant: The Crawford Group, Inc., St. Louis, MO (US)

(72) Inventors: Scott Paul Stephens, St. Louis, MO (US); Paul C. Tucker, Ballwin, MO (US); Kelli J. Boruff, St. Charles, MO (US); Colleen M. Zurliene, Maplewood, MO (US)

(73) Assignee: The Crawford Group, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/621,608

(22) Filed: Sep. 17, 2012

(65) Prior Publication Data

US 2013/0018680 A1    Jan. 17, 2013

Related U.S. Application Data

(62) Division of application No. 11/377,811, filed on Mar. 16, 2006, now Pat. No. 8,271,309.

(51) Int. Cl.
*G06Q 10/00* (2012.01)
*G06Q 50/00* (2012.01)
*G06Q 10/02* (2012.01)
*G06Q 30/06* (2012.01)

(52) U.S. Cl.
CPC ............ *G06Q 30/0645* (2013.01); *G06Q 10/02* (2013.01)

USPC ............................................... 705/5; 705/27.1

(58) Field of Classification Search
USPC .................................................. 705/5–6, 27.1
See application file for complete search history.

(56) References Cited

U.S. PATENT DOCUMENTS

| | | | |
|---|---|---|---|
| 3,665,397 | A | 5/1972 | Di Napoli et al. |
| 4,714,989 | A | 12/1987 | Billings |
| 4,757,267 | A | 7/1988 | Riskin |
| 4,774,663 | A | 9/1988 | Musmanno et al. |
| 4,788,643 | A | 11/1988 | Trippe et al. |

(Continued)

FOREIGN PATENT DOCUMENTS

| | | |
|---|---|---|
| JP | 2001344490 A | 12/2001 |
| JP | 2002074126 | 3/2002 |

(Continued)

OTHER PUBLICATIONS

Prosecution History for U.S. Appl. No. 11/377,811, now USPN 8271309 filed Mar. 16, 2006.

(Continued)

*Primary Examiner* — Daniel Vetter
(74) *Attorney, Agent, or Firm* — Thompson Coburn LLP

(57) ABSTRACT

A system and method is disclosed herein for customizing pages of a rental vehicle reservation booking website with deep-links for specialized rental vehicle reservations. The specialized rental vehicle reservations may comprise reservations for a division of a customer entity and/or promotional offer reservations. Multi-division and multi-offer pages can also be defined for the website through an administrative tool.

20 Claims, 58 Drawing Sheets

(56) References Cited

U.S. PATENT DOCUMENTS

| | | |
|---|---|---|
| 4,797,818 A | 1/1989 | Cotter |
| 4,799,156 A | 1/1989 | Shavit et al. |
| 4,831,526 A | 5/1989 | Luchs et al. |
| 4,858,121 A | 8/1989 | Barber et al. |
| 4,891,785 A | 1/1990 | Donohoo |
| 4,897,867 A | 1/1990 | Foster et al. |
| 4,916,611 A | 4/1990 | Doyle, Jr. et al. |
| 4,951,196 A | 8/1990 | Jackson |
| 4,965,821 A | 10/1990 | Bishop et al. |
| 4,984,155 A | 1/1991 | Geier et al. |
| 5,063,506 A | 11/1991 | Brockwell et al. |
| 5,066,853 A | 11/1991 | Brisson et al. |
| 5,210,687 A | 5/1993 | Wolfberg et al. |
| 5,216,592 A | 6/1993 | Mann et al. |
| 5,218,697 A | 6/1993 | Chung |
| 5,224,034 A | 6/1993 | Katz et al. |
| 5,237,499 A | 8/1993 | Garback |
| 5,253,165 A | 10/1993 | Leiseca et al. |
| 5,253,166 A | 10/1993 | Dettelbach et al. |
| 5,270,922 A | 12/1993 | Higgins |
| 5,289,369 A | 2/1994 | Hirshberg |
| 5,309,355 A | 5/1994 | Lockwood |
| 5,311,425 A | 5/1994 | Inada et al. |
| 5,319,542 A | 6/1994 | King, Jr. et al. |
| 5,355,474 A | 10/1994 | Thuraisngham et al. |
| 5,361,199 A | 11/1994 | Shoquist et al. |
| 5,369,570 A | 11/1994 | Parad |
| 5,375,207 A | 12/1994 | Blakely et al. |
| 5,389,773 A | 2/1995 | Coutts et al. |
| 5,390,314 A | 2/1995 | Swanson |
| 5,396,600 A | 3/1995 | Thompson et al. |
| 5,406,475 A | 4/1995 | Kouchi et al. |
| 5,422,809 A | 6/1995 | Griffin et al. |
| 5,432,904 A | 7/1995 | Wong |
| 5,465,206 A | 11/1995 | Hilt et al. |
| 5,471,615 A | 11/1995 | Amatsu et al. |
| 5,475,585 A | 12/1995 | Bush |
| 5,483,444 A | 1/1996 | Heintzeman et al. |
| 5,504,674 A | 4/1996 | Chen et al. |
| 5,506,897 A | 4/1996 | Moore et al. |
| 5,515,268 A | 5/1996 | Yoda et al. |
| 5,528,490 A | 6/1996 | Hill |
| 5,530,844 A | 6/1996 | Phillips et al. |
| 5,544,040 A | 8/1996 | Gerbaulet et al. |
| 5,544,320 A | 8/1996 | Konrad |
| 5,550,734 A | 8/1996 | Tarter et al. |
| 5,557,518 A | 9/1996 | Rosen |
| 5,559,707 A | 9/1996 | DeLorme et al. |
| 5,570,283 A | 10/1996 | Shoolery et al. |
| 5,581,461 A | 12/1996 | Coll et al. |
| 5,586,313 A | 12/1996 | Schnittker et al. |
| 5,588,048 A | 12/1996 | Neville |
| 5,592,375 A | 1/1997 | Salmon et al. |
| 5,592,378 A | 1/1997 | Cameron et al. |
| 5,640,505 A | 6/1997 | Hearn et al. |
| 5,644,721 A | 7/1997 | Chung et al. |
| 5,648,768 A | 7/1997 | Bouve |
| 5,664,207 A | 9/1997 | Crumpler et al. |
| 5,666,493 A | 9/1997 | Wojcik et al. |
| 5,682,525 A | 10/1997 | Bouve et al. |
| 5,694,551 A | 12/1997 | Doyle et al. |
| 5,696,901 A | 12/1997 | Konrad |
| 5,696,965 A | 12/1997 | Dedrick |
| 5,710,887 A | 1/1998 | Chelliah et al. |
| 5,710,889 A | 1/1998 | Clark et al. |
| 5,712,989 A | 1/1998 | Johnson et al. |
| 5,715,453 A | 2/1998 | Stewart |
| 5,721,832 A | 2/1998 | Westrope et al. |
| 5,721,913 A | 2/1998 | Ackroff et al. |
| 5,724,520 A | 3/1998 | Goheen |
| 5,726,885 A | 3/1998 | Klein et al. |
| 5,732,398 A | 3/1998 | Tagawa |
| 5,734,823 A | 3/1998 | Saigh et al. |
| 5,739,512 A | 4/1998 | Tognazzini |
| 5,754,772 A | 5/1998 | Leaf |
| 5,754,830 A | 5/1998 | Butts et al. |
| 5,757,925 A | 5/1998 | Faybishenko |
| 5,758,329 A | 5/1998 | Wojcik et al. |
| 5,758,341 A | 5/1998 | Voss |
| 5,764,981 A | 6/1998 | Brice et al. |
| 5,768,510 A | 6/1998 | Gish |
| 5,768,511 A | 6/1998 | Galvin et al. |
| 5,774,870 A | 6/1998 | Storey |
| 5,774,873 A | 6/1998 | Berent et al. |
| 5,778,178 A | 7/1998 | Arunachalam |
| 5,781,892 A | 7/1998 | Hunt et al. |
| 5,784,565 A | 7/1998 | Lewine |
| 5,793,966 A | 8/1998 | Amstein et al. |
| 5,794,207 A | 8/1998 | Walker et al. |
| 5,796,634 A | 8/1998 | Craport et al. |
| 5,796,967 A | 8/1998 | Filepp et al. |
| 5,797,126 A | 8/1998 | Helbling et al. |
| 5,799,157 A | 8/1998 | Escallon |
| 5,799,289 A | 8/1998 | Fukushima et al. |
| 5,802,293 A | 9/1998 | van der Sijpt et al. |
| 5,802,492 A | 9/1998 | DeLorme et al. |
| 5,802,530 A | 9/1998 | Van Hoff |
| 5,805,689 A | 9/1998 | Neville |
| 5,805,829 A | 9/1998 | Cohen et al. |
| 5,808,894 A | 9/1998 | Wiens et al. |
| 5,809,478 A | 9/1998 | Greco et al. |
| 5,818,715 A | 10/1998 | Marshall et al. |
| 5,819,274 A | 10/1998 | Jackson, Jr. |
| 5,832,451 A | 11/1998 | Flake et al. |
| 5,832,452 A | 11/1998 | Schneider et al. |
| 5,832,454 A | 11/1998 | Jafri et al. |
| 5,835,724 A | 11/1998 | Smith |
| 5,838,910 A | 11/1998 | Domenikos et al. |
| 5,838,916 A | 11/1998 | Domenikos et al. |
| 5,839,112 A | 11/1998 | Schreitmueller et al. |
| 5,839,114 A | 11/1998 | Lynch et al. |
| 5,842,176 A | 11/1998 | Hunt et al. |
| 5,847,957 A | 12/1998 | Cohen et al. |
| 5,848,131 A | 12/1998 | Shaffer et al. |
| 5,848,241 A | 12/1998 | Misinai et al. |
| 5,848,373 A | 12/1998 | DeLorme et al. |
| 5,850,446 A | 12/1998 | Berger et al. |
| 5,857,191 A | 1/1999 | Blackwell, Jr. et al. |
| 5,862,346 A | 1/1999 | Kley et al. |
| 5,864,818 A | 1/1999 | Feldman |
| 5,864,827 A | 1/1999 | Wilson et al. |
| RE36,111 E | 2/1999 | Neville |
| 5,870,719 A | 2/1999 | Maritzen et al. |
| 5,870,733 A | 2/1999 | Bass et al. |
| 5,875,110 A | 2/1999 | Jacobs |
| 5,877,765 A | 3/1999 | Dickman et al. |
| 5,881,230 A | 3/1999 | Christensen et al. |
| 5,889,863 A | 3/1999 | Weber |
| 5,889,942 A | 3/1999 | Orenshteyn |
| 5,890,129 A | 3/1999 | Spurgeon |
| 5,890,140 A | 3/1999 | Clark et al. |
| 5,892,905 A | 4/1999 | Brandt et al. |
| 5,893,904 A | 4/1999 | Harris et al. |
| 5,897,620 A | 4/1999 | Walker et al. |
| 5,898,835 A | 4/1999 | Truong |
| 5,901,214 A | 5/1999 | Shaffer et al. |
| 5,903,873 A | 5/1999 | Peterson et al. |
| 5,907,608 A | 5/1999 | Shaffer et al. |
| 5,909,542 A | 6/1999 | Paquette et al. |
| 5,910,982 A | 6/1999 | Shaffer et al. |
| 5,915,241 A | 6/1999 | Giannini |
| 5,918,215 A | 6/1999 | Yoshioka et al. |
| 5,920,696 A | 7/1999 | Brandt et al. |
| 5,923,552 A | 7/1999 | Brown et al. |
| 5,926,793 A | 7/1999 | de Rafael et al. |
| 5,926,798 A | 7/1999 | Carter et al. |
| 5,930,474 A | 7/1999 | Dunworth et al. |
| 5,931,917 A | 8/1999 | Nguyen et al. |
| 5,933,810 A | 8/1999 | Okawa et al. |
| 5,944,784 A | 8/1999 | Simonoff et al. |
| 5,946,660 A | 8/1999 | McCarty et al. |
| 5,946,687 A | 8/1999 | Gehani et al. |
| 5,948,040 A | 9/1999 | DeLorme et al. |
| 5,950,169 A | 9/1999 | Borghesi et al. |

(56) References Cited

U.S. PATENT DOCUMENTS

| | | |
|---|---|---|
| 5,953,706 A | 9/1999 | Patel |
| 5,956,397 A | 9/1999 | Shaffer et al. |
| 5,956,487 A | 9/1999 | Venkatraman et al. |
| 5,956,509 A | 9/1999 | Kevner |
| 5,961,569 A | 10/1999 | Craport et al. |
| 5,961,572 A | 10/1999 | Craport et al. |
| 5,963,915 A | 10/1999 | Kirsch |
| 5,966,451 A | 10/1999 | Utsumi |
| 5,970,475 A | 10/1999 | Barnes et al. |
| 5,973,619 A | 10/1999 | Paredes |
| 5,974,444 A | 10/1999 | Konrad |
| 5,977,966 A | 11/1999 | Bogdan |
| 5,978,577 A | 11/1999 | Rierden et al. |
| 5,978,747 A | 11/1999 | Craport et al. |
| 5,978,817 A | 11/1999 | Giannandrea et al. |
| 5,978,834 A | 11/1999 | Simonoff et al. |
| 5,978,840 A | 11/1999 | Nguyen et al. |
| 5,982,867 A | 11/1999 | Urban et al. |
| 5,982,868 A | 11/1999 | Shaffer et al. |
| 5,983,200 A | 11/1999 | Slotznick |
| 5,983,208 A | 11/1999 | Haller et al. |
| 5,987,423 A | 11/1999 | Arnold et al. |
| 5,991,739 A | 11/1999 | Cupps et al. |
| 5,995,939 A | 11/1999 | Berman et al. |
| 5,996,017 A | 11/1999 | Cipiere |
| 6,002,767 A | 12/1999 | Kramer |
| 6,005,568 A | 12/1999 | Simonoff et al. |
| 6,006,201 A | 12/1999 | Berent et al. |
| 6,009,412 A | 12/1999 | Storey |
| 6,009,464 A | 12/1999 | Hamilton et al. |
| 6,012,083 A | 1/2000 | Savitzky et al. |
| 6,014,673 A | 1/2000 | Davis et al. |
| 6,014,702 A | 1/2000 | King et al. |
| 6,016,496 A | 1/2000 | Roberson |
| 6,018,627 A | 1/2000 | Iyengar et al. |
| 6,018,715 A | 1/2000 | Lynch et al. |
| 6,021,406 A | 2/2000 | Kuznetsov |
| 6,023,679 A | 2/2000 | Acebo et al. |
| 6,026,379 A | 2/2000 | Haller et al. |
| 6,031,533 A | 2/2000 | Peddada et al. |
| 6,043,815 A | 3/2000 | Simonoff et al. |
| 6,044,382 A | 3/2000 | Martino |
| 6,049,774 A | 4/2000 | Roy |
| 6,049,832 A | 4/2000 | Brim et al. |
| 6,054,983 A | 4/2000 | Simonoff et al. |
| 6,058,179 A | 5/2000 | Shaffer et al. |
| 6,058,378 A | 5/2000 | Clark et al. |
| 6,061,665 A | 5/2000 | Bahreman |
| 6,061,691 A | 5/2000 | Fox |
| 6,064,973 A | 5/2000 | Smith et al. |
| 6,067,529 A | 5/2000 | Ray et al. |
| 6,070,142 A | 5/2000 | McDonough et al. |
| 6,072,870 A | 6/2000 | Nguyen et al. |
| 6,073,163 A | 6/2000 | Clark et al. |
| 6,076,067 A | 6/2000 | Jacobs et al. |
| 6,078,321 A | 6/2000 | Simonoff et al. |
| 6,078,322 A | 6/2000 | Simonoff et al. |
| 6,084,585 A | 7/2000 | Kraft et al. |
| 6,085,169 A | 7/2000 | Walker et al. |
| 6,085,170 A | 7/2000 | Tsukuda et al. |
| 6,088,677 A | 7/2000 | Spurgeon |
| 6,091,409 A | 7/2000 | Dickman et al. |
| 6,091,412 A | 7/2000 | Simonoff et al. |
| 6,091,810 A | 7/2000 | Shaffer et al. |
| 6,094,640 A | 7/2000 | Goheen |
| 6,097,802 A | 8/2000 | Fleischer, III et al. |
| 6,101,496 A | 8/2000 | Esposito |
| 6,108,650 A | 8/2000 | Musk et al. |
| 6,112,185 A | 8/2000 | Walker et al. |
| 6,119,105 A | 9/2000 | Williams |
| 6,119,149 A | 9/2000 | Notani |
| 6,122,642 A | 9/2000 | Mehovic |
| 6,125,384 A | 9/2000 | Brandt et al. |
| 6,144,944 A | 11/2000 | Kurtzman, II et al. |
| 6,144,990 A | 11/2000 | Brandt et al. |
| 6,148,289 A | 11/2000 | Virdy |
| 6,154,172 A | 11/2000 | Piccionelli et al. |
| 6,163,772 A | 12/2000 | Kramer et al. |
| 6,175,832 B1 | 1/2001 | Luzzi et al. |
| 6,178,409 B1 | 1/2001 | Weber et al. |
| 6,185,290 B1 | 2/2001 | Shaffer et al. |
| 6,185,542 B1 | 2/2001 | Moran et al. |
| 6,189,003 B1 | 2/2001 | Leal |
| 6,192,415 B1 | 2/2001 | Haverstock et al. |
| 6,205,482 B1 | 3/2001 | Navarre et al. |
| 6,223,094 B1 | 4/2001 | Muehleck et al. |
| 6,226,654 B1 | 5/2001 | Van Hoff |
| 6,229,534 B1 | 5/2001 | Gerra et al. |
| 6,230,117 B1 | 5/2001 | Lymer et al. |
| 6,233,329 B1 | 5/2001 | Urban et al. |
| 6,233,609 B1 | 5/2001 | Mittal |
| 6,240,365 B1 | 5/2001 | Bunn |
| 6,253,188 B1 | 6/2001 | Witek et al. |
| 6,272,528 B1 | 8/2001 | Cullen et al. |
| 6,272,675 B1 | 8/2001 | Schrab et al. |
| 6,275,843 B1 | 8/2001 | Chorn |
| 6,282,489 B1 | 8/2001 | Bellesfield et al. |
| 6,282,517 B1 | 8/2001 | Wolfe et al. |
| 6,282,568 B1 | 8/2001 | Sondur et al. |
| 6,286,028 B1 | 9/2001 | Cohen et al. |
| 6,292,185 B1 | 9/2001 | Ko et al. |
| 6,304,892 B1 | 10/2001 | Bhoj et al. |
| 6,308,160 B1 | 10/2001 | Rex |
| 6,311,207 B1 | 10/2001 | Mighdoll et al. |
| 6,311,213 B2 | 10/2001 | Dawson et al. |
| 6,321,158 B1 | 11/2001 | DeLorme et al. |
| 6,324,568 B1 | 11/2001 | Diec |
| 6,327,574 B1 | 12/2001 | Kramer et al. |
| 6,327,628 B1 | 12/2001 | Anuff et al. |
| 6,332,163 B1 | 12/2001 | Bowman-Amuah |
| 6,334,146 B1 | 12/2001 | Parasnis et al. |
| 6,336,100 B1 | 1/2002 | Yamada et al. |
| 6,339,773 B1 | 1/2002 | Rishe |
| 6,343,290 B1 | 1/2002 | Cossins et al. |
| 6,351,738 B1 | 2/2002 | Clark |
| 6,360,205 B1 | 3/2002 | Iyengar et al. |
| 6,360,254 B1 | 3/2002 | Linden et al. |
| 6,363,388 B1 | 3/2002 | Sprenger et al. |
| 6,370,523 B1 | 4/2002 | Anderson |
| 6,381,324 B1 | 4/2002 | Shaffer et al. |
| 6,381,603 B1 | 4/2002 | Chan et al. |
| 6,385,312 B1 | 5/2002 | Shaffer et al. |
| 6,393,415 B1 | 5/2002 | Getchius et al. |
| 6,393,471 B1 | 5/2002 | Kobata |
| 6,397,191 B1 | 5/2002 | Notani et al. |
| 6,397,208 B1 | 5/2002 | Lee |
| 6,397,219 B2 | 5/2002 | Mills et al. |
| 6,401,094 B1 | 6/2002 | Stemp et al. |
| 6,408,307 B1 | 6/2002 | Semple et al. |
| 6,418,400 B1 | 7/2002 | Webber |
| 6,477,503 B1 | 11/2002 | Mankes |
| 6,477,520 B1 | 11/2002 | Malaviya et al. |
| 6,498,982 B2 | 12/2002 | Bellesfield et al. |
| 6,519,576 B1 | 2/2003 | Freeman et al. |
| 6,539,424 B1 | 3/2003 | Dutta |
| 6,543,683 B2 | 4/2003 | Hoffman |
| 6,578,012 B1 | 6/2003 | Storey |
| 6,631,355 B1 | 10/2003 | Heintzeman et al. |
| 6,711,548 B1 | 3/2004 | Rosenblatt |
| 6,732,028 B2 | 5/2004 | Vanstory et al. |
| 6,748,426 B1 | 6/2004 | Shaffer et al. |
| 6,757,710 B2 | 6/2004 | Reed |
| 6,834,229 B2 | 12/2004 | Rafiah et al. |
| 6,965,869 B1 | 11/2005 | Tomita et al. |
| 6,993,430 B1 | 1/2006 | Bellesfield et al. |
| 7,013,325 B1 | 3/2006 | Vivian et al. |
| 7,050,986 B1 | 5/2006 | Vance et al. |
| 7,069,228 B1 | 6/2006 | Rose et al. |
| 7,080,021 B1 | 7/2006 | McCulloch |
| 7,080,022 B2 | 7/2006 | McCulloch |
| 7,082,400 B2 | 7/2006 | Jones et al. |
| 7,124,096 B2 | 10/2006 | Dutta et al. |
| 7,134,087 B2 | 11/2006 | Bushold et al. |
| 7,181,426 B2 | 2/2007 | Dutta |

(56) References Cited

U.S. PATENT DOCUMENTS

| | | |
|---|---|---|
| 7,222,087 B1 | 5/2007 | Bezos et al. |
| 7,243,075 B1 | 7/2007 | Shaffer et al. |
| 7,246,110 B1 | 7/2007 | Musgrove et al. |
| 7,617,136 B1 | 11/2009 | Lessing et al. |
| 7,769,601 B1 | 8/2010 | Bleser et al. |
| 8,108,231 B2 | 1/2012 | Boruff et al. |
| 8,271,309 B2 | 9/2012 | Stephens et al. |
| 8,396,728 B2 | 3/2013 | Boruff et al. |
| 2001/0005831 A1 | 6/2001 | Lewin et al. |
| 2001/0008998 A1 | 7/2001 | Tamaki et al. |
| 2001/0010058 A1 | 7/2001 | Mittal |
| 2001/0011222 A1 | 8/2001 | Mclauchlin et al. |
| 2001/0011246 A1 | 8/2001 | Tammaro |
| 2001/0014907 A1 | 8/2001 | Brebner |
| 2001/0016825 A1 | 8/2001 | Pugliese, III et al. |
| 2001/0016868 A1 | 8/2001 | Nakamura et al. |
| 2001/0018661 A1 | 8/2001 | Sato et al. |
| 2001/0021912 A1 | 9/2001 | Demarcken et al. |
| 2001/0027420 A1 | 10/2001 | Boublik et al. |
| 2001/0027483 A1 | 10/2001 | Gupta et al. |
| 2001/0029459 A1 | 10/2001 | Fujiwara |
| 2001/0032113 A1 | 10/2001 | Rudnick |
| 2001/0032273 A1 | 10/2001 | Cheng |
| 2001/0034723 A1 | 10/2001 | Subramaniam |
| 2001/0037224 A1 | 11/2001 | Eldridge et al. |
| 2001/0037255 A1 | 11/2001 | Tambay et al. |
| 2001/0037298 A1 | 11/2001 | Ehrman et al. |
| 2001/0037331 A1 | 11/2001 | Lloyd |
| 2001/0044811 A1 | 11/2001 | Ballantyne et al. |
| 2001/0056361 A1 | 12/2001 | Sendouda |
| 2001/0056363 A1 | 12/2001 | Gantz et al. |
| 2002/0004764 A1 | 1/2002 | Stolze et al. |
| 2002/0004796 A1 | 1/2002 | Vange et al. |
| 2002/0007327 A1 | 1/2002 | Steury et al. |
| 2002/0010604 A1 | 1/2002 | Block |
| 2002/0010639 A1 | 1/2002 | Howey et al. |
| 2002/0010781 A1 | 1/2002 | Tuatini |
| 2002/0019821 A1 | 2/2002 | Rosenbluth |
| 2002/0022979 A1 | 2/2002 | Whipp et al. |
| 2002/0026337 A1 | 2/2002 | Sasaki |
| 2002/0032790 A1 | 3/2002 | Linderman |
| 2002/0035488 A1 | 3/2002 | Aquila et al. |
| 2002/0038250 A1 | 3/2002 | Heintzeman et al. |
| 2002/0040352 A1 | 4/2002 | McCormick |
| 2002/0042843 A1 | 4/2002 | Diec |
| 2002/0042849 A1 | 4/2002 | Ho et al. |
| 2002/0046213 A1 | 4/2002 | Vinati et al. |
| 2002/0046259 A1 | 4/2002 | Glorikian |
| 2002/0046294 A1 | 4/2002 | Brodsky et al. |
| 2002/0046301 A1 | 4/2002 | Shannon et al. |
| 2002/0049603 A1 | 4/2002 | Mehra et al. |
| 2002/0062262 A1 | 5/2002 | Vasconi et al. |
| 2002/0065688 A1 | 5/2002 | Charlton et al. |
| 2002/0069093 A1 | 6/2002 | Stanfield |
| 2002/0069123 A1 | 6/2002 | Soderlind et al. |
| 2002/0072937 A1 | 6/2002 | Domenick et al. |
| 2002/0072938 A1 | 6/2002 | Black et al. |
| 2002/0073236 A1 | 6/2002 | Helgeson et al. |
| 2002/0076029 A1 | 6/2002 | Shaffer et al. |
| 2002/0077871 A1 | 6/2002 | Udelhoven et al. |
| 2002/0082912 A1 | 6/2002 | Batachia et al. |
| 2002/0083095 A1 | 6/2002 | Wu et al. |
| 2002/0083099 A1 | 6/2002 | Knauss et al. |
| 2002/0087367 A1 | 7/2002 | Azani |
| 2002/0091533 A1 | 7/2002 | Ims et al. |
| 2002/0095319 A1 | 7/2002 | Swart et al. |
| 2002/0099562 A1 | 7/2002 | Bruce, Sr. et al. |
| 2002/0099575 A1 | 7/2002 | Hubbard et al. |
| 2002/0099613 A1 | 7/2002 | Swart et al. |
| 2002/0099735 A1 | 7/2002 | Schroeder et al. |
| 2002/0099738 A1 | 7/2002 | Grant |
| 2002/0106069 A1 | 8/2002 | Shaffer et al. |
| 2002/0107918 A1 | 8/2002 | Shaffer et al. |
| 2002/0111876 A1 | 8/2002 | Rudraraju et al. |
| 2002/0112003 A1 | 8/2002 | Glorikian |
| 2002/0116205 A1 | 8/2002 | Ankireddipally et al. |
| 2002/0116454 A1 | 8/2002 | Dyla et al. |
| 2002/0120459 A1 | 8/2002 | Dick et al. |
| 2002/0120776 A1 | 8/2002 | Eggebraaten et al. |
| 2002/0129021 A1 | 9/2002 | Brown |
| 2002/0131561 A1 | 9/2002 | Gifford et al. |
| 2002/0133359 A1 | 9/2002 | Brown |
| 2002/0133430 A1 | 9/2002 | Coomber et al. |
| 2002/0133517 A1 | 9/2002 | Carlson et al. |
| 2002/0136381 A1 | 9/2002 | Shaffer et al. |
| 2002/0143644 A1 | 10/2002 | Tosun et al. |
| 2002/0152100 A1 | 10/2002 | Chen et al. |
| 2002/0156693 A1 | 10/2002 | Stewart et al. |
| 2002/0156865 A1 | 10/2002 | Rajarajan et al. |
| 2002/0165735 A1 | 11/2002 | Stangel |
| 2002/0169643 A1 | 11/2002 | Petite et al. |
| 2002/0169842 A1 | 11/2002 | Christensen et al. |
| 2002/0178087 A1 | 11/2002 | Henderson et al. |
| 2002/0184041 A1 | 12/2002 | Muller |
| 2002/0184054 A1 | 12/2002 | Cox et al. |
| 2002/0184266 A1 | 12/2002 | Blessin |
| 2002/0186144 A1 | 12/2002 | Meunier |
| 2002/0188761 A1 | 12/2002 | Chikirivao et al. |
| 2002/0194037 A1 | 12/2002 | Creed et al. |
| 2002/0194219 A1 | 12/2002 | Bradley et al. |
| 2002/0198743 A1 | 12/2002 | Ariathurai et al. |
| 2002/0198758 A1 | 12/2002 | Sawa et al. |
| 2003/0004761 A1 | 1/2003 | Lampe et al. |
| 2003/0004822 A1 | 1/2003 | Shorter et al. |
| 2003/0009545 A1 | 1/2003 | Sahai et al. |
| 2003/0014270 A1 | 1/2003 | Qureshi et al. |
| 2003/0018666 A1 | 1/2003 | Chen et al. |
| 2003/0023450 A1 | 1/2003 | Casati et al. |
| 2003/0028404 A1 | 2/2003 | Herron et al. |
| 2003/0028533 A1 | 2/2003 | Bata et al. |
| 2003/0036917 A1 | 2/2003 | Hite et al. |
| 2003/0036930 A1 | 2/2003 | Matos et al. |
| 2003/0036966 A1 | 2/2003 | Amra et al. |
| 2003/0040944 A1 | 2/2003 | Hileman |
| 2003/0040946 A1 | 2/2003 | Sprenger et al. |
| 2003/0041180 A1 | 2/2003 | Schlussman |
| 2003/0046117 A1* | 3/2003 | Jaehn et al. .................. 705/5 |
| 2003/0050805 A1 | 3/2003 | Gouyet et al. |
| 2003/0055689 A1 | 3/2003 | Block et al. |
| 2003/0061145 A1 | 3/2003 | Norrid |
| 2003/0061146 A1 | 3/2003 | Thompson |
| 2003/0074133 A1 | 4/2003 | McKinley et al. |
| 2003/0120526 A1 | 6/2003 | Altman et al. |
| 2003/0125992 A1 | 7/2003 | Rogers et al. |
| 2003/0149600 A1* | 8/2003 | Williams ..................... 705/5 |
| 2003/0158761 A1 | 8/2003 | Johnston |
| 2003/0182052 A1 | 9/2003 | DeLorme et al. |
| 2003/0195811 A1 | 10/2003 | Hayes et al. |
| 2004/0006498 A1 | 1/2004 | Ohtake et al. |
| 2004/0010338 A1 | 1/2004 | Ogura et al. |
| 2004/0030593 A1 | 2/2004 | Webster et al. |
| 2004/0039612 A1* | 2/2004 | Fitzgerald et al. ............ 705/5 |
| 2004/0054561 A1 | 3/2004 | Ogura et al. |
| 2004/0073440 A1 | 4/2004 | Garbers et al. |
| 2004/0107144 A1 | 6/2004 | Short |
| 2004/0148179 A1 | 7/2004 | Kumhyr et al. |
| 2005/0021378 A1 | 1/2005 | Weinstock et al. |
| 2005/0091087 A1 | 4/2005 | Smith et al. |
| 2005/0119921 A1* | 6/2005 | Fitzgerald et al. ............ 705/5 |
| 2005/0144048 A1 | 6/2005 | Belanger et al. |
| 2005/0216139 A1 | 9/2005 | Laughlin et al. |
| 2005/0246275 A1 | 11/2005 | Nelson |
| 2005/0261986 A1 | 11/2005 | Haynes et al. |
| 2006/0031159 A1 | 2/2006 | Minot et al. |
| 2006/0059107 A1 | 3/2006 | Elmore et al. |
| 2006/0190314 A1 | 8/2006 | Hernandez |
| 2007/0027708 A1 | 2/2007 | Brown et al. |
| 2007/0094055 A1 | 4/2007 | Nakayama et al. |
| 2007/0179819 A1 | 8/2007 | Bradley et al. |
| 2007/0198311 A1 | 8/2007 | Menendez et al. |
| 2007/0239494 A1 | 10/2007 | Stephens et al. |
| 2010/0106608 A1 | 4/2010 | Menendez et al. |
| 2010/0106623 A1 | 4/2010 | Menendez et al. |
| 2012/0290341 A1 | 11/2012 | Fitzgerald et al. |

(56) References Cited

U.S. PATENT DOCUMENTS

| | | |
|---|---|---|
| 2012/0296681 A1 | 11/2012 | Fitzgerald et al. |
| 2013/0030847 A1 | 1/2013 | Fitzgerald et al. |
| 2013/0046565 A1 | 2/2013 | Fitzgerald et al. |
| 2013/0166331 A1 | 6/2013 | Fitzgerald et al. |
| 2013/0268447 A1 | 10/2013 | Stephens et al. |

FOREIGN PATENT DOCUMENTS

| | | |
|---|---|---|
| WO | 9717680 | 5/1997 |
| WO | 9966738 | 12/1999 |
| WO | 0052601 | 9/2000 |
| WO | 0197072 | 12/2001 |
| WO | 0229675 | 4/2002 |
| WO | 02057873 | 7/2002 |
| WO | 02067079 | 8/2002 |
| WO | WO 02067175 A2 * | 8/2002 |
| WO | 02080646 | 10/2002 |
| WO | 03107125 | 12/2003 |
| WO | WO 03107125 A2 * | 12/2003 |
| WO | 2005124623 | 12/2005 |

OTHER PUBLICATIONS

"All Open Orders for Customer No. 218556"; Motorola Corporation; Nov. 23, 1999.
"Booking a room, vehicle for vacation via the 'Net"; May 2, 1997; Pantagraph, C.1; Copyright Chronicle Publishing Company.
"Enterprise Internet Billboard Manager Reference Guide," 2 pages, 2007.
"Enterprise.com Style Guide," 29 pages, 2007.
"General Manager /RVP Reference Guide," 3 pages, 1999.
"Information on Hertz Corporation"; Sep. 24, 2002; pp. 1-61.
"Internet Network Architecture," Sep. 1999, 1 page.
"New Enterprise.com site Promises Customers a Faster, Easier Experience," Free Enterprise, Spring 2002, pp. 16-17.
"New Reservation Site—enterprise.com Goes Online," e-clipse Sep. 1999, pp. 1-3.
"Online is on Target," Free Enterprise, Fall 1999, p. 10.
"Online Reservations Are Up, Up, Up," Free Enterprise, Fall 2000, p. 14.
"Reservations Are almost Online: Site Will Drive Business to Our Airport & Home-city Branches," Free Enterprise, Summer 1999, pp. 1-3.
"Search Capability," 1 page, 2001.
"Welcome to the Hertz Interactive Reservation Process"; Mar. 3, 2000; pp. 62-27.
10K Report; Agency Rent-A-Car Inc.; Report No. 0127651; Section Heading: Part I, Item 1. Business; Jan. 31, 1994; p. 4 of 54.
Alamo website screenshot, Jan. 2002, 1 page.
Avis website screenshot, Jan. 2002, 1 page.
Budget website screenshot, Jan. 2002, 1 page.
CarTemps Rent-A-Car; "CarTemps DIRECT" information; publication date unknown.
CarTemps Rent-A-Car; "CarTemps MPOWERENT Management System"; Instruction Manual; Copyright 2000; v1.1; publication date unknown.
Darrah, "Hi-Tech Streamlines Car Rental Process", Feb. 1999, p. 29, vol. 66, Issue 2.
Dogac et al., "Semantically Enriched Web Services for the Travel Industry", SIGMOD Record, Sep. 2004, pp. 21-27, vol. 33, No. 3.
Dollar Rent a Car website screenshot, Jan. 2002, 1 page.
Email from 6A01, Rogers to Sandy Rogers, Jan. 10, 2001, 2 pages.
Enterprise Rent-A-Car, "Enterprise Rent-A-Car Unveils Customizable Travel Agency Program That Offers Unprecedented Flexibility; New Arrival at Airport Offers Value-Oriented Rates and Personalized Service," Business Wire, Oct. 17, 2005, pp. 1-2, Business Wire, Inc.
Enterprise.com Screen Shots, 2001, 4 pages.
Gomez.com review of Rental Car Websites retrieved from http://www.gomez.com on Jul. 24, 2001, 26 pages.
Hertz #1 Club Gold Canopy Service, copyright 1996, The Hertz Corporation.
Hertz website screenshot, Jan. 2002, 1 page.
International Search Report by the International Searching Authority for corresponding International Patent Application No. PCT/USO7/64089.
Memorandum re Rental Systems Status—Monthly Recap for Dec. 1999, Mary Schmitz to Sandy Rogers, Jan. 5, 2000, 2 pages.
National Car Rental website screenshot, Jan. 2002, 1 page.
Nelson, "Quicken 99 for Windows for Dummies", IDG Books Worldwide, Inc., 1998, pp. 114, 122-124.
Notice of Allowance for U.S. Appl. No. 10/505,685 dated Mar. 27, 2012.
Office Action for U.S. Appl. No. 10/505,685 dated Feb. 19, 2010.
Office Action for U.S. Appl. No. 11/039,203 dated Dec. 18, 2009.
Office Action for U.S. Appl. No. 10/505,685 dated Oct. 14, 2010.
Prior Version of Enterprise.com, in use on Apr. 5, 2001, 42 pages.
Reeves, "Travel Web Site Expedia's Shares Take Off During Initial Offering", Denver Post, Nov. 11, 1999, p. C-02, entire document.
Smith et al., "E-Commerce and Operations Research in Airline Planning, Marketing, and Distribution", Interfaces, Mar.-Apr. 2001, pp. 37-55, vol. 31, No. 2.
St. Louis Business Journal; "E-commerce Department Director Answers Questions about TWA.com"; Aug. 28, 2000; St. Louis, Missouri.
Thrifty Introduces Automated Car Rental Centers, Jul. 20, 1994, PRNewswire.
Travel Agent, "Many Ways to Sell", Oct. 2, 1995, vol. 0, No. 0, p. 36.
Yenckel, "For This Cyberspace Visitor, Once Is More Than Enough", Feb. 11, 1996, p. E.01, The Washington Post (Pre-1997 Fulltext), ISSN 01908286.
U.S. Appl. No. 60/194,128, filed Apr. 3, 2000 (Aquila).
Evans, "Getting From Use Cases to Code Part 1: Use-Case Analysis", The Rational Edge, IBM Developer Works, Jul. 2004.
Office Action for CA Application 2645955 dated Jan. 6, 2014.
Office Action for U.S. Appl. No. 13/621,617 dated Nov. 21, 2013.
Zografos et al., "Optimizing Intermodal Trip Planning Decisions in Interurban Networks", TRB Annual Meeting, 2003.

* cited by examiner

METHOD AND SYSTEM FOR PROVIDING AND ADMINISTERING ONLINE RENTAL VEHICLE RESERVATION BOOKING SERVICES

CROSS-REFERENCE AND PRIORITY CLAIM TO RELATED PATENT APPLICATIONS

This patent application is a divisional of U.S. patent application Ser. No. 11/377,811, filed Mar. 16, 2006, entitled "Method and System for Providing and Administering Online Rental Vehicle Reservation Booking Services", now U.S. Pat. No. 8,271,309, the entire disclosure of which is incorporated herein by reference. The following pending patent applications are related to this disclosure: U.S. patent application Ser. No. 11/039,203, filed Jan. 20, 2005, entitled "Method and Apparatus for Improved Customer Direct On-Line Reservation of Rental Vehicles", U.S. patent application Ser. No. 10/505,685, filed Aug. 25, 2004, entitled "Method and Apparatus for Customer Direct On-Line Reservation of Rental Vehicles Including Deep-Linking", PCT patent application PCT/US03/18553, filed Jun. 13, 2003, entitled "Method and Apparatus for Customer Direct On-Line Reservation of Rental Vehicles Including Deep-Linking", and U.S. patent application Ser. No. 10/172,481, filed Jun. 14, 2002, entitled "Method and Apparatus for Customer Direct On-Line Reservation of Rental Vehicles", the entire disclosures of all of which are incorporated herein by reference.

FIELD OF THE INVENTION

This invention generally relates to the field of providing and administering a website that allows users to book rental vehicle reservations online.

BACKGROUND AND SUMMARY OF THE INVENTION

Internet technology has transformed the manner in which rental vehicle service providers do business with their customers. However, due to the impersonal nature of the Internet, a need exists in the art for rental vehicle service providers to increasingly personalize and streamline their reservation booking websites to meet customers' varied needs and desires.

Toward this end, the commonly-owned related patent applications referenced above disclosed a variety of deep-linking techniques through which users can directly jump into a reservation booking website while bypassing some form of data entry for a reservation. The present invention builds upon these deep-linking concepts to provide a deep-linking experience that is highly personalized to individual customers.

With these deep-links, some characteristic of a rental vehicle reservation is pre-selected. The pre-selected characteristic(s) for the deep-linked reservation can be any aspect of the rental vehicle reservation that a user would typically need to provide to the rental vehicle service provider to book and/or open a booked rental vehicle reservation. Examples of such reservation characteristics include any of the following, either singly or in combination with one or more other characteristics: a pick-up location (or range of eligible pick-up locations selected from all possible pick-up locations) for the reservation, a drop-off location (or range of eligible drop-off locations selected from all possible drop-off locations) for the reservation, a starting date (or range of eligible starting dates selected from all possible starting dates) for the reservation, an ending date (or range of eligible ending dates selected from all possible ending dates) for the reservation, a vehicle type (or range of eligible vehicle types selected from all possible vehicle types) for the reservation, a rate for the reservation (or range of eligible rates depending upon other reservation characteristics selected by the user), a collision/damage protection product (or range of eligible collision/damage protection products selected from all possible protection products—e.g., collision and damage waivers, damage waivers, personal accident insurance, supplemental liability protection, personal effects coverage, etc.), and an ancillary vehicle product (or range of eligible ancillary vehicle products selected from all possible ancillary vehicle products) for the reservation (e.g., a car seat, ski rack, etc.), a customer profile with which the reservation is to be associated, and the like. It should be noted that this pre-selection can include a restriction of options for a given reservation characteristic from a wider range of options for that characteristic (e.g., the pre-selection comprising a restriction on the branch location for a reservation from all possible branch locations to a lesser range of branch locations such as only branch locations in the St. Louis metropolitan area).

According to one aspect of the present invention, a customer for which the website maintains a customer profile may be an entity such as a business entity (e.g. corporation or other business organization) or governmental entity (e.g., state government, county government, city/municipal government, governmental agency, etc.). That entity may comprise numerous units, each with its own unique rental vehicle needs. The term "division" will be used herein to refer to such separately classifiable rental vehicle needs of the customer entity. For example, XYZ Corporation may have a sales division located in Los Angeles, a corporate headquarters division located in St. Louis, and a research and development division located in Boston. Through the present invention, division-specific deep-links can be set up for these divisions by defining the pre-selected reservation characteristic(s) for each division and storing these characteristics in a customer profile for the pertinent entity. However, it should be noted that these divisions need not be discrete physically or logically separate units of a business entity as in the example above. For example, a single unit of a business entity may have separately classifiable rental needs in terms of different locations where a recurring need for a rental vehicle reservations exist, different vehicle types for which there is a recurring reservation need, etc.

Through one aspect of the present invention, the different division-specific deep-links for a customer entity can be grouped together for inclusion on one or more multiple deep-link pages. Uniform resource locator(s) (URLs) for the multiple deep-link page(s) can then be provided to the customer entity to streamline and personalize the customer's ability to book rental vehicle reservations through the rental vehicle service provider's website. A plurality of multiple deep-link pages that are customized to a customer profile's multiple divisions can also be nested together such that a link on one multiple deep-link page serves as a link to another multiple deep-link page.

When a multiple deep-link page is displayed on a user computer, the user can then select one of the listed deep-links to advance to a deep-linked page of the website, thereby streamlining the user's path through the website. A "deep-linked page" is a page on which the user lands after selecting a deep-link. The deep-linked page is an intermediate page of the website that the user would normally have to reach after providing some form of input starting from the website's home page (e.g., a "Choose Vehicle Type" page that would normally be reached after user entry on the home page of location data and temporal data for a reservation). A "deep-link page" is a page having a user-selectable deep-link displayed thereon. A "multiple deep-link page" is a page having a plurality of user-selectable deep-links displayed thereon. In instances where one of the deep-links on a multiple deep-link page is a deep-link to another multiple deep-link page, the another multiple deep-link page also serves as a deep-linked page.

According to another aspect of the invention, disclosed herein is an administrative tool for use by an administrator of the rental vehicle reservation booking website to efficiently control the deep-links supported by the website for a plurality of specialized rental vehicle reservations. A rental vehicle reservation that is created through this deep-linking process can be thought of as a "specialized" rental vehicle reservation in that one or more characteristics of the rental vehicle reservation has been defined in advance. This stands in contrast to conventional rental vehicle reservations that would be created by a general visitor to the website who creates a rental vehicle reservation from scratch. Specialized rental vehicle reservations whose characteristics can be administratively controlled by the present invention include the customer profile division reservations discussed above as well as promotional offer rental vehicle reservations. Through this administrative tool, an administrator can access a plurality of graphical user interfaces (GUIs) through which the administrator can define specified characteristics of the specialized reservations and store the defined reservation characteristics in a profiles for the specialized rental vehicle reservations. The administrative tool can also allow the administrator to define uniform resource locators (URLs) for deep-links associated with these specialized rental vehicle reservations, and define customized content to be displayed on the deep-linked pages corresponding to the specialized reservation's deep-links. Upon user selection of these deep-links URLs, the user's reservation can be automatically populated with the pre-selected characteristics stored in the specialized reservation profile corresponding to that deep-link.

Through these GUIs, the pre-selected reservation characteristics (or the ranges therefor) can be positively defined or negatively defined. For example, to positively define that Branch Location A is to be used as the pick-up location for a particular deep-linked reservation, an administrator can positively define Branch Location A as a pre-selected characteristic by selecting Branch Location A, or an administrator can negatively define Branch Location A as a pre-selected characteristic by excluding all branch locations other than Branch Location A from the pre-selected characteristic. While it is generally preferred that positive definitions of pre-selected characteristics be used for reasons of data keying convenience, in some instances a negative definition may be more convenient.

Thus, via this administrative tool, a rental vehicle service provider can create a customized website experience for its customers in a fraction of the time it would have previously taken to provide customers with such an experience. Furthermore, because of the user-friendly nature of the administrative GUIs, the administrator need not be highly knowledgeable with respect to software coding or Internet website design, thereby opening up the role of administrator to a variety of people who can then efficiently serve requests from customers regarding how to personalize those customers' experiences with the website.

These and other features and advantages of the present invention will be apparent to those having ordinary skill in the art upon review of the teachings in the following description and drawings.

BRIEF DESCRIPTION OF THE DRAWINGS

FIGS. 24(a)-(g) depict exemplary GUI pages for administrative control of various date settings for different promotional offer types;

Figure 29:
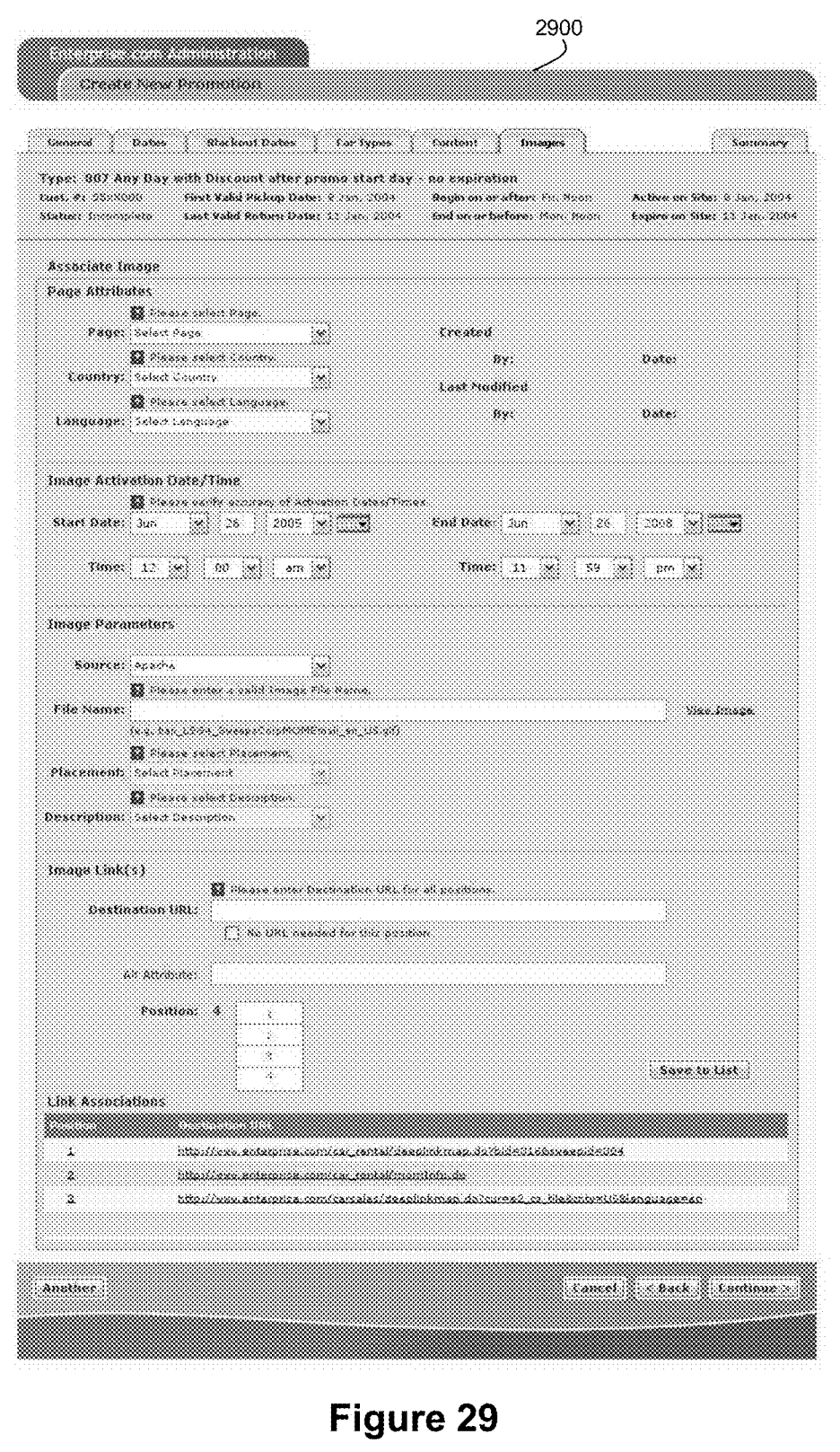

FIGS. 28(a), 28(b) and 29 depict exemplary GUI pages for administrative control of various image settings for a promotional offer;

FIGS. 31(a)-(c) depict an exemplary GUI page for summarizing the administrative settings for a promotional offer;

FIGS. 36(a)-(c) depict exemplary GUI pages for administrative control of a multi-offer page;

DETAILED DESCRIPTION OF THE PREFERRED EMBODIMENTS

Figure 1:
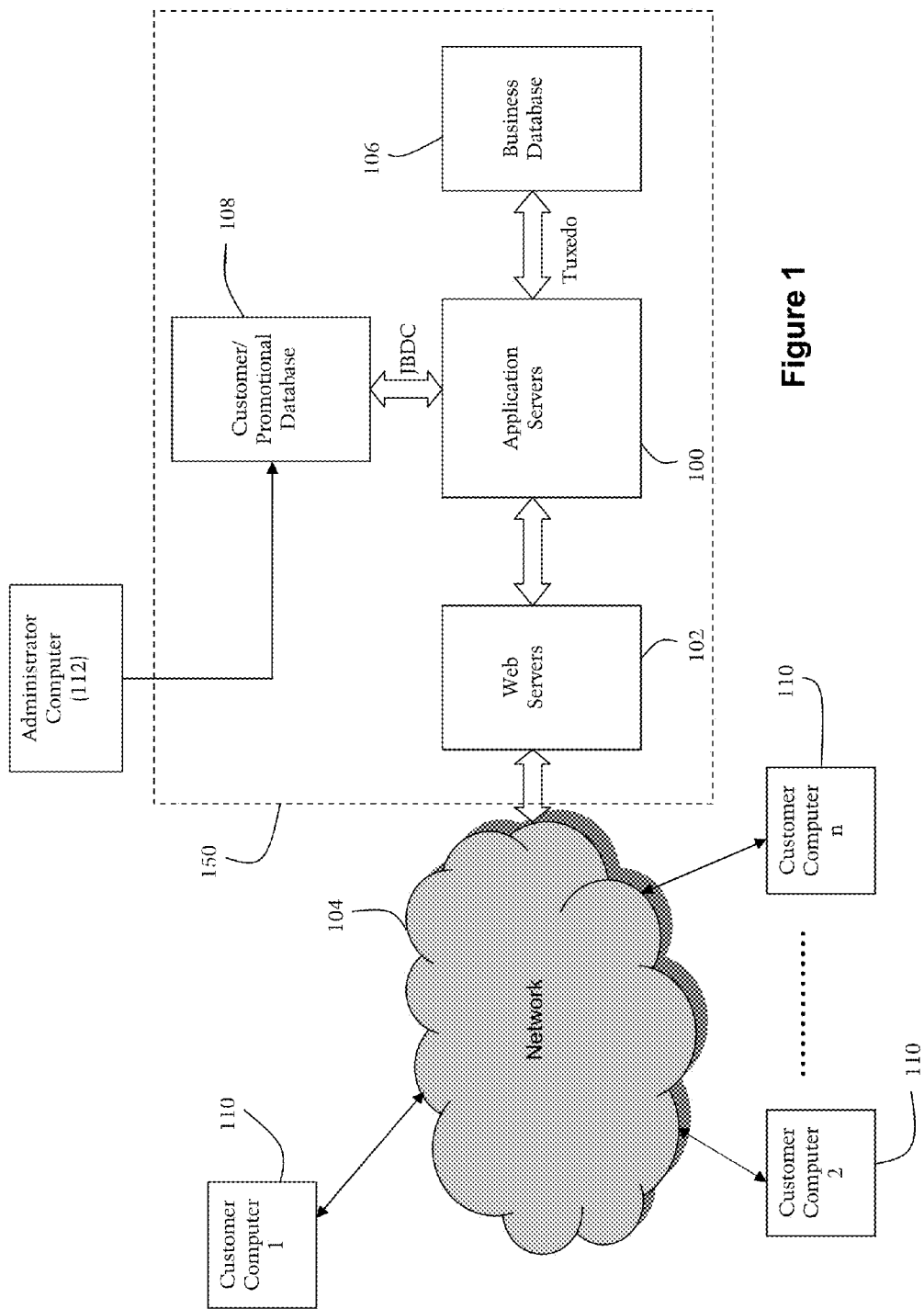
FIG. 1 illustrates an exemplary system architecture for a preferred embodiment of the present invention.

FIG. 1 illustrates a preferred system architecture for the present invention. A plurality of user computers 110 connected to a network 104 (such as the Internet) and using web browsing software can access a rental vehicle reservation booking website hosted by automated reservation transaction processing system 150. System 150 can be any computer that is network connectable. Preferably, the system 150 comprises an application server 100 (or application servers for redundancy purposes) a web server (or servers) 102, and memory units such as a customer/promotional database 108 and a business database 106. The application server 100 (1) interacts with the user computers via web server(s) 102 to obtain reservation data therefrom, (2) interacts with business database 106 via a connector interface such as Tuxedo, and (3) interacts with a customer/promotional database 108 via a connector interface such as JBDC. Business database 106 preferably stores all of the data pertaining to the rental vehicle service provider's branch locations, vehicle inventories, pricing, etc. Customer/promotional database 108 preferably stores the profiles of any registered customers (including the profiles of any customer entities such as corporations, etc.), and data relating to any rental promotions being offered by the vehicle service provider. However, it should be noted that the data stored in database 106 and 108 can be consolidated into a single database, or further segmented into multiple other databases.

An administrator computer 112 is preferably in communication with the customer/promotional database 108 to provide an authorized administrator with control over the content of database 108, thereby providing the administrator with control over the promotional offers available through the reservation booking website and control over how users associated with a customer account experience the reservation booking website. Additional details regarding this administrative control will be described hereinafter.

The reservation booking website hosted by system 150 preferably provides a plurality of user-interactive pages for display on the user computers. These pages preferably interact with users of the user computers to obtain user input regarding a plurality of rental vehicle reservation characteristics (e.g., the location where the rental vehicle corresponding to the rental vehicle reservation is to be picked up, temporal information (e.g., starting/ending dates) for the reservation, the vehicle type (e.g., compact car, full-size car, etc.) for the reservation, renter information (e.g., name, address, etc.), etc.). Preferably, the website will provide a plurality of "paths" through which users can create reservations. As used herein, "path" refers to the sequence of pages accessed by the user as he/she interacts with the website to create a rental vehicle reservation. For example, one path would be for the user to (1) first access a home page of the website, (2) in response to user submission of location and temporal information for the reservation through the home page, next access a page that requests the user to select a vehicle type for the reservation, (3) in response to user submission of a vehicle type for the reservation, next access a page that requests the user to enter renter information, (4) in response to user submission of the requested renter information, next access a page that requests the user to verify the submitted reservation characteristics to thereby book a reservation in accordance with those characteristics, and (5) in response to user submission of the requested verification, next access a page that confirms the booked reservation. Another path through the website would be for the user to skip step (3) by accessing a stored customer profile from which the user's renter information can be automatically loaded. Any of a variety of other paths through the website can be envisioned by those having ordinary skill in the art following the teachings herein.

Commonly-owned pending U.S. patent application Ser. No. 11/039,203 (filed Jan. 20, 2005 and entitled "Method and Apparatus for Improved Customer Direct On-Line Reservation of Rental Vehicles"), Ser. No. 10/505,685 (filed Aug. 25, 2004 and entitled "Method and Apparatus for Customer Direct On-Line Reservation of Rental Vehicles Including Deep-Linking"), and Ser. No. 10/172,481 (filed Jun. 14, 2002 and entitled "Method and Apparatus for Customer Direct On-Line Reservation of Rental Vehicles"), the entire disclosures of each of which are incorporated herein by reference, disclose how such a website can be implemented, including disclosing the various exemplary pages and paths through a rental vehicle reservation booking website. Among the pages described in these pending patent applications for use in the website of the present invention include a Home (H) page, a Choose Vehicle Type (CV) page, a Choose Location (CL) page, a Renter Information (RI) page, a Verify (V) page, and others.

Figure 2:
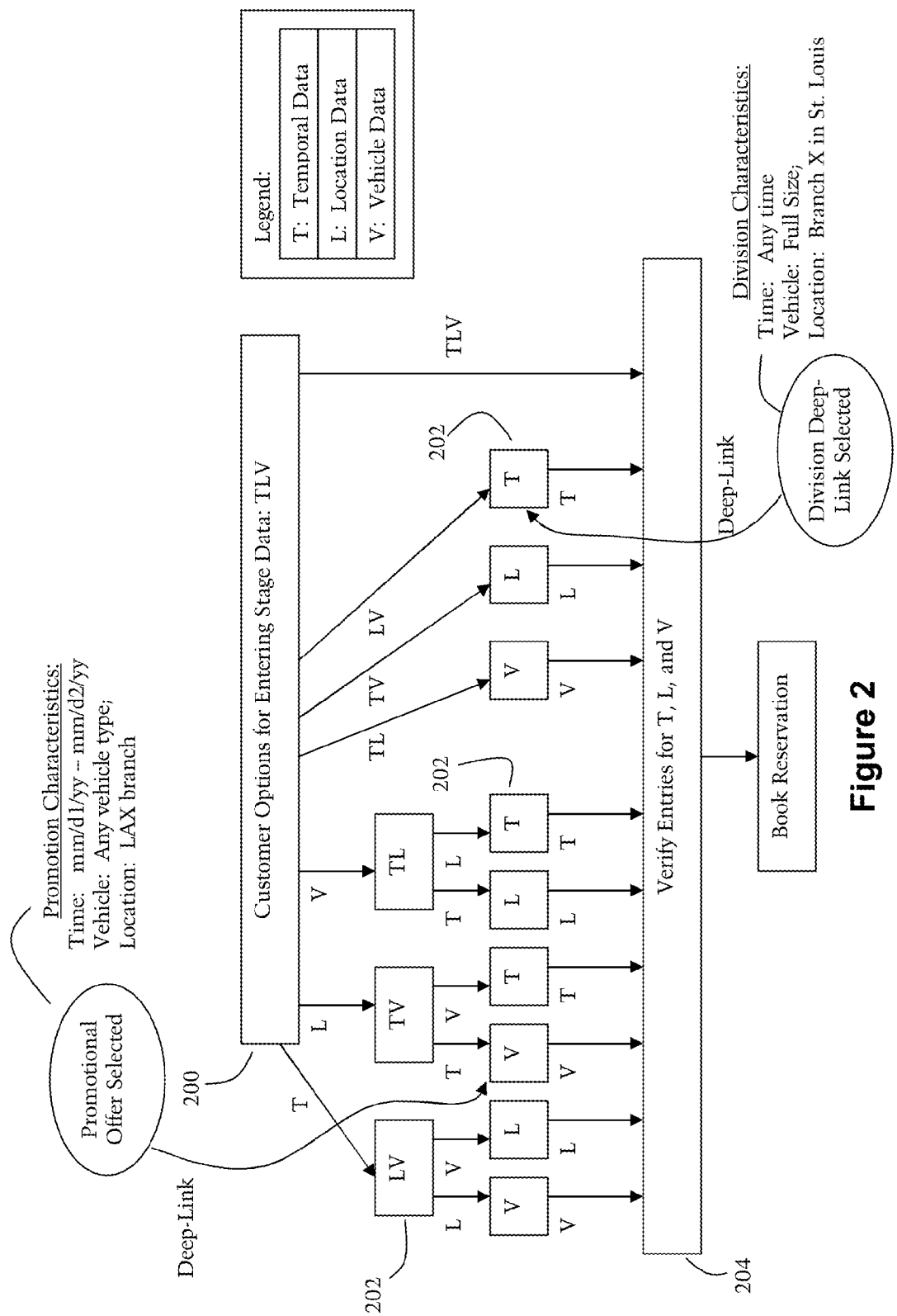
FIG. 2 illustrates a preferred deep-linking concept employed by a preferred embodiment of the present invention.

To streamline a user's path through the website, the patent application Ser. Nos. 11/039,203, 10/505,685, and 10/172,481 describe a deep-linking concept that allows users to directly access a page of the website that would normally be reached after the user has accessed previous website pages to submit at least one other reservation characteristic. FIG. 2 illustrates this concept.

FIG. 2 also illustrates an exemplary navigational structure for a reservation booking website. In the example of FIG. 2, the different types of data needed from the user to successfully book a rental vehicle reservation are: (1) temporal data (T)—such as the starting and ending dates for the reservation, (2) location data (L)—such as an identification of the particular branch of the rental car company from which the user seeks a rental vehicle, and (3) vehicle data (V)—such as the type of vehicle the user wants to rent (economy, midsize, luxury, etc.). The user can submit values for these data types to the website via various paths. Each box 200, 202, and 204 in FIG. 2 represents a page of the website, and the text within each box represents the data types for which the page requests data values from the user. Each arrow indicates a submission of data by the user, and the text adjacent each arrow represents the type(s) of data being submitted. It should be noted that the variety of paths shown in FIG. 2 is exemplary only—a practitioner of the present invention can choose to implement more or fewer paths in a website based on the practitioner's desires. For example, a practitioner of the present invention may wish to add renter information to the types of necessary data to complete a rental vehicle reservation.

When entering the website in a conventional fashion through the website's home page (H) 200, the user, depending on his/her desires, can either submit all data values for all necessary data types to the website via a single data exchange (see the path with the arrow labeled TLV), two data exchanges (see the paths labeled with the TL/TV/LV arrows), or in single-step fashion via three data exchanges. In instances where the user does not submit all necessary data types from the home page, one or more intermediate pages 202 are displayed for the user to submit remaining reservation data. Once the website has received all necessary data from the user, a verify page (V) 204 is presented from which the user can review his/her data entries and thereafter book the reservation if all is accurate.

FIG. 2 illustrates the "deep-linking" concept by showing how a user can jump to an intermediate page 202 (or even a verify page 204) through selection of a deep-link. Upon selection of a deep-link, the user is dropped into the website at a stage of the reservation booking process commensurate with the conditions of that deep-link. Each deep-link is associated with at least one pre-selected reservation characteristic such that the user's reservation will be automatically loaded with that at least one characteristic upon selection of the deep-link. Because of this automatic loading of the pre-selected reservation characteristic, the user can bypass at least one data entry task of the website. FIG. 2 provides two examples of deep-links, one associated with promotional offers and the other associated with customer profiles.

A rental vehicle service provider at any given time may be offering a variety of "promotional offers". Such offers typically have a limited duration and may include a reduced rate for a rental vehicle reservation with a particular vehicle type, at a particular location, and/or during a particular time period. Thus, the promotional offer will have at least one pre-selected reservation characteristic. A deep-link can then be created that is a URL to an intermediate page of the website wherein the promotional offer's pre-selected characteristic(s) has already been set for the reservation. For example, FIG. 2 depicts a promotional offer with the following pre-selected characteristics: the location is the LAX branch of the rental vehicle service provider and the time period is a date range (such as a specified weekend). The promotional offer is not restricted by vehicle type. This promotional offer has a deep-link associated therewith, which is a URL for a page of the website that the user would reach when location and time have been chosen but a vehicle type still needs to be chosen. Upon user selection of this deep-link (e.g., by the user typing the URL into a browser or by selecting a link embedded into a page such as a page on which the deep-link was placed as an advertisement), the user is dropped into the website at a Choose Vehicle page, as shown in FIG. 2.

A repeat customer for which the website maintains a customer profile will often have predictable rental vehicle needs. In fact, repeat customers that are entities such as businesses, governmental entities or other organizations may have a range of recurring separately classifiable rental vehicle needs. As noted above, these different rental vehicle needs will be referred to herein as "divisions". For example, Company Y located in Neighborhood A of St. Louis may have a recurring need to rent vehicles in St. Louis. Such a division can be characterized with the following reservation characteristics: (1) the location being Branch X of the rental vehicle service provider (wherein Branch X is the branch location of the rental vehicle service provider that is located closest to Company Y), and (2) the vehicle type being a full size (which is the type of vehicle that Company Y prefers for its employees). This division can have a deep-link associated therewith, which is a URL for a page of the website that the user would reach when that location and vehicle type have been chosen but start/end dates still need to be chosen. Upon user selection of this deep-link (e.g., by the user typing the URL into a browser or by selecting a link embedded into a page such as a page on Company Y's intranet site), the user is dropped into the website at a Choose Time page, as shown in FIG. 2.

Thus, the deep-linking concept of the present invention allows users to streamline the reservation creation process by alleviating users from submitting one or more reservation characteristics.

Figure 3:
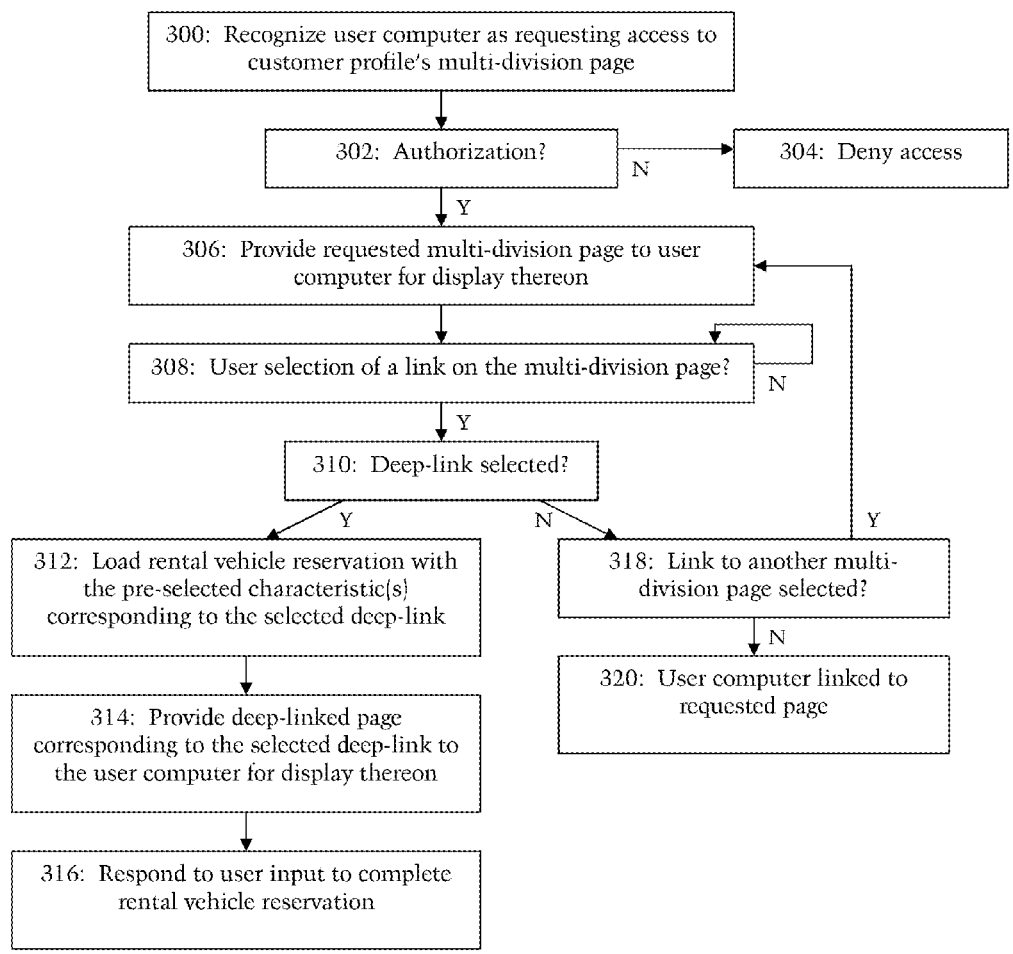
FIG. 3 is a flowchart illustrating processing flow from a multi-division page.

In one embodiment of the present invention, this deep-linking concept is applied to a customer having multiple divisions. A deep-link is created for each of the customer's divisions, and multi-division pages are created for users to access through the customer profile. Through such a multi-division page, users associated with the customer profile can quickly select which division is appropriate to their rental vehicle needs and then streamline the reservation creation process for filling that need by selecting the deep-link corresponding to that division. FIG. 3 depicts a flowchart for this methodology.

At step 300, the website recognizes a user computer as requesting access to a customer profile's multi-division page. This recognition can occur in any of a variety of ways. For example, the user can type the URL for the multi-division page into the user computer's browser. Through coding of the URL as described in the incorporated patent application Ser. Nos. 11/039,203 and 10/505,685, the website will recognize the applicable customer profile, the applicable pre-selected reservation characteristic(s), and the appropriate deep-linked page to be displayed on the user computer. The rental vehicle service provider can also provide this URL to the customer, who in turn can include that URL as a selectable deep-link into the reservation booking website on an intranet site maintained by the customer. Recognition can also occur through a cookie placed on the user computer. Further still, recognition can occur after the user has entered an appropriate ID and password to establish his/her authorization. After the website has confirmed the user's authorization (step 302), the website provides the requested multi-division page to the user computer for display thereon (step 306). If the user lacks authorization, access to the multi-division page is denied at step 304.

Figure 4:
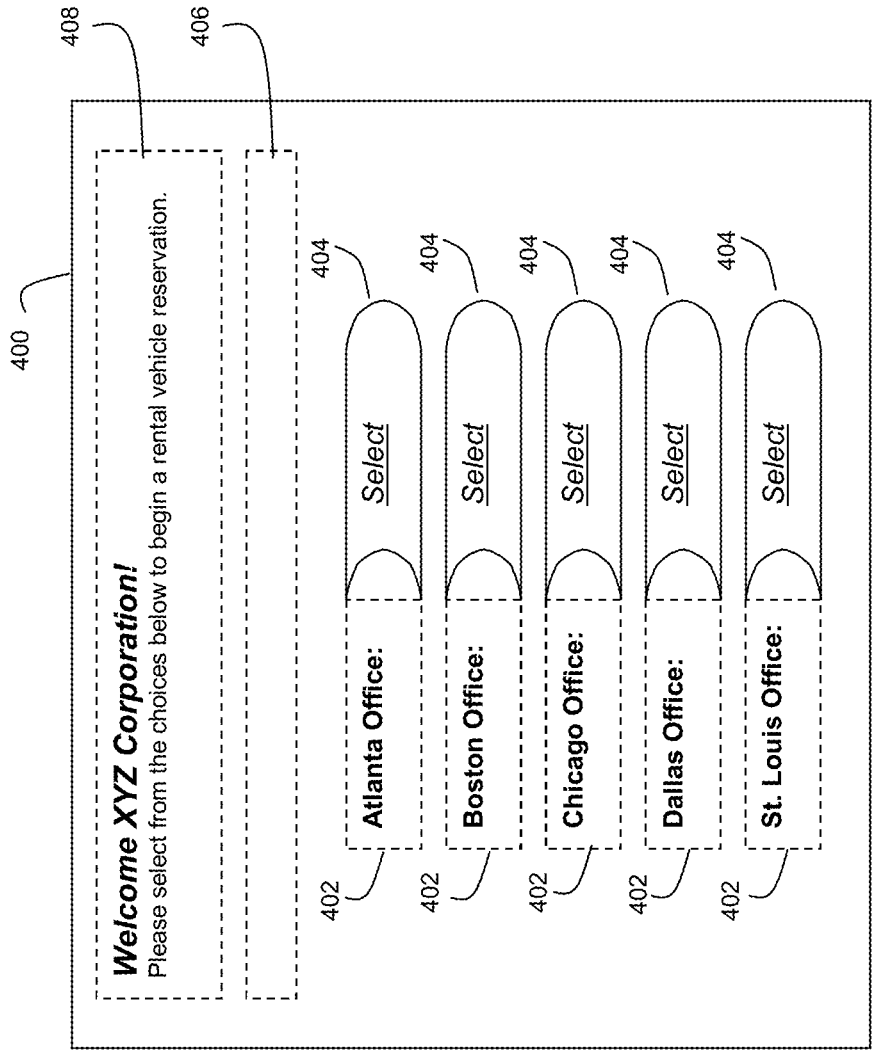
FIG. 4 depicts an exemplary multi-division page.

FIG. 4 depicts an exemplary multi-division page 400. Section 408 of page 400 includes welcome text that provides instruction to the user regarding further completion of the reservation. As explained in greater detail below, a site administrator can control the content of section 408 on a page-by-page basis. Links 404 of page 400 preferably comprise a plurality of deep-links into the reservation website corresponding to the customer's divisions. However, it should be noted that all of the links 404 need not be deep-links. For example, one of the links 404 can be a link to the website's home page. Further still, one or more of the links 404 can be links to websites other than the rental vehicle service provider's website.

Adjacent to each link 404 is a text section 402. For each deep-link 404, its corresponding text section 402 preferably includes text that describes the division corresponding to that deep-link. In the example of FIG. 4, page 400 is a multi-division page for the customer entity XYZ Corporation. The divisions of XYZ Corporation are labeled as the Atlanta Office, the Boston Office, the Chicago Office, the Dallas Office and the St. Louis Office of XYZ Corporation. Links 404 comprise deep-links for those divisions. User selection of these deep-links 404 will cause the website to provide the deep-linked page corresponding to the selected deep-link's division to the user computer for display thereon. Among the characteristics that can be pre-selected through these deep-links are reservation characteristics such as location, vehicle type, renter age, etc.

Figure 5:
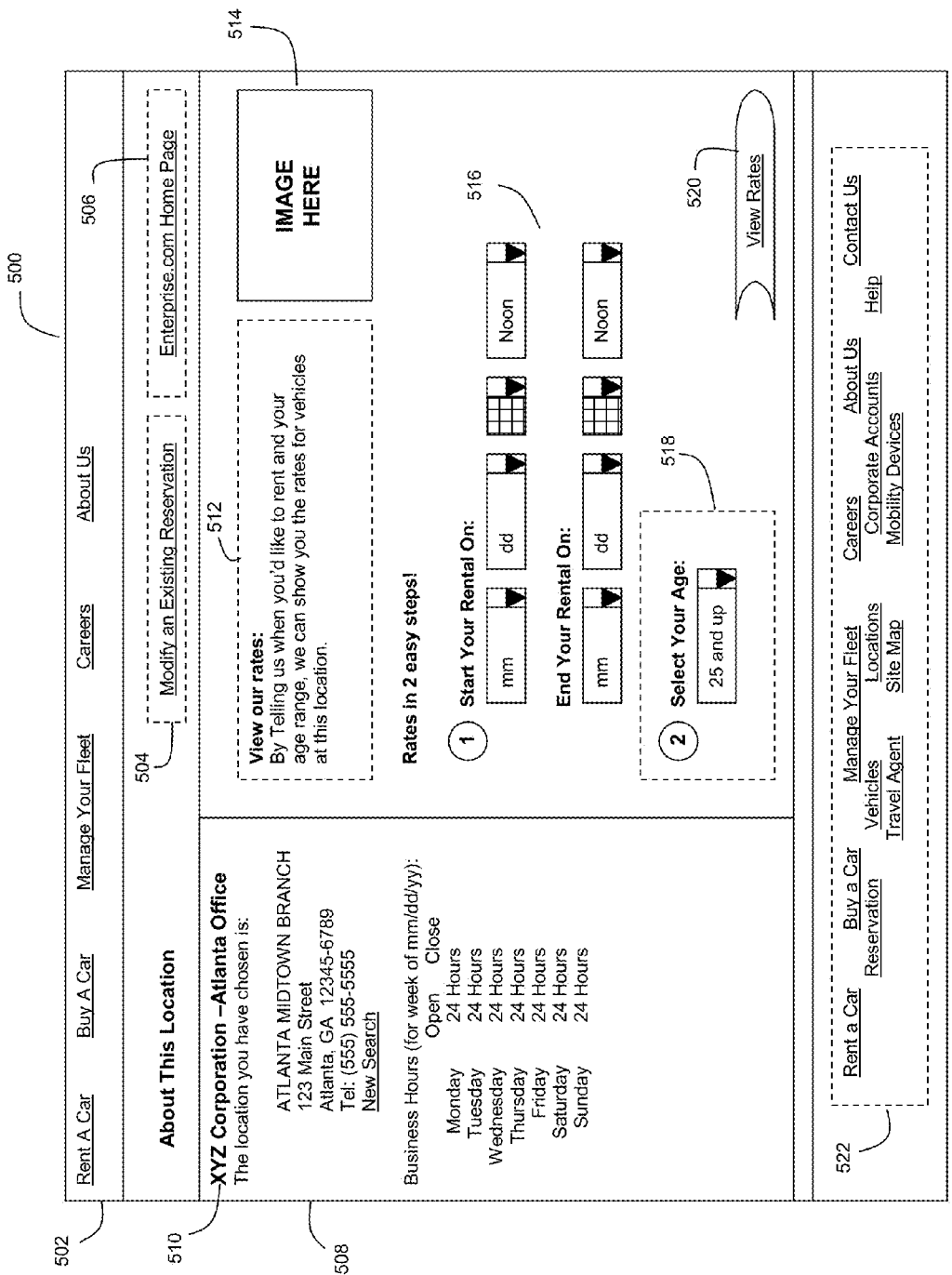
FIG. 5 depicts an exemplary deep-linked page reached after selection of a deep-link on the multi-division page of FIG. 4.

For example, the deep-link 404 corresponding to the Atlanta Office division of the XYZ Corporation can be selected by the user to display the deep-linked page 500 of FIG. 5 (see steps 308, 310, 312, and 314 of FIG. 3). Page 500 is a page that is configured to interact with the user to obtain user input corresponding to starting/end dates (and times) for the reservation and the renter's age (see sections 516 and 518). As can be seen in section 508, the reservation's location has been pre-selected to be the rental vehicle service provider's Atlanta Midtown branch location which may the branch location of the rental vehicle service provider nearest to XYZ Corporation's Atlanta office (step 312 of FIG. 3). Upon user entry of starting/ending dates/times and renter age, the user can proceed to a page from which he/she can choose a vehicle type for the reservation by selecting the view rates button 520 (step 316 of FIG. 3). Thus, user selection of the deep-link corresponding to the Atlanta Office division of the XYZ Corporation is roughly effective to deep-link the user into the rental vehicle service provider's website at the TV page of FIG. 2.

Page 500 also preferably includes a plurality of sections that are customizable on a per division basis. For example, section 502 is navigation bar for the rental vehicle service provider's website. An administrator can control the appearance of page 500 by controlling whether the navigation bar is included in section 502. Section 510 includes text that is personalized to the customer entity's division, typically identifying the name of the customer entity and/or division. An administrator can control the content of section 510. Section 512 also includes customizable text content that can be controlled by an administrator. Section 514 can be populated by an image, wherein the image can be a stock image from the rental vehicle service provider or an image provided by the XYZ Corporation to personalize or co-brand the deep-linked page 500. Once again, an administrator can control what image populates section 514. Section 522 includes a footer navigation bar for the rental vehicle service provider's website. As with section 502, an administrator can control how this section is populated with navigation links. Also included on page 504 are two sections 504 and 506 that are a "Modify an Existing Reservation" link and a "Enterprise.com Home Page" link respectively. The "Modify an Existing Reservation" link is user-selectable to display a page from which the user can search for an existing reservation and the "Enterprise.com Home Page" link is user-selectable to take the user to the home page of the website. An administrator can control whether these links are included in sections 504 and 506 on a division-by-division basis. The details of such administrative control over the content of page 500 will be described in greater detail below.

Returning to FIG. 4, page 400 also preferably includes a section 406 which can be populated with an alphabet navigational bar. Such an alphabet navigational bar can be useful in situations where a customer entity has numerous divisions, not all of which will conveniently fit on a single page 400, as will be explained below in connection with FIG. 8.

Figure 6:
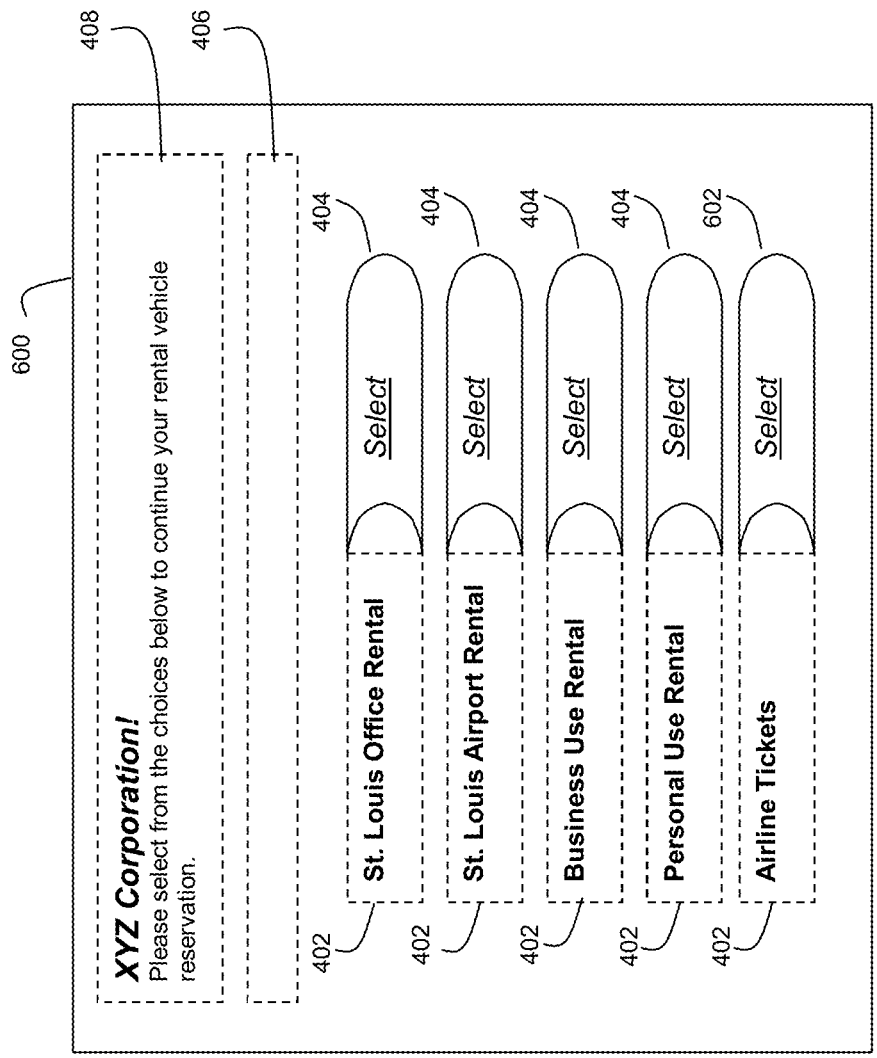
FIG. 6 depicts another exemplary multi-division page.

User selection of the deep-link 404 corresponding to the St. Louis Office division of the XYZ Corporation is effective to display the deep-linked page 600 of FIG. 6 on the user computer. Page 600 is another multi-division page. Thus, the St. Louis Office division link of the multi-division page 400 of FIG. 4 is effective to display the multi-division page 600 of FIG. 6 (following the flow of steps 308 to 312 to 318 to 306 of FIG. 3). Situations such as these may arise where it is convenient to group different divisions together as a single division for display on a multi-division page. The examples of FIGS. 4 and 6 depict such a scenario. The St. Louis office of the XYZ Corporation may itself have numerous separately classifiable rental vehicle needs. For example, the personnel at the St. Louis office may have (1) a recurring need to rent vehicles from a branch close by (in which case user selection of the deep-link 404 for the "St. Louis Office Rental" division can be effective to deep-link the user into the website to create such a reservation), (2) a recurring need to rent vehicles from the St. Louis airport rental branch location (in which case user selection of the deep-link 404 for the "St. Louis Airport Rental" division can be effective to deep-link the user into the website to create such a reservation, as described in connection with FIG. 7), (3) a recurring need to rent vehicles from an unknown location as part of business (in which case user selection of the deep-link 404 for the "Business Use Rental" division can be effective to deep-link the user into the website to create such a reservation—typically the deep-linked page will be the website home page with customization in accordance with the XYZ Corporation's customer profile as if the user had already logged into the website using the XYZ Corporation's customer profile), and (4) a recurring need to rent vehicles for personal use (in which case user selection of the link 404 for the "Personal Use Rental" division can be effective to link the user to the website's home page as if the user were a general retail customer). In the example of FIG. 6, user selection of the deep-link 404 corresponding to the St. Louis Airport Rental division will cause the website to provide the deep-linked page 700 of FIG. 7 to the user computer for display thereon. As can be seen, the deep-link for the St. Louis Airport Rental division operates to automatically populate the reservation with pre-selected location and vehicle type characteristics (the St. Louis airport branch location and the full-size vehicle type respectively). Thus, the deep-link for the St. Louis Airport Rental division is roughly effective to deep-link the user into the rental vehicle service provider's website at the page T of FIG. 2 that follows the LV arrow.

FIG. 6 also provides an example of a multi-division page that includes a link 602 to a website unrelated to the rental vehicle service provider. For example, personnel at the St. Louis office of the XYZ Corporation may have a recurring need to book airline tickets. In such situations, the multi-division page 600 can include link 602 that is user-selectable to cause an airline ticket reservation booking website to be displayed (following the flow of steps 308 to 310 to 318 to 320 of FIG. 3). As explained in greater detail below, an administrator can control whether such links 602 are included on a multi-division page.

Figure 8:
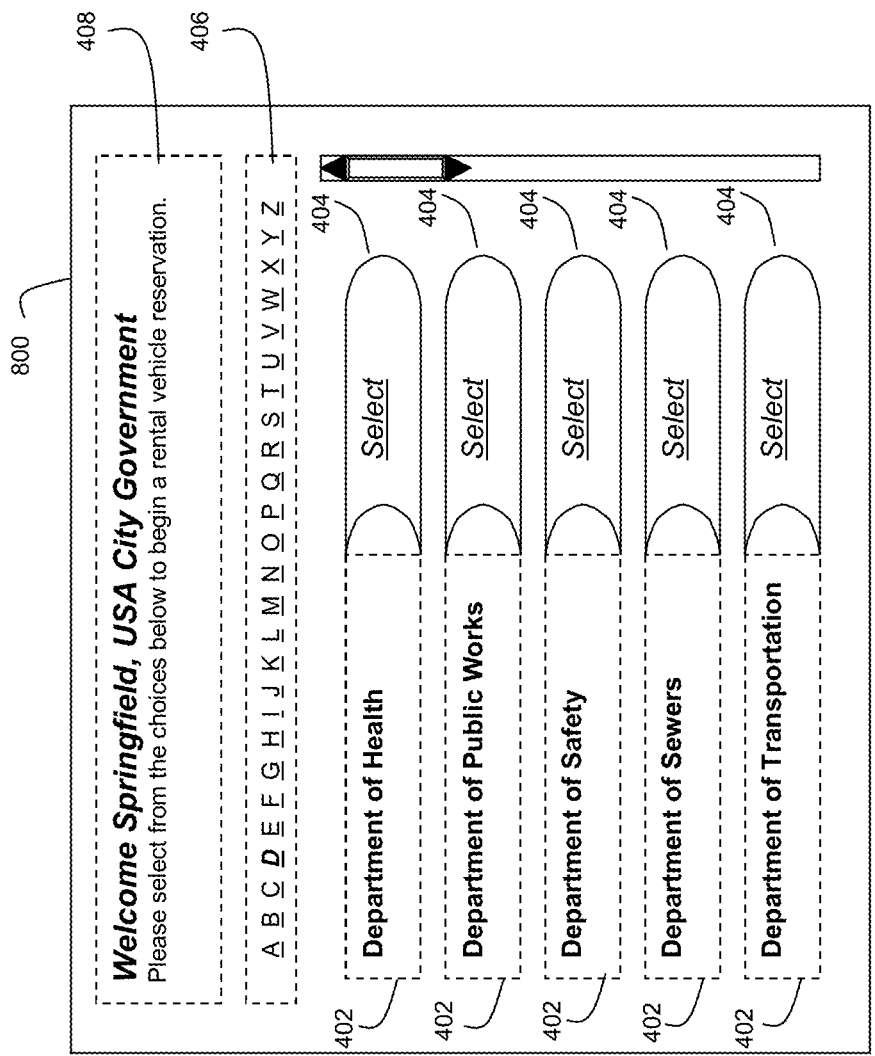
FIG. 8 depicts yet another exemplary multi-division page.

FIG. 8 depicts yet another example of a multi-division page 800. In this example, the customer entity is a city government. The city government has numerous divisions with their own separately classifiable rental vehicle needs (e.g., the Department of Health may need to rent vehicles from the branch location nearest to their offices while the Department of Public Works, which may be located across town from the Department of Health, may need to rent vehicles from a different branch location nearest to their offices). Thus, links 404 can be deep-links for each of these different divisions of the city government (or links to a nested multi-division page that further breaks down a division into further divisions). For a large diverse entity such as a city or state government, there may be a sufficient number of different divisions that they cannot be conveniently displayed on a single multi-division page. In such instances, section 406 can include an alphabet navigation bar to provide users with efficient access to divisions of interest. In the example of FIG. 8, the user has selected the letter "D" to cause the divisions that are labeled with a D-word to be listed. A scroll bar can be used to access D-divisions on the list that are not shown in the screen. Furthering this example, user selection of the letter "O" from the alphabet navigation bar can be effective to list a division of Springfield's city government such as "Office of the Mayor".

Thus, as described in connection with FIGS. 2-8, a rental vehicle service provider can greatly accommodate the needs of its customers—particularly large customers such as entities with multiple divisions—by providing customized pages of the website that are tailored to the entity's rental vehicle needs and by streamlining users' paths through the website via deep-linking based on pre-selected reservation characteristics. While large entity customers are the ones who will likely obtain the most benefits from this technology, smaller scale customers can also benefit from the personalized customization that this technology provides. For example, a consulting firm may have 3 consultants who consistently travel to different areas as part of their job. Consultant A may travel to Chicago 20-25 times a year and typically rent intermediate size vehicles, Consultant B may travel to San Francisco 30 times a year and typically rent economy size vehicles, Consultant C may travel to Miami 10 times a year and typically rent luxury class vehicles. Even though not a large entity, this consulting firm may choose to engage a rental vehicle service provider that practices the present invention to obtain a URL to a multi-division page that includes deep-links for each of Consultant's A, B, and C's rental preferences. Each deep-link on such a multi-division page can then be labeled with the names of the consultants to further personalize the consulting firm's experience with the rental vehicle service provider.

Figure 9:
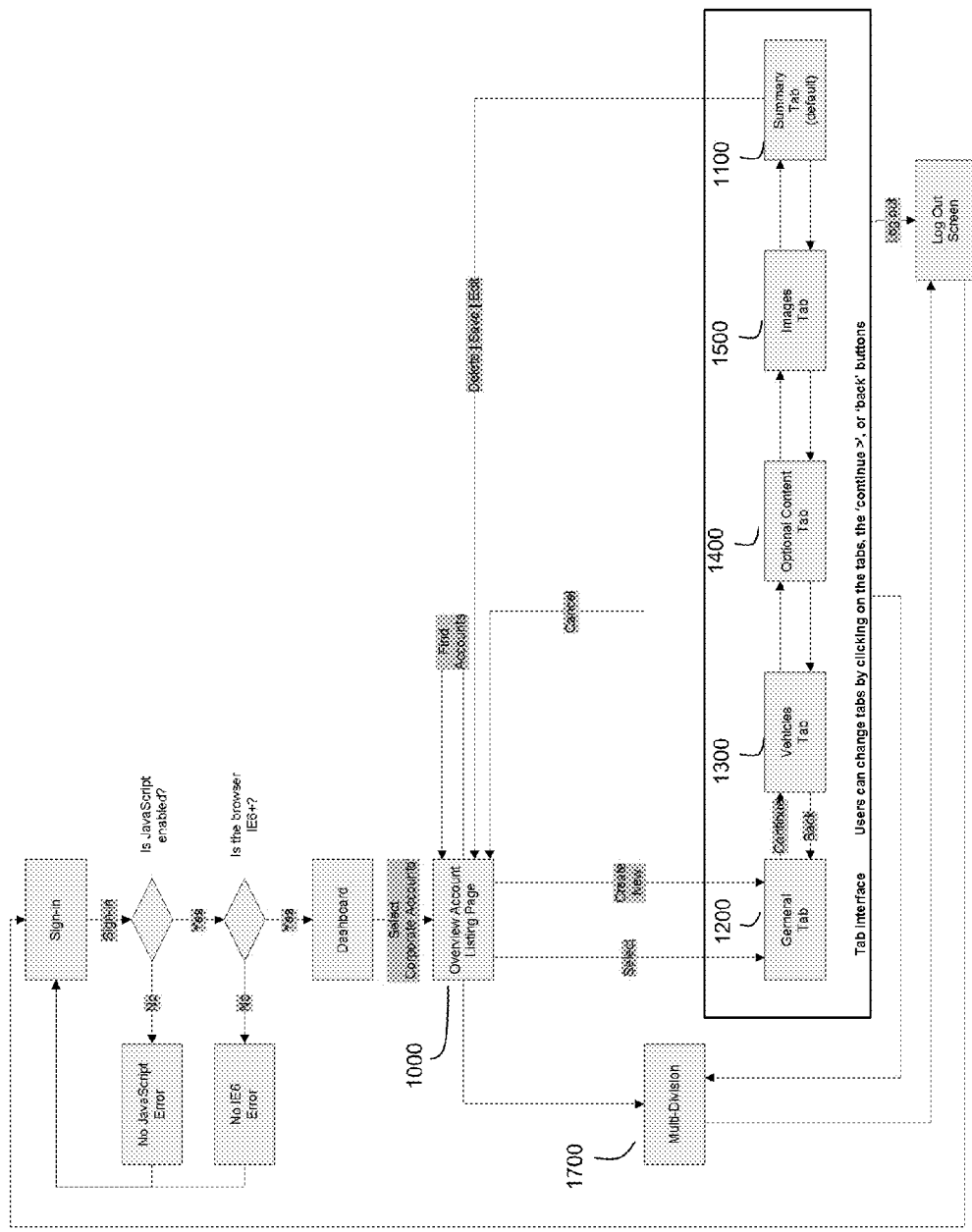
FIG. 9 is an exemplary high level flow diagram for the process of creating and administering customer profile-based deep-links and multi-division pages.

Administrative Control Over Deep-Links and Multiple Deep-Link Pages:

For the deep-links and multi-division pages described above, it is highly desirable to have an efficient means by which of creating and administering those deep-links and multi-division pages. Such efficient means will allow a rental vehicle service provider to cost-effectively provide the website customization described herein to a large range of customers, both large and small, in a relatively short period of time. FIG. 9 details a GUI-based flow for creating and administering customer profile-based deep-links and multi-division pages. After an administrator with appropriate authorization signs in through an administrator computer such as that shown in FIG. 1, the administrator can then navigate to page 1000, which provides an overview of the customer profiles stored in database 108. Efficient administrative control over deep-linked pages and pages having multiple deep-links included thereon can be achieved by using common templates for deep-linked pages and multiple deep-link pages, wherein the templates are segmented into a plurality of sections whose content can be customized by an administrator through a GUI. Data describing these customized sections is then stored in database 108 in association with the applicable customer profiles.

Figure 10:
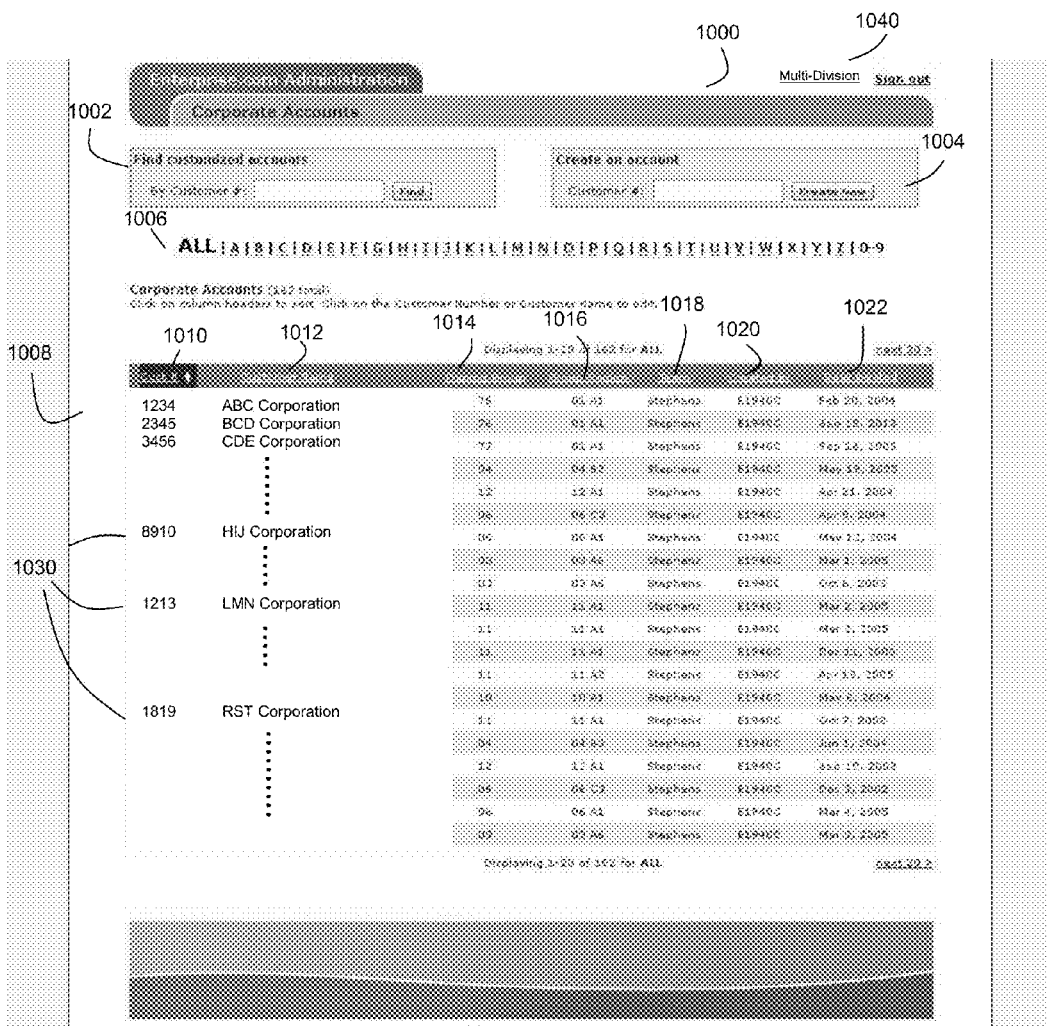
FIG. 10 is an exemplary GUI page providing an administrator with an overview of existing customer profile divisions.

FIG. 10 depicts page 1000, which is a GUI providing an administrator with an overview of existing customer profile divisions. Through field 1002, the administrator can search for existing customer profile divisions by customer number. Administrators can also search for existing customer profile divisions by name, using the alphabet navigation browser and the existing customer profile division entries 1030 in table 1008. If the administrator wants to begin the process of creating a new customer profile division, then he/she can do so via field 1004 by providing a customer number for the new customer profile division.

Table 1008 lists the existing customer profile divisions as rows 1030, wherein each entry includes a customer number field 1010 a customer name field 1012, an owning group field 1014, a group/region field 1016 and a team name field 1018 for use in connection with the rental vehicle service provider's internal management reporting operations, a "created by" field 1020 which identifies the administrator who created each division, and a "date created" field 1022 which identifies the date on which the customer profile division was created.

Figure 11A:
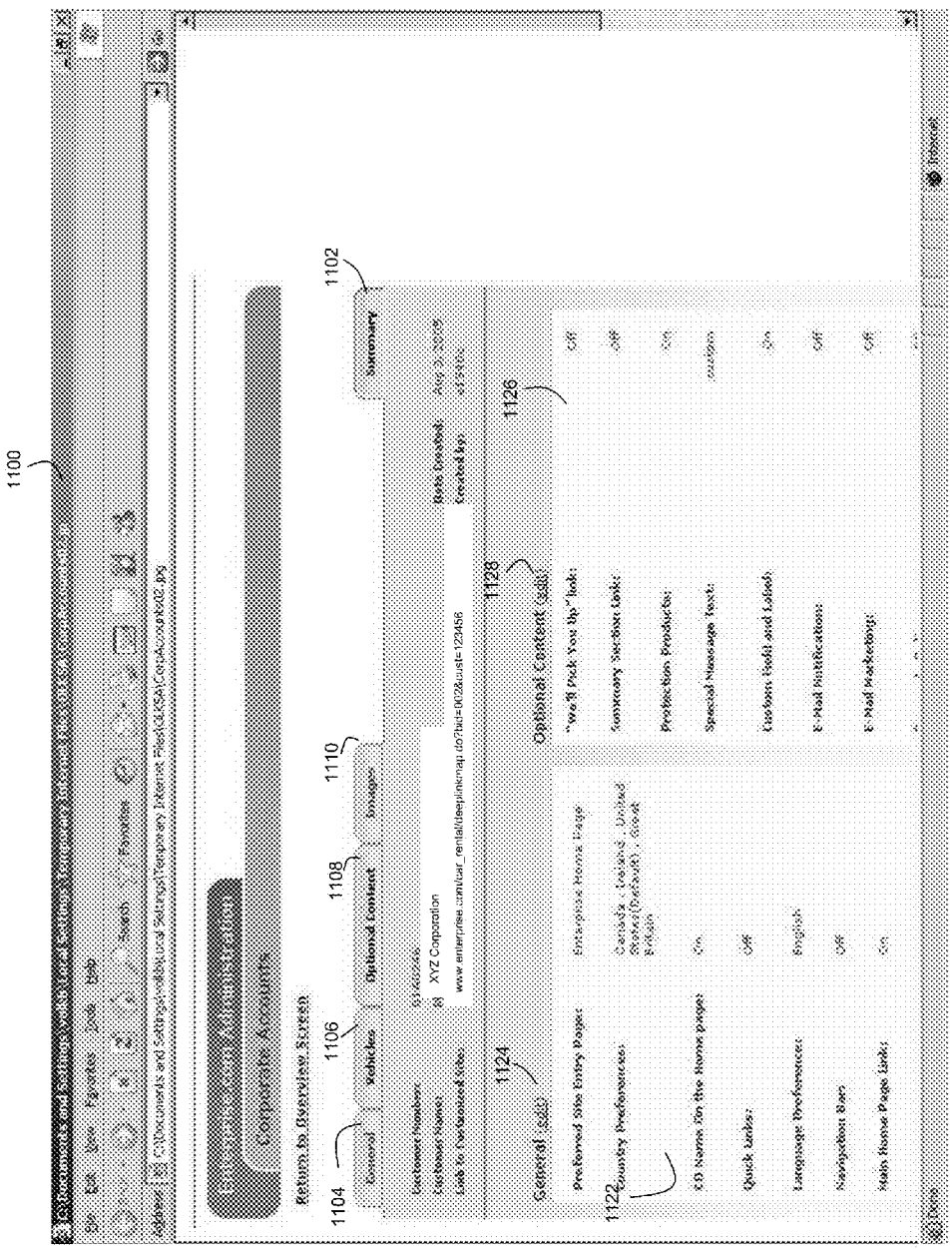
FIGS. 11(a) and (b) depict an exemplary GUI page for summarizing the administrative settings for a customer profile division.
Figure 11B:
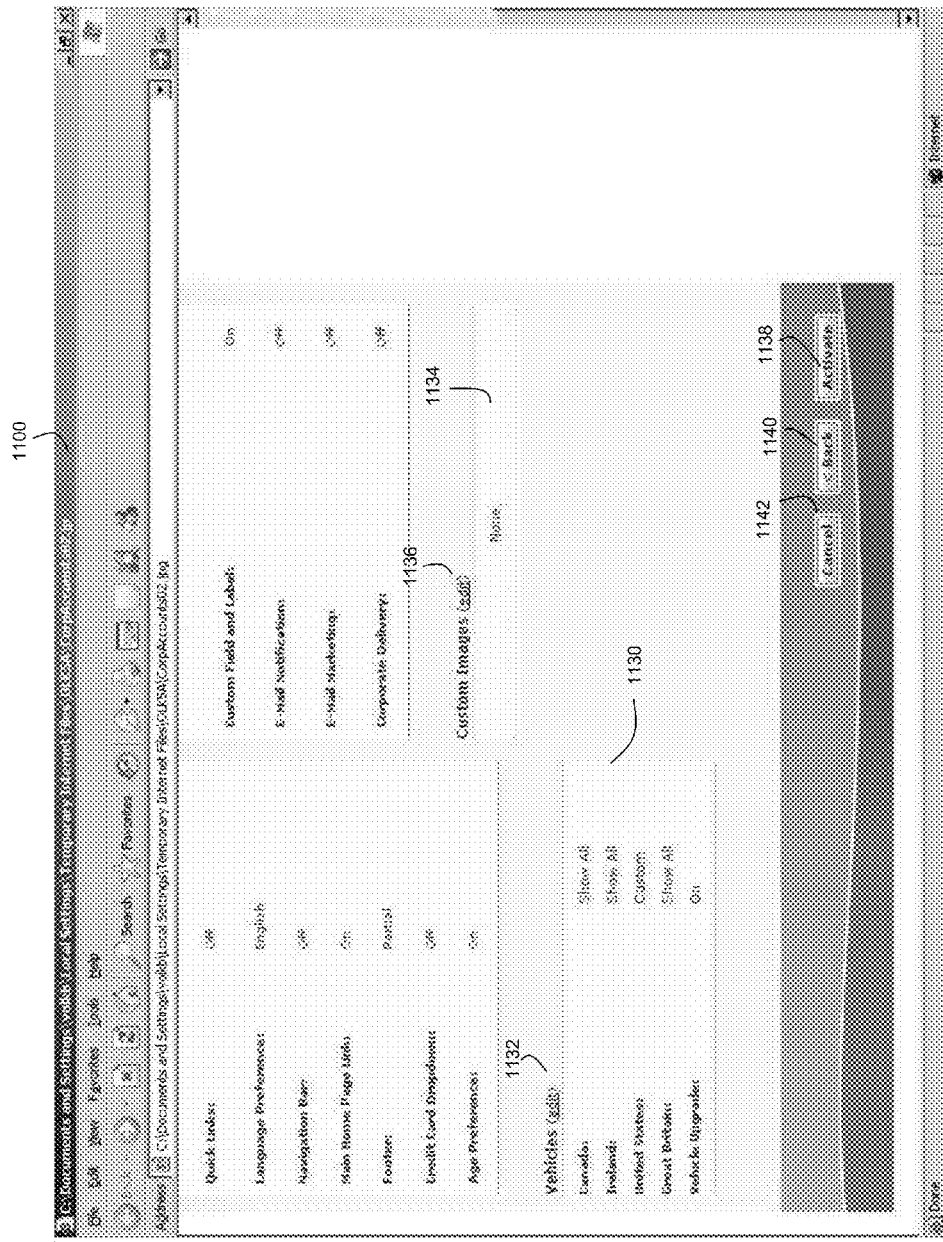

Upon administrator selection of an existing customer profile division from page 1000, the administrator can be routed to page 1100 of FIGS. 11(*a*)-(*b*), which is a summary GUI for a corporate division profile. However, the administrative control can also be configured to route the administrator to page 1200 of FIGS. 12(*a*)-(*c*), which is a GUI through which the administrator can control a variety of aspects of the customer profile division.

Figure 12A:
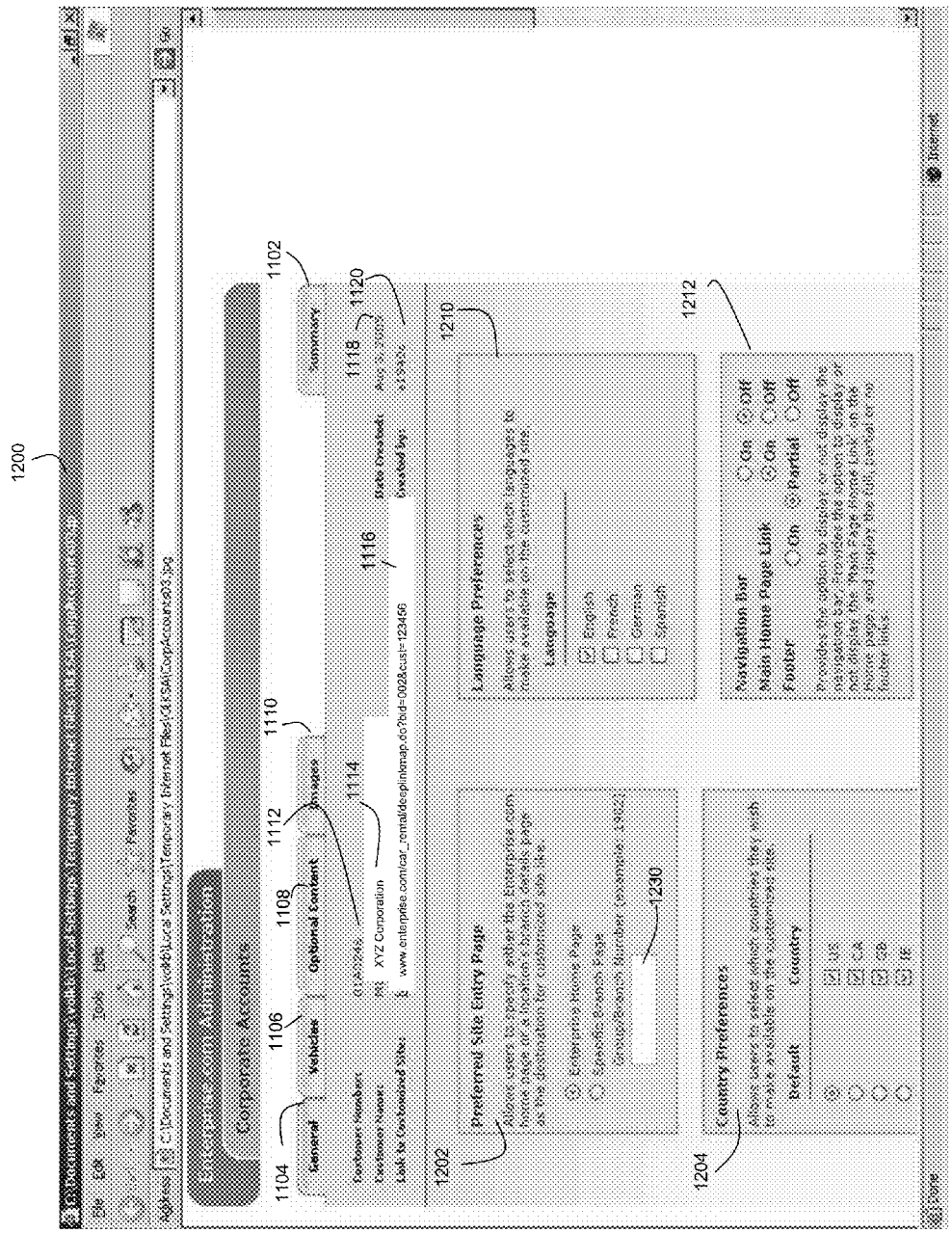
FIGS. 12(a)-(c) depict an exemplary GUI page for administrative control of various general settings for a customer profile division.
Figure 12B:
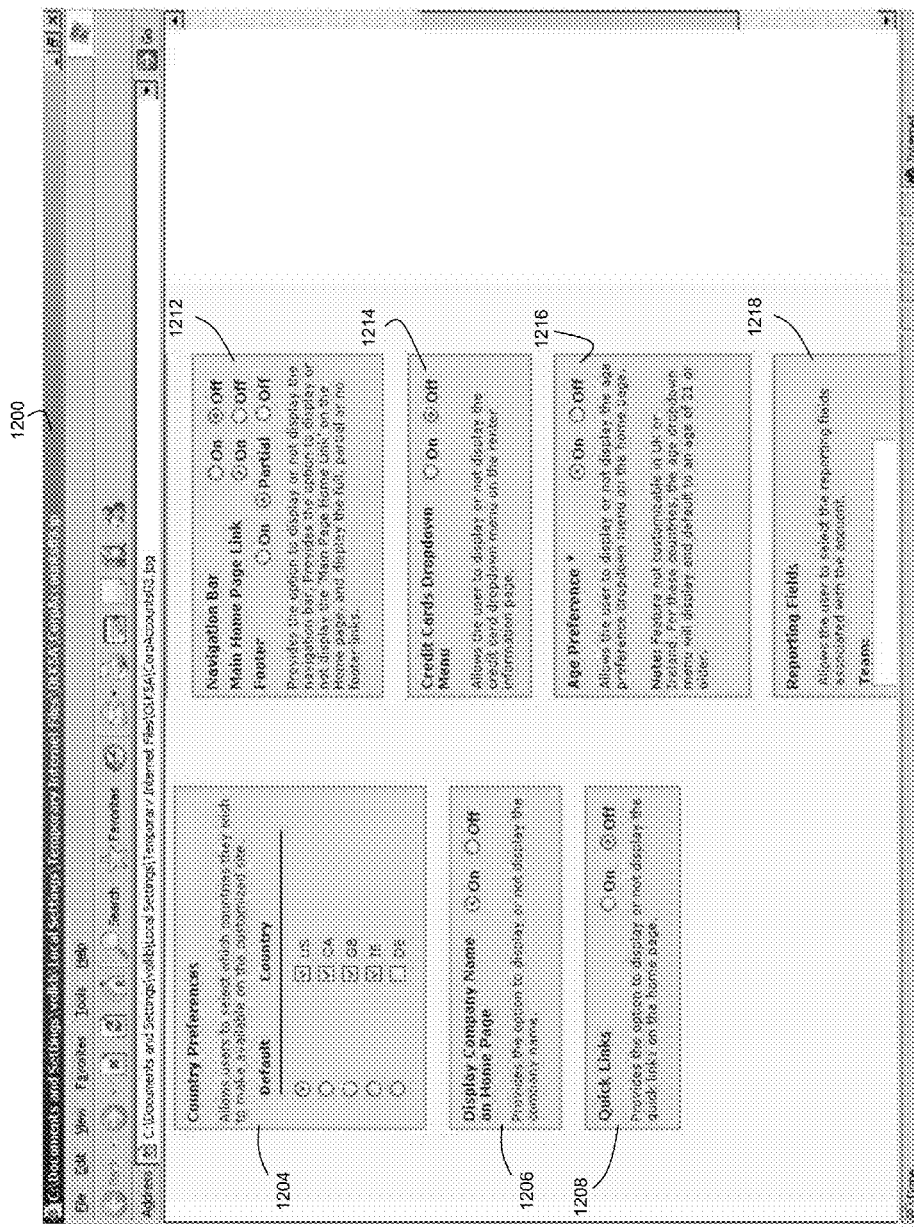
Figure 12C:
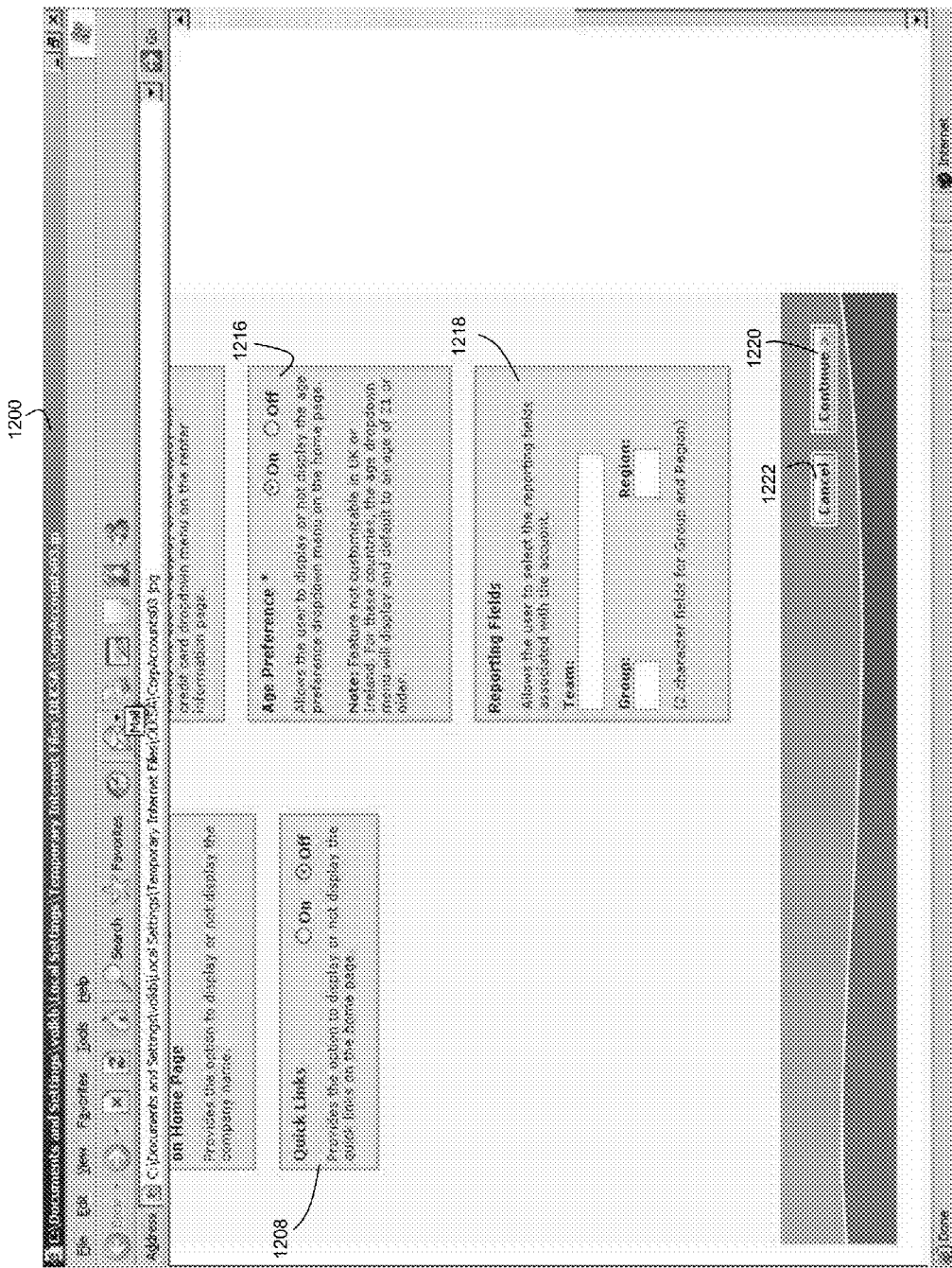

Page 1200 of FIGS. 12(*a*)-(*c*) comprises a plurality of sections through which the administrator can control various general features of a user's path through the website upon selection of a deep-link associated therewith. Page 1200 is displayed on the administrator computer when folder tab 1104 is active. Folder tab 1106 can be selected to display the vehicle control GUI of FIG. 13, folder tab 1108 can be selected to display the optional content control GUI of FIGS. 14(*a*)-(*c*), a folder tab 1110 for images can be selected to display the image control GUI of FIG. 15(*a*) or (*b*), and folder tab 1102 can be selected to display the summary GUI of FIGS. 11(*a*)-(*b*).

At the top of page 1200, biographical information about the customer profile division is displayed in fields 1112, 1114, 1118 and 1120 corresponding to fields 1010, 1012, 1022, and 1020 respectively of FIG. 10. For an existing customer profile division and a newly created customer profile division, section 1116 will identify the URL for the deep-linked page corresponding to the customer profile division.

Through section 1202, the administrator can specify which page of the website will be the deep-linked page for the customer profile division. Exemplary options include the home page or a page such as page 500 of FIG. 5 where a branch location has already been pre-selected for the reservation. Through field 1230, the administrator can pre-select the branch location for the division using a branch location identifier. Optionally, functionality can be added to the page that would allow the administrator to search and/or browse for the appropriate branch location from a list of all available branch locations.

Through section 1204, the administrator can control the countries in which the customer profile division will be accessible.

Figure 7:
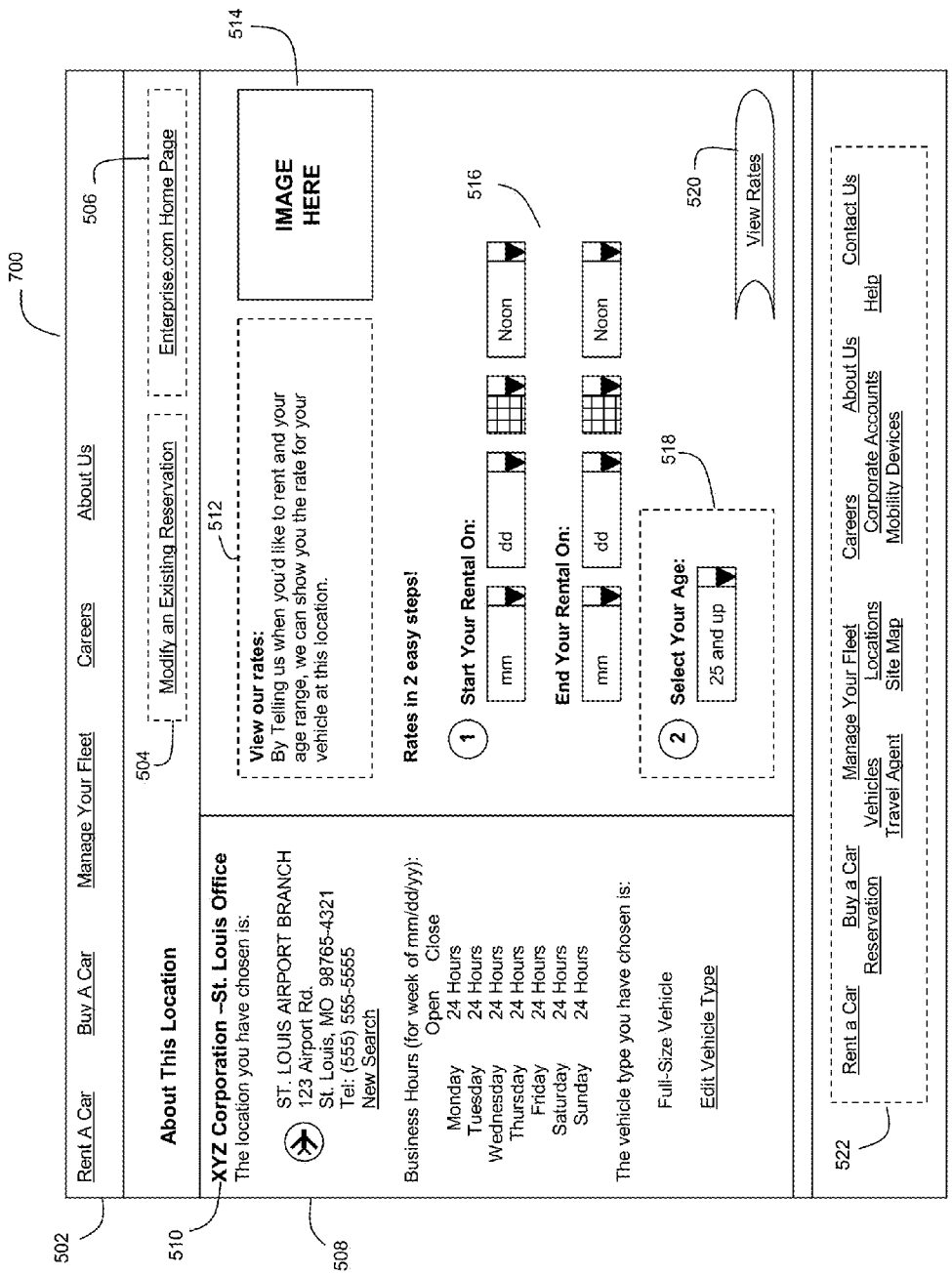
FIG. 7 depicts an exemplary deep-linked page reached after selection of a deep-link on the multi-division page of FIG. 6.
Figure 40:
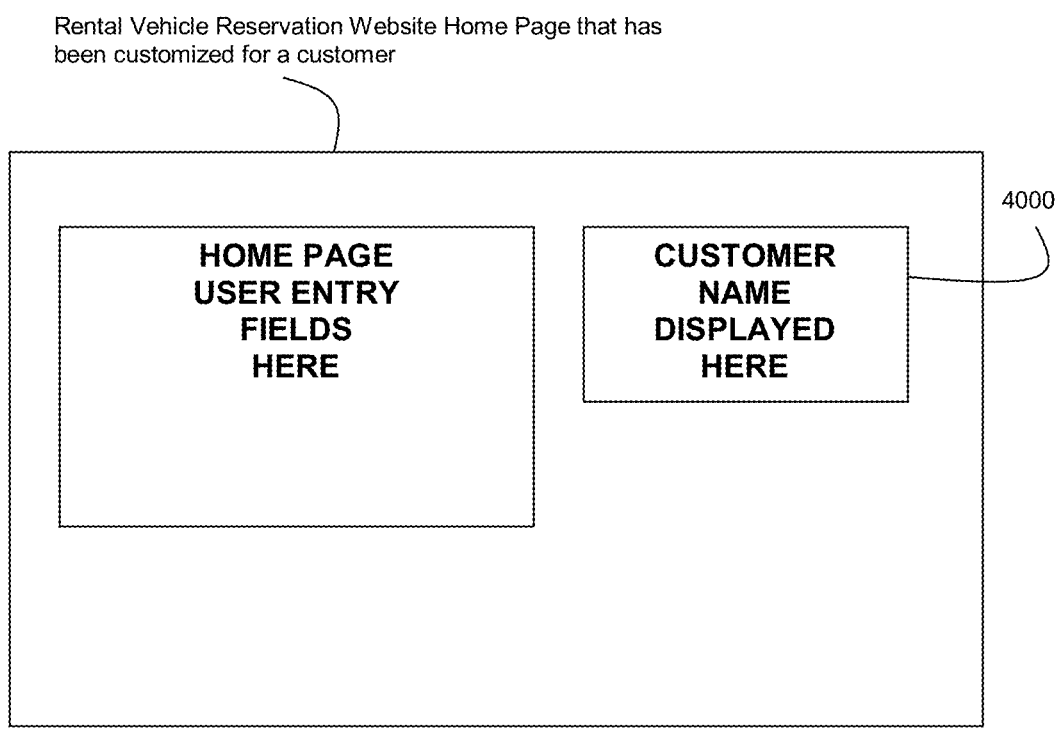
FIG. 40 depicts an exemplary home page that has been customized for a customer through a customer profile.

Through section 1206, the administrator can control whether the deep-linked page will display the customer's name in section 510 (see FIGS. 5 and 7). When the home page is selected as the deep-linked page through section 1202, the administrator can control, through section 1206, whether the customer name will appear in a pre-selected section of the home page such as section 4000 shown in the exemplary home page of FIG. 40. Optionally, section 1206 can also provide the administrator with the ability to enter text for a customized message to be displayed to users on the deep-linked page.

Through section 1208, the administrator can control whether certain navigational links will be displayed in section 522 of the deep-linked page (see FIGS. 5 and 7).

Through section 1210, the administrator can control the language of the deep-linked page.

Through section 1212, the administrator can control whether sections 502, 506, and 522 of the deep-linked page include the navigation bar links, footer links, and home page links. Moreover, the administrator can partially turn on the footer links in section 522 by controlling whether less than all of the footer links will be appear in section 522.

Through section 1214, the administrator can control whether the renter information (RI) page reached by a user who deep-links into the reservation creation process via the customer profile will include a drop down menu that allows the user to identify a credit card type for the reservation (see section 426 of FIG. 50(a) of the incorporated patent application Ser. No. 10/172,481).

Through section 1216, the administrator can control whether section 518 of the deep-linked page will include an age selection field.

Also, section 1218 can be used by the administrator to associate the customer profile division record with a team/group/region for reporting purposes.

Once the administrator has made the appropriate entries on page 1200, the user can select the continue button 1220 to proceed to the next GUI for administratively controlling a customer profile division. Alternatively, the administrator can select the cancel button 1222 to cancel the entries made in page 1200.

The administrator can learn of the customer's preferences for the customer profile division through communications with the customer. For example, the customer can fill out a form (either an electronic form or a hard copy form) that identifies its preferred reservation characteristics, and the administrator can then access the GUIs of FIG. 9 to implement the customer's requests. Alternately, it should be noted that the administrator need not necessarily be an employee of the rental vehicle service provider. In some instances, the administrator may be an employee of the customer who is given limited administrative access to the GUIs of FIG. 9 to control the parameters of the customer's profile in database 108.

Figure 13:
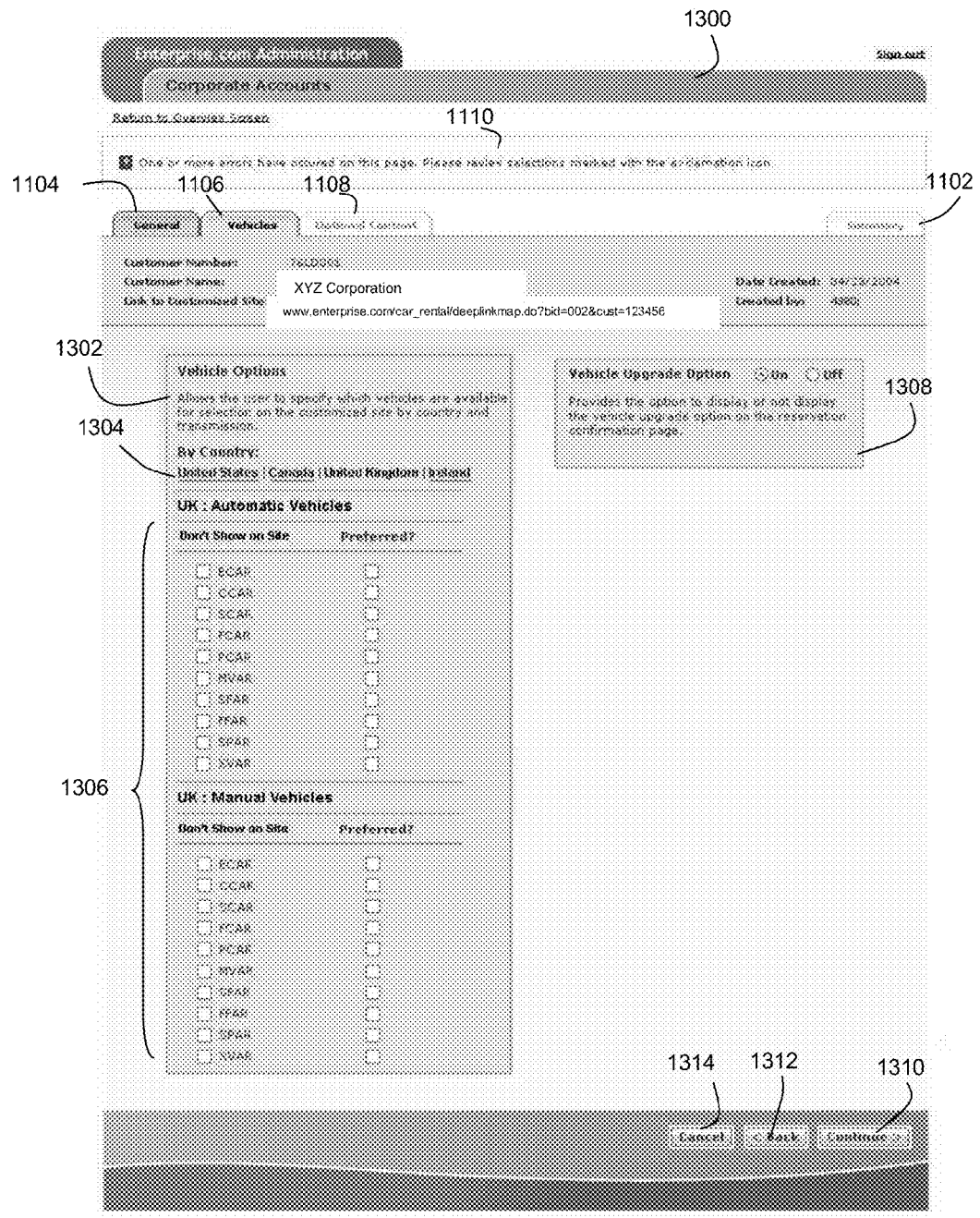
FIG. 13 depicts an exemplary GUI page for administrative control of various vehicle type settings for a customer profile division.

Upon administrator selection of the continue button 1220 of page 1200, the GUI page 1300 of FIG. 13 is displayed on the administrator computer (which corresponds to folder tab 1106). GUI 1300 is configured to accept administrator input regarding the vehicle types eligible for selection by a user through the customer profile division. Through section 1302, the administrator controls which vehicle type(s) will be eligible for user selection. Through country bar 1304, the administrator can make these selections on a country-by-country basis. For vehicle types that the administrator does not want to make available to the user, he/she can select the "don't shown on site" boxes corresponding thereto. If the administrator wants to highlight one or more vehicle types as preferred for the customer profile division, he/she can select the "preferred" boxes corresponding thereto. Selection of the preferred option for a vehicle type will operate to add highlighting of some form to the background of text displayed on a choose vehicle page for that vehicle type (such as the pages of FIGS. 42 and 43 in the incorporated patent application Ser. No. 10/172,481). If all vehicle types but one are selected in section 1306, then the reservation path for the deep-link corresponding to the customer profile division can skip a choose vehicle page because the vehicle type will have been pre-selected.

Through section 1308, the administrator can control whether a link will be included on a confirmation page that would allow the user to upgrade to the next higher vehicle class for the reservation (see FIG. 53 of the incorporated patent application Ser. No. 10/172,481).

Once the administrator has made the appropriate entries on page 1300, the user can select the continue button 1310 to proceed to the next GUI for administratively controlling a customer profile division. Alternatively, the administrator can select the back button 1312 to return to page 1200 or the cancel button 1314 to cancel the entries made in page 1300.

Figure 14A:
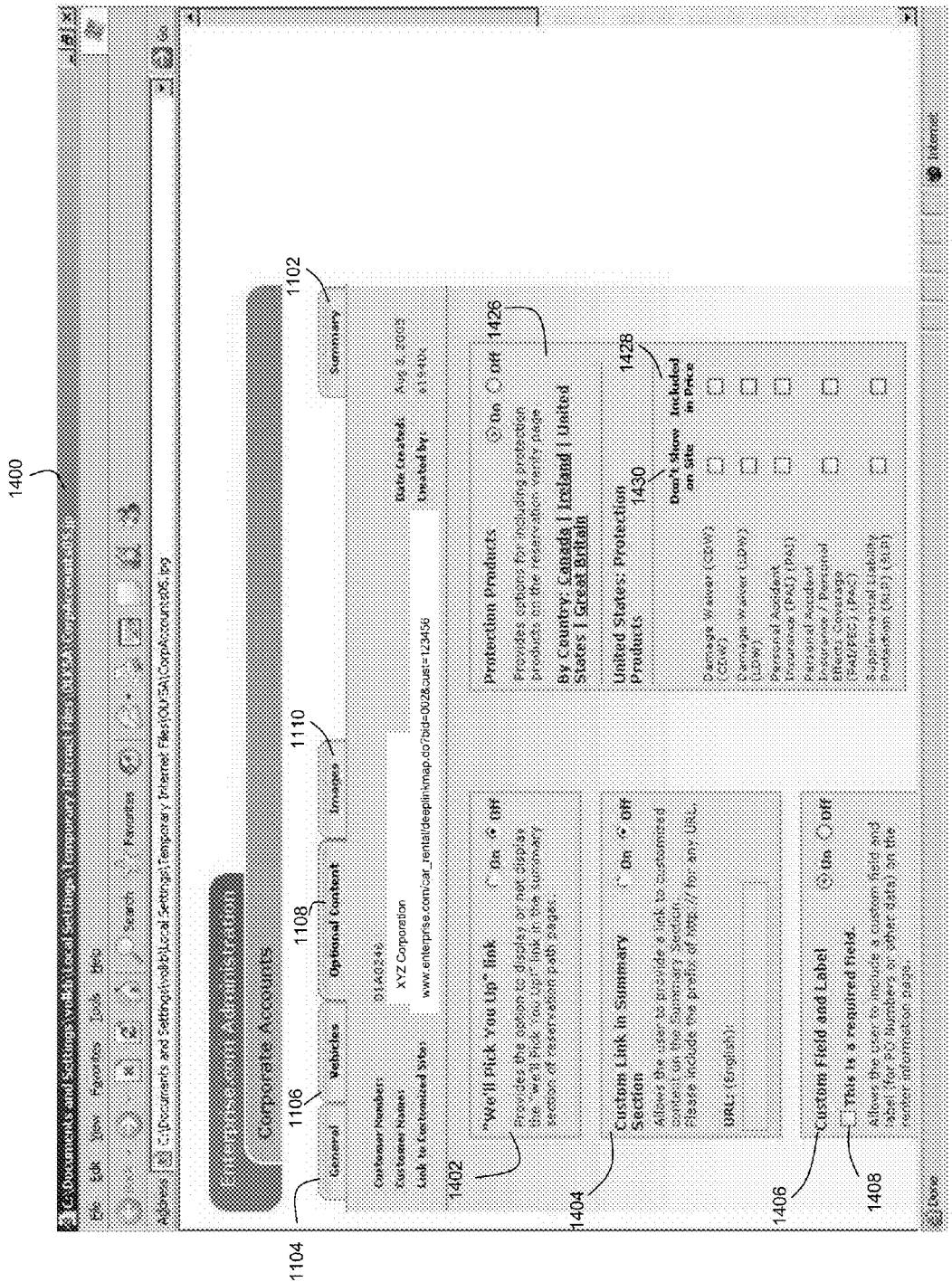
FIGS. 14(a)-(c) depict an exemplary GUI page for administrative control of various optional content settings for a customer profile division.
Figure 14B:
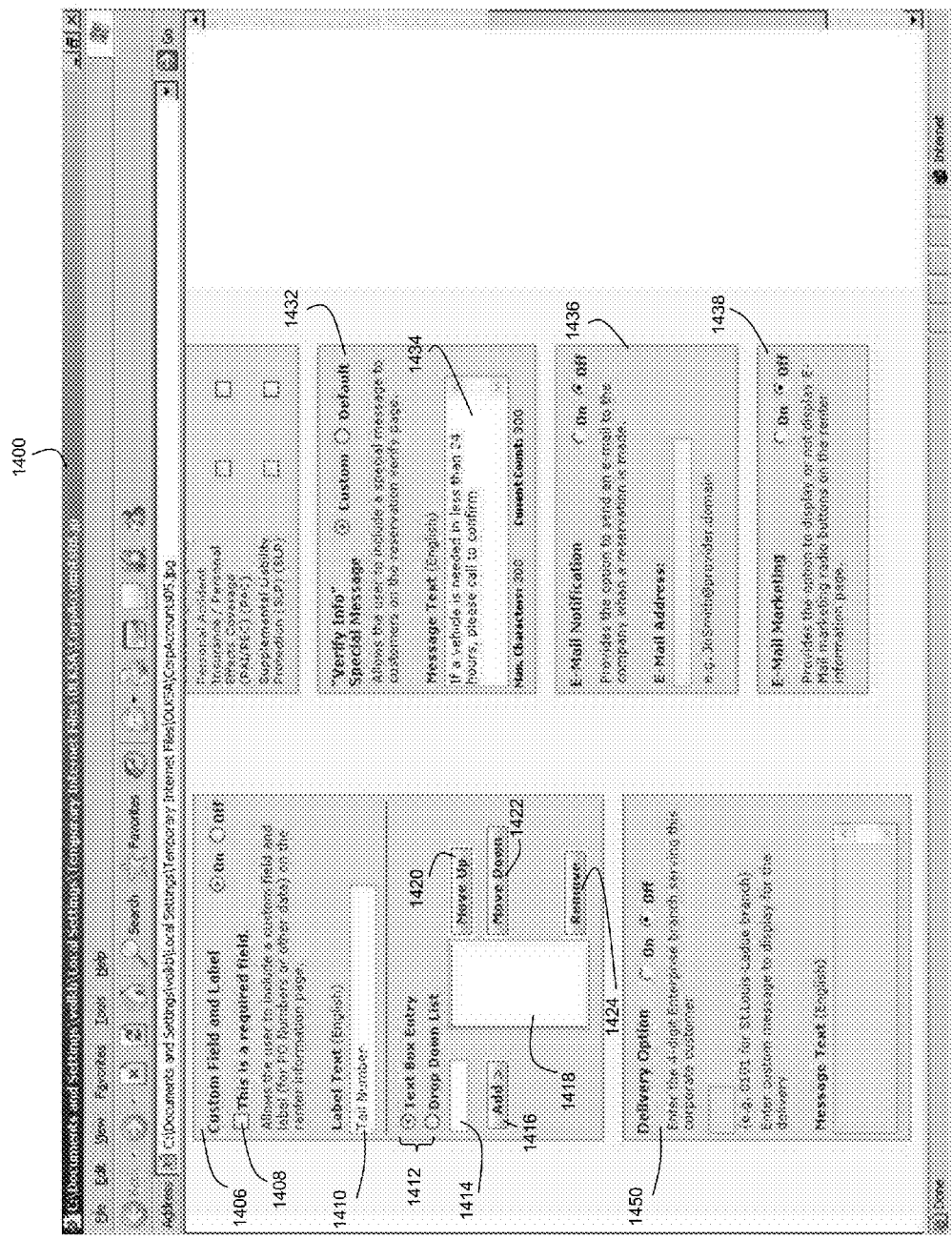
Figure 14C:
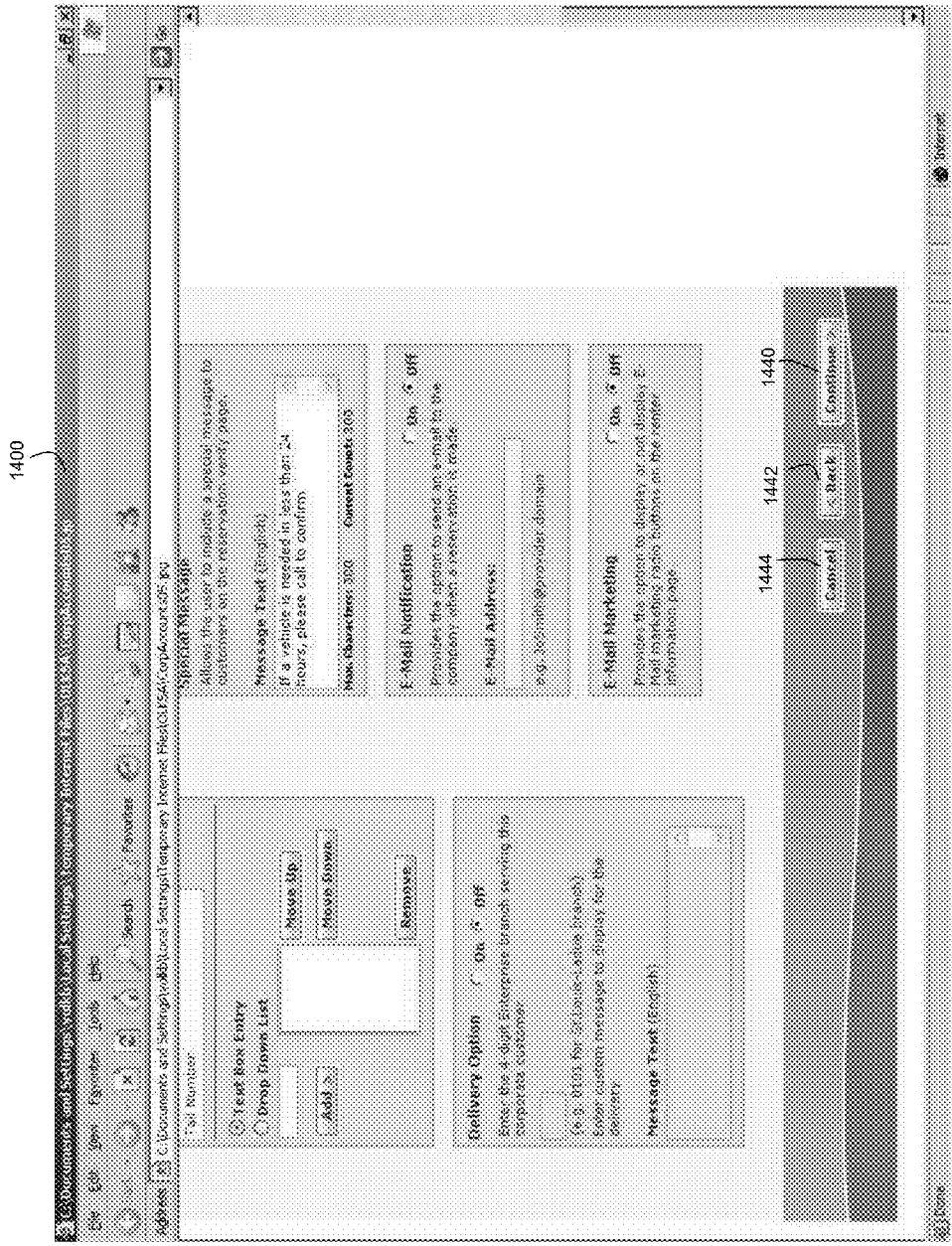

Upon administrator selection of the continue button 1310 of page 1300, the GUI page 1400 of FIGS. 14(*a*)-(*c*) is displayed on the administrator computer (which corresponds to folder tab 1108). Through the different sections of page 1400, the administrator has the option to control a variety of aspects of the customer profile division's reservation path. Through section 1402, the administrator can control whether the summary sections that are displayed on the reservation path pages (see, e.g., section 330 of FIG. 43 of the incorporated patent application Ser. No. 10/172,481) will display a promotional link that is user-selectable to display a text box that describes a service offered by the rental vehicle service provider.

Through section 1404, the administrator can control whether a link will be added to the summary sections that are displayed on the reservation path pages that is user-selectable to display a web page identified by the administrator-entered URL. Alternatively, such a link can also be a link to a text box with a customized message. If the administrator chooses to add such a customized text box link to the summary section, section 1404 would also preferably include a field in which the administrator can enter the customized message.

Through section 1406, the administrator can control whether the RI page of the reservation path (see FIGS. 50(a) and (b) of the incorporated patent application Ser. No. 10/172,481) will include a field for user entry of a customer purchase order number, reference number or the like. Such information can be useful for the customer's business office. Through box 1408, the administrator can control whether user entry in such a field is a required data entry field. Through field 1410, the administrator can define the label for this user entry field of the RI page. Moreover, through section 1412, the administrator can control whether the user entry field in the RI page will be a free form text entry box or a drop down menu populated with eligible field entry options. If the drop down menu option is chosen, the administrator can control the content of the drop down menu through field 1414, list 1418, and buttons 1420, 1422, and 1424.

Through section 1426, the administrator can control what collision and damage protection products will be identified on the user's verify page after booking a reservation (see FIGS. 51 and 52 of the incorporated patent application Ser. No. 10/172,481) In some instances, a customer profile will require that one or more particular collision and damage protection products be applied to all of that customer's rental vehicle reservations. Through column 1430, the administrator can select which of these protection products will be displayed to the user on the verify page as being included in the reservation. Through column 1428, the administrator can also control whether the price for the selected protection product(s) will be itemized in the itemized charges shown on the verify page. While the administrative control provided by section 1426 is informational only, it should be noted that in instances where the reservation path also includes a page that would allow the user to select a collision and damage protection product for the reservation, section 1426 could also be configured to allow the administrator to define which collision and damage protection product (or range of eligible protection products) are available for user selection for the reservation.

Through section 1432, the administrator can control whether a customized text message will be displayed on the verify page reached by the user through the customer profile division. The administrator can enter the text for this customized message in field 1434 (e.g., "Please remember to re-fill the gas tank prior to returning the car.").

Through section 1436, the administrator can control whether an email notification of a booked reservation should be automatically sent by the website to a person associated with the administrator-entered email address. This feature can be useful in instances where a customer entity may want personnel in the entity's business office to be notified of any new reservations booked through the entity's customer profile division.

Through section 1438, the administrator can control whether the RI page will include the user-entry sections relating to email marketing from the rental vehicle service provider (see FIG. 50(a) of the incorporated patent application Ser. No. 10/172,481). Some customers may want to have this feature disabled to prevent employees from signing up for such marketing emails.

Through section 1450, the administrator can control whether the deep-linked page (or another page in the reservation path after the user has reached the deep-linked page) will include a user-selectable option for the user to request delivery of the rental vehicle corresponding to the reservation to a delivery location. For some customers, the rental vehicle service provider may have an agreement that reserved rental vehicles will be delivered by the rental vehicle service provider to the customer's premises when the reservation is to be fulfilled. In such cases, the branch location that services that customer can be notified upon user selection of the "deliver to" option that the reserved rental vehicle will need to be delivered to the customer's premises at the start date/time for the reservation. Section 1450 can also include a text entry section for administrator input of a text message to accompany the "deliver to" option displayed on the verify and/or confirmation page. Optionally, section 1450 may also include a variety of other administrator-controlled settings relating to vehicle delivery. For example, the deep-linked page or other page controlled through section 1450 may include a field for user entry of a delivery time, and section 1450 may include an administrator option to enable/disable that feature. The customer and rental vehicle service provider may have an agreement to deliver rental vehicles to the agreed-upon location the night before the reservation is to begin so that the customer will be able to actually begin the reservation first thing the next morning. In such cases, the rental vehicle service provider and customer may agree that charges for the reservation will not begin until the next morning. Thus, through section 1450, the administrator can also exert control over when charges for the reservation are to begin (e.g., at delivery or at a certain time the next day when delivery occurs after a certain time). Similar to a "deliver to" option, the rental vehicle service provider and customer may also have an agreed vehicle recovery service, wherein rather than the customer returning the rental vehicle at the end of the reservation period to the rental vehicle service provider's branch location, an employee of the rental vehicle service provider will venture to pick up the rental vehicle from an agreed upon location (e.g., the customer's premises). Section 1450 can also be augmented to provide the administrator with control over whether user-selectable options for such a vehicle recovery service will be presented on the deep-linked page (or another page in the reservation path after the user has reached the deep-linked page). As with the "deliver to" feature, the vehicle recovery feature can also include user-customizable dates/times, and section 1450 provide the administrator with control over whether the user-customizable dates/times are enabled/disabled.

Once the administrator has made the appropriate entries on page 1400, the user can (1) select the continue button 1440 to proceed to the next GUI for administratively controlling a customer profile division, (2) select the "finished" button 1442 to complete jump to the summary page 1100 for the customer profile division, or (3) select the cancel button 1444 to cancel the entries made in page 1400.

Figure 15A:
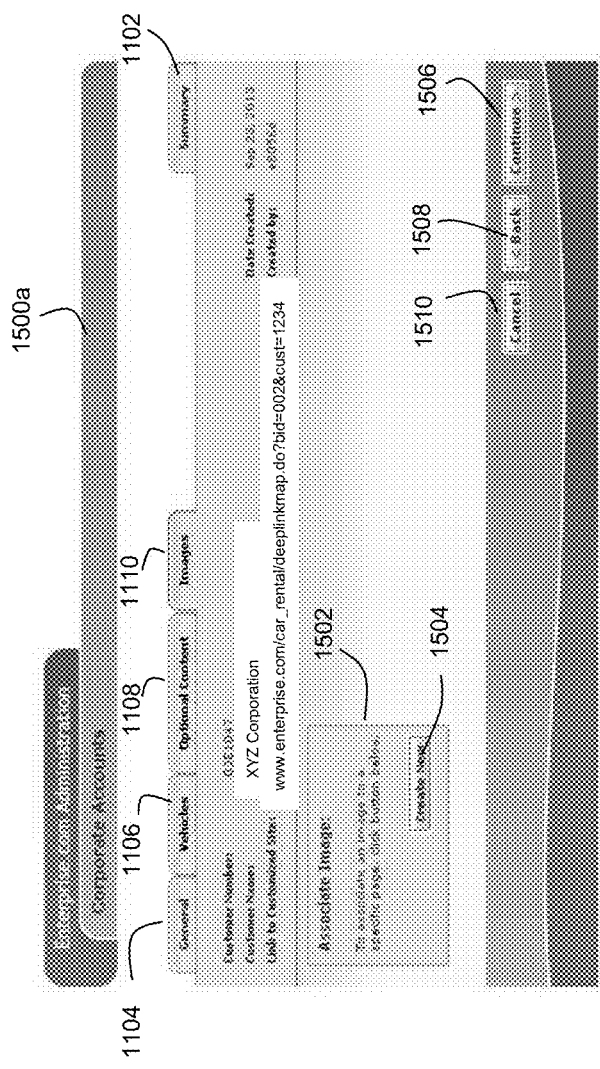
FIGS. 15(a), 15(b) and 16 depict exemplary GUI pages for administrative control of various image settings for a customer profile division.
Figure 15B:
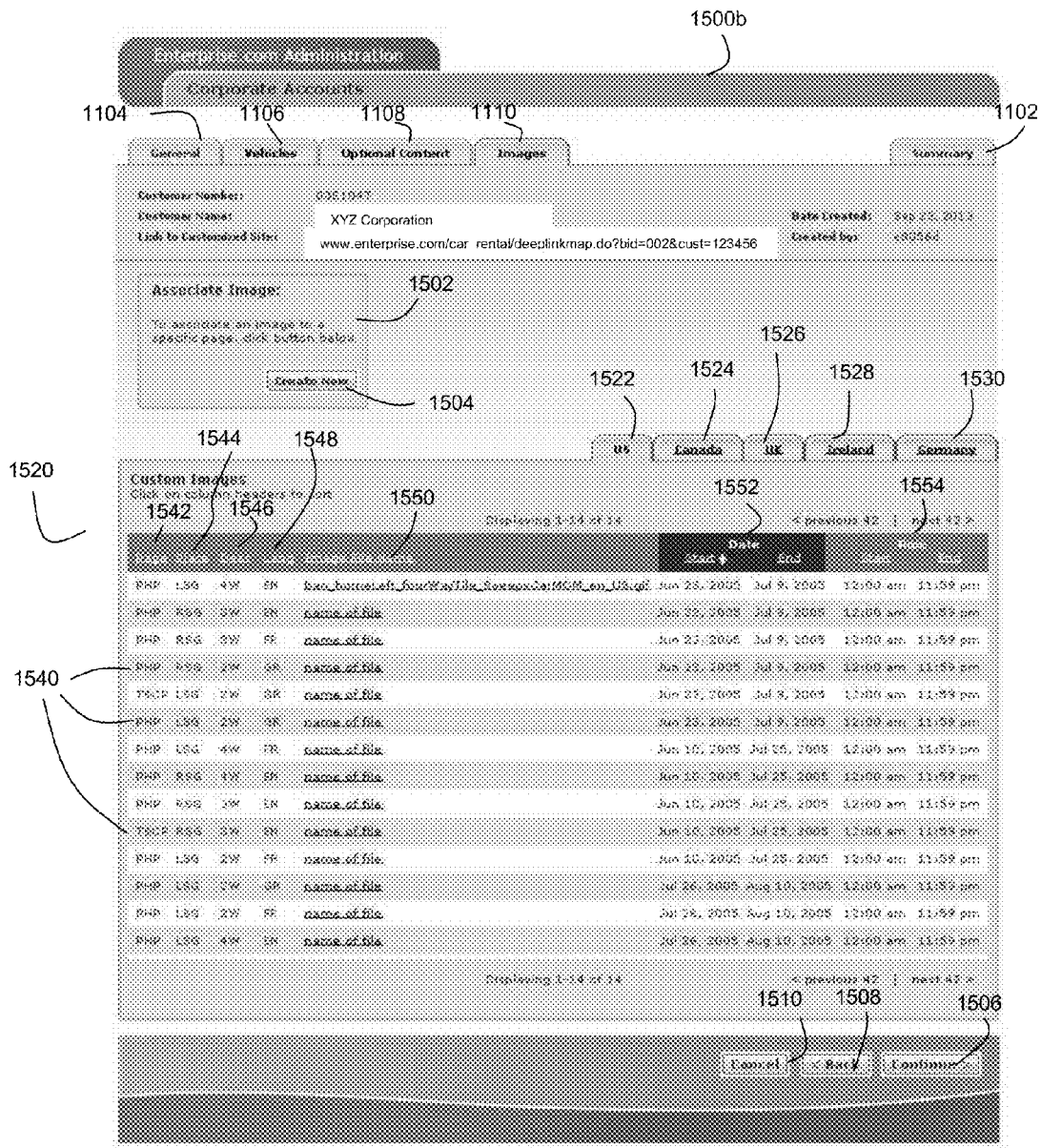

Upon administrator selection of the continue button 1440 of page 1400, the GUI page 1500*a* or 1500*b* of FIG. 15(*a*) or (*b*) is displayed on the administrator computer (which corresponds to folder tab 1110). Page 1500*a* of FIG. 15(*a*) would be displayed where no images had yet been associated with the customer profile division. Page 1500*b* of FIG. 15(*b*) would be displayed in instances where one or more images have already been associated with the customer profile division.

Page 1500*a* includes a section 1502 requesting the administrator to associate an image with the customer profile division. If the administrator wishes to do so, he/she can select the "Create New" button 1504. Otherwise, the administrator can (1) select the "continue" button 1506 to proceed to page 1100, (2) select the "back" button to return to page 1400, or (3) select the cancel button 1510.

Page 1500*b* also includes section 1502, but further includes section 1520. Section 1520 summarizes images 1540 that have already been associated with the customer profile division, segmented by country via tabs 1522, 1524, 1526, 1528, and 1530. Each image entry 1540 in section 1520 preferably includes a field 1542 that identifies the page of the reservation path that the image will appear on, a field 1544 that identifies a location on that page where the image will appear (preferably each page will have a plurality of predetermined locations in which images can be displayed), a field 1546 that identifies a size for the image location and a number of images to be displayed in that image location, a field 1548 that identifies the language for the image (preferably each image that includes text as part thereof will have multiple copies stored in the database, with each copy having its text in a different language supported by the website), a field 1550 that identifies the file name for the image, fields 1552 that identify starting and ending dates for the image (which can be useful for administrators to plan in advance which images will be displayed on the website and to prevent old and possibly out-of-date images from being displayed on the website), and fields 1554 in which times of day for the starting and ending dates are identified.

Figure 16:
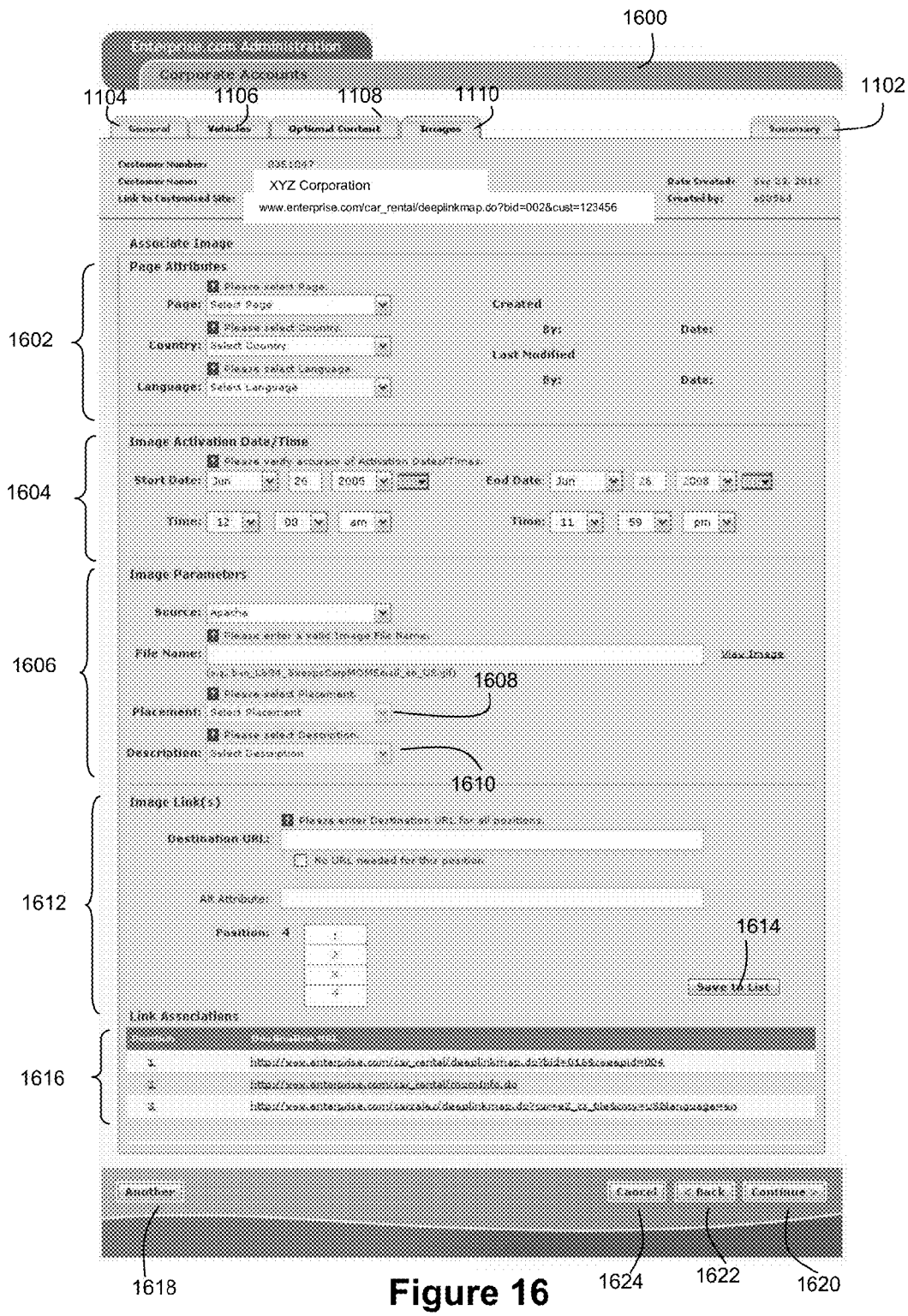

Administrator selection of the "create new" button 1504 will cause the display of GUI page 1600 of FIG. 16. Through section 1602, the administrator can control the page on which the image will be displayed, the country in which that image will be displayed on that page, and the language for the image.

Through section 1604, the administrator can control the starting/ending dates/times for image display on the page.

Through section 1606, the administrator can define which image will be associated with the page. Through the source field of section 1606, the administrator can identify a source for the image (e.g., the database in which the image is stored or a memory location for the image). Through the file name field, the administrator can identify the image's file name. Through field 1608, the administrator can control where on the page the image will be displayed. As noted previously, preferably the page includes a plurality of predefined available sections for image display, and through field 1608, the administrator can identify which of these sections is to include the image. Through field 1610, the administrator can select an image location size and the number of images to be displayed in that image location. Preferably, up to 4 images can be displayed in a given location.

Through section 1612, the user can define a URL link to be associated with a displayed image. If a link is associated with a displayed image through section 1612, the upon display of the image, the user can select the image and be linked to a web page associated with that image link. In instances where an image location will have multiple images included in that location, the administrator can set different links for each image in that location by advancing through the image location positions (by entering the link information for an image, selecting button 1614 and repeating that process for the next image). Table 1616 will identify the URL links that are associated with each image at each position of a given image location.

After defining the appropriate image display characteristics, the administrator, can select the "another" button 1618 to add the image with the specified display parameters to the customer profile division (whereupon those parameters are stored in database 108 and the image is added to section 1520 of FIG. 15(*b*)) and return to page 1600 to add another image. Once the administrator has completed adding images to the customer profile division, he/she can select "continue" button 1620 to advance to the summary page 1100. If the administrator wishes to return to page 1400, he/she can select "back" button 1622, and if the administrator wishes to cancel unsaved entries on page 1600, he/she can select the "cancel" button 1624.

After completing the GUI pages of FIGS. 12-16, the summary page 1100 of FIGS. 11(*a*)-(*b*) is preferably displayed on the administrator computer. Page 1100 preferably lists the administrator-defined settings for the customer profile division. Section 1122 summarizes the general settings defined through GUI page 1200. If the administrator wants to edit these selections, he/she can select the edit link 1124 to cause the display of page 1200. Section 1130 summarizes the vehicle settings defined through GUI page 1300. If the administrator wants to edit these selections, he/she can select the edit link 1132 to cause the display of page 1300. Section 1126 summarizes the optional content settings defined through GUI page 1400. If the administrator wants to edit these selections, he/she can select the edit link 1128 to cause the display of page 1400. Lastly, section 1136 summarizes the image settings defined through GUI pages 1500 and 1600. If the administrator wants to edit these selections, he/she can select the edit link 1134 to cause the display of page 1500.

If the administrator wants to cancel these settings before activation, he/she can select the "cancel" button 1142. If the administrator wants to return to the previous GUI page, he/she can select the "back" button 1140. If the administrator wishes to activate the customer profile division, he/she can select "activate" button 1138. Upon selection of the "activate" button 1138, the customer profile division becomes active and the URL for that customer division profile will serve as a deep-link into the website commensurate with the settings made by the administrator via pages 1200-1600.

As previously indicated in connection with FIGS. 4, 6, and 8, the administrator can further group together a plurality of customer profile divisions that have been created (preferably for the same customer entity) to create a multi-division page. The administrator can begin this process by selecting the multi-division link 1040 shown on page 1000 of FIG. 10. Administrator selection of link 1040 will drop the administrator into the multi-division flow 1700 of FIG. 17.

Figure 17:
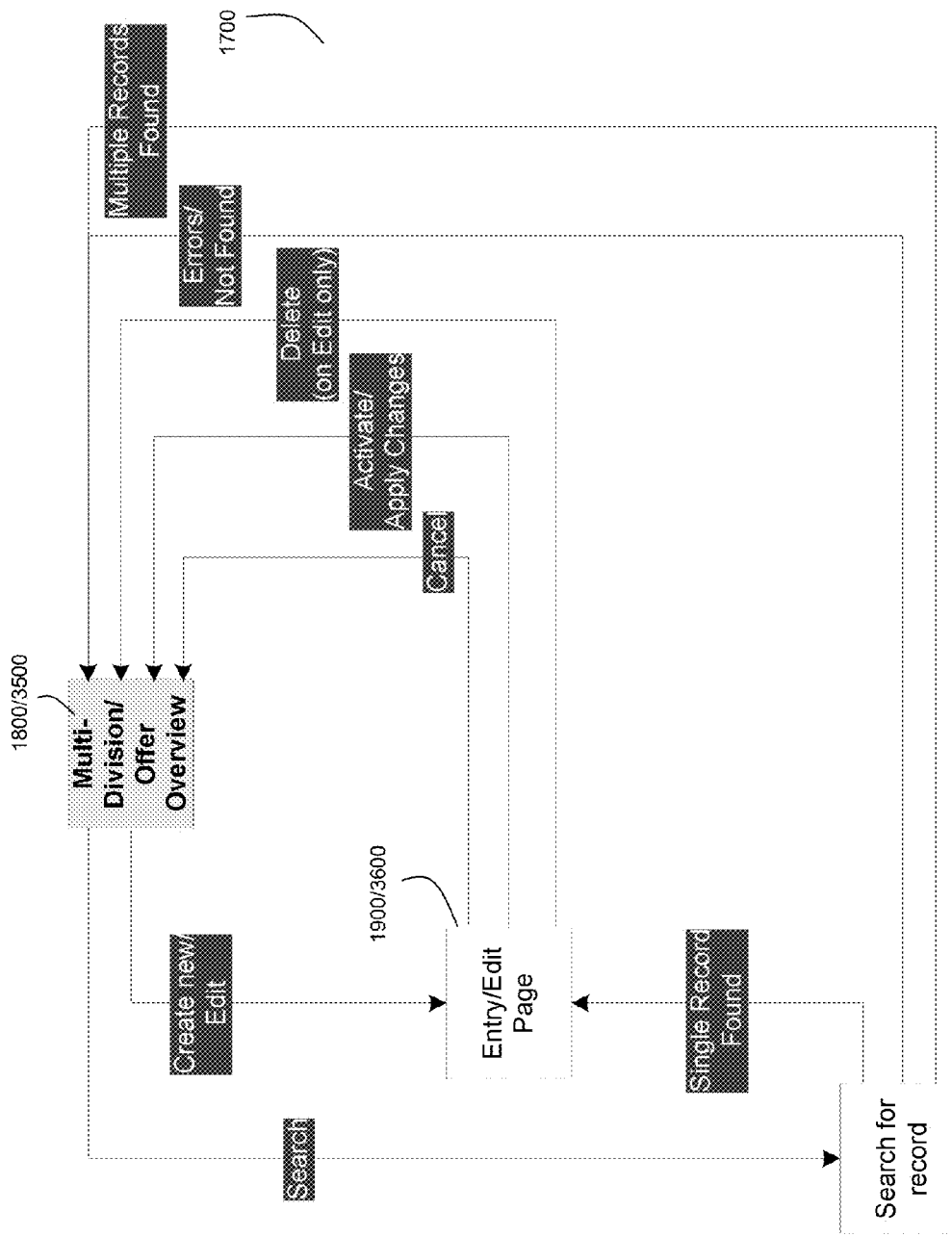
FIG. 17 is an exemplary high level flow diagram for the process of creating and administering a multi-division page for a customer profile.
Figure 18A:
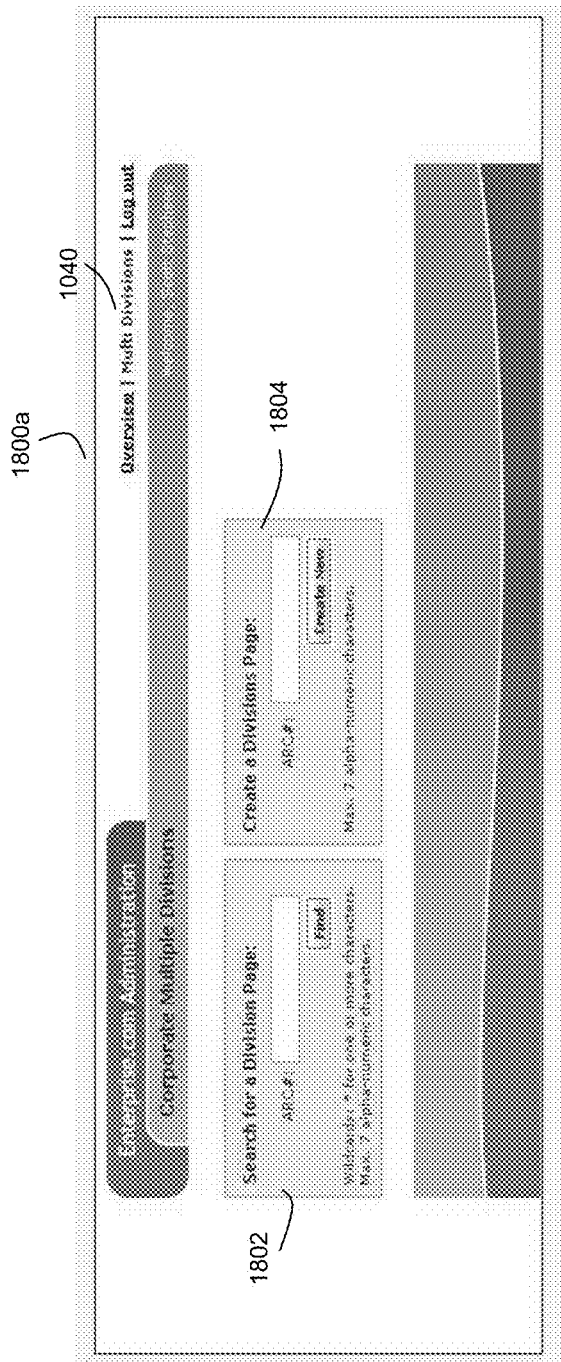
FIGS. 18(a) and (b) depict exemplary multi-division page creation overview GUI pages.
Figure 18B:
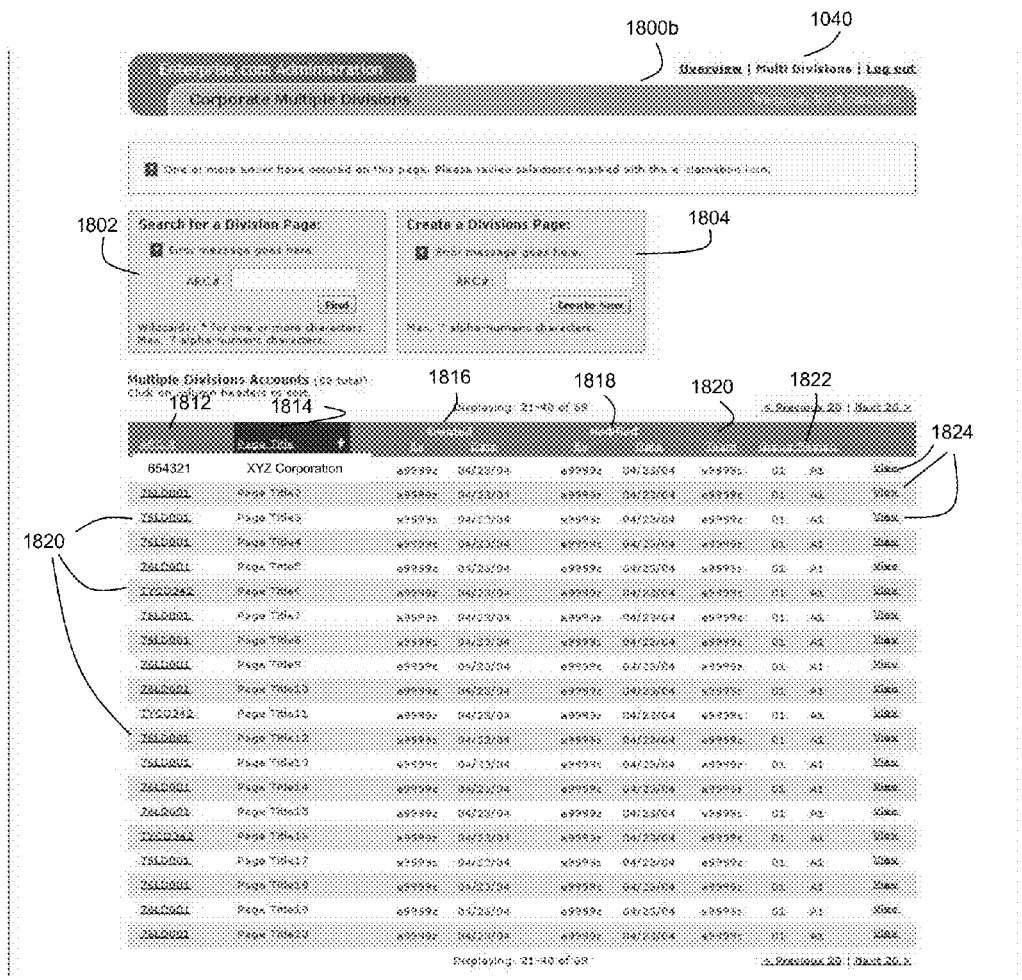

FIG. 17 is a flow diagram that describes the process of creating a multi-division page. The flow starts at GUI page 1800*a* or 1800*b*, as shown in FIGS. 18(*a*) and (*b*). The GUI page 1800*a* would be displayed upon administrator entry into the process of creating a multi-division page. The GUI page 1800*b* would be displayed if the administrator conducted a search for existing multi-division pages stored in database 108 using a wildcard operator in section 1802.

As noted, through section 1802 of page 1800*a*, the administrator can search for an existing multi-division page by a multi-division identifier. However, it should be noted that additional searching capabilities can be added to section 1802. The identifier used in the exemplary screenshots is labeled as an ARC number, which is not to be confused with the conventional ARC abbreviation used in the travel industry. With the multi-division aspect of the present invention, the ARC number refers to an identifier for a consolidated grouping of customer profile divisions.

Through section 1804, the administrator can begin the process of creating a new multi-division page by entering an identifier for such a new page.

Page 1800*b* of FIG. 18(*b*) also includes sections 1802 and 1804, but further includes section 1810 which lists previously-created multi-division pages 1820 that are stored in database 108. Each multi-division page entry 1820 listed in section 1810 includes a field 1812 for identifying each multi-division page's ARC number, a field 1814 for identifying the title of each multi-division page, a field 1816 for identifying when and by whom each multi-division page was created, a field 1818 for identifying when and by whom each multi-division page was last modified, fields 1820 and 1822 for identifying the team and group/region associated with each multi-division page (for internal reporting purposes), and "view" links 1824 that are selectable to display the corresponding multi-division page. Also, administrator selection of one of the ARC numbers in field 1812 will cause section 1802 to be populated with that ARC number, thereby allowing the administrator to begin an editing process for that multi-division page.

Figure 19A:
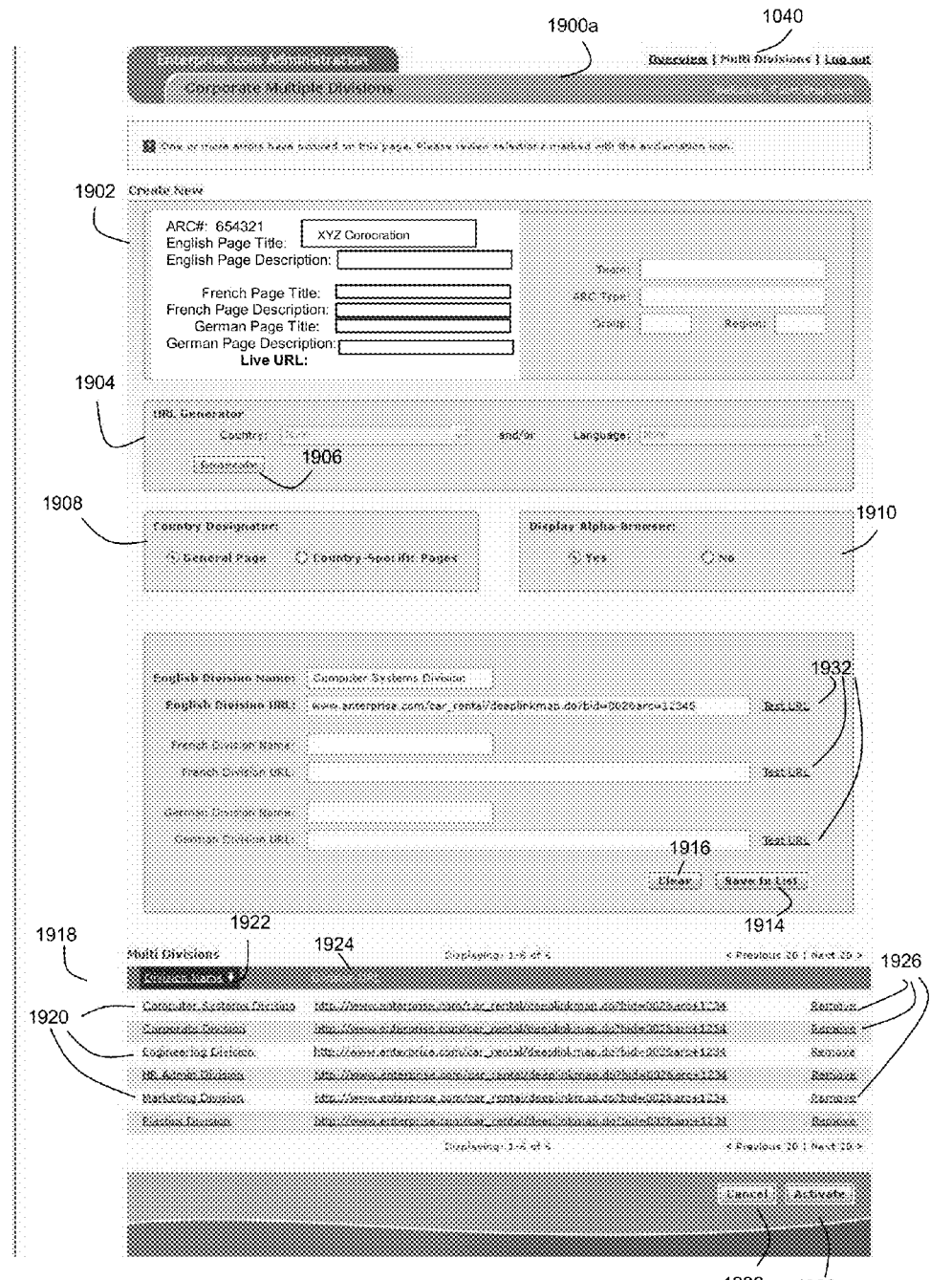
FIGS. 19(a)-(c) depict exemplary GUI pages for administrative control of a customer profile multi-division page.
Figure 19B:
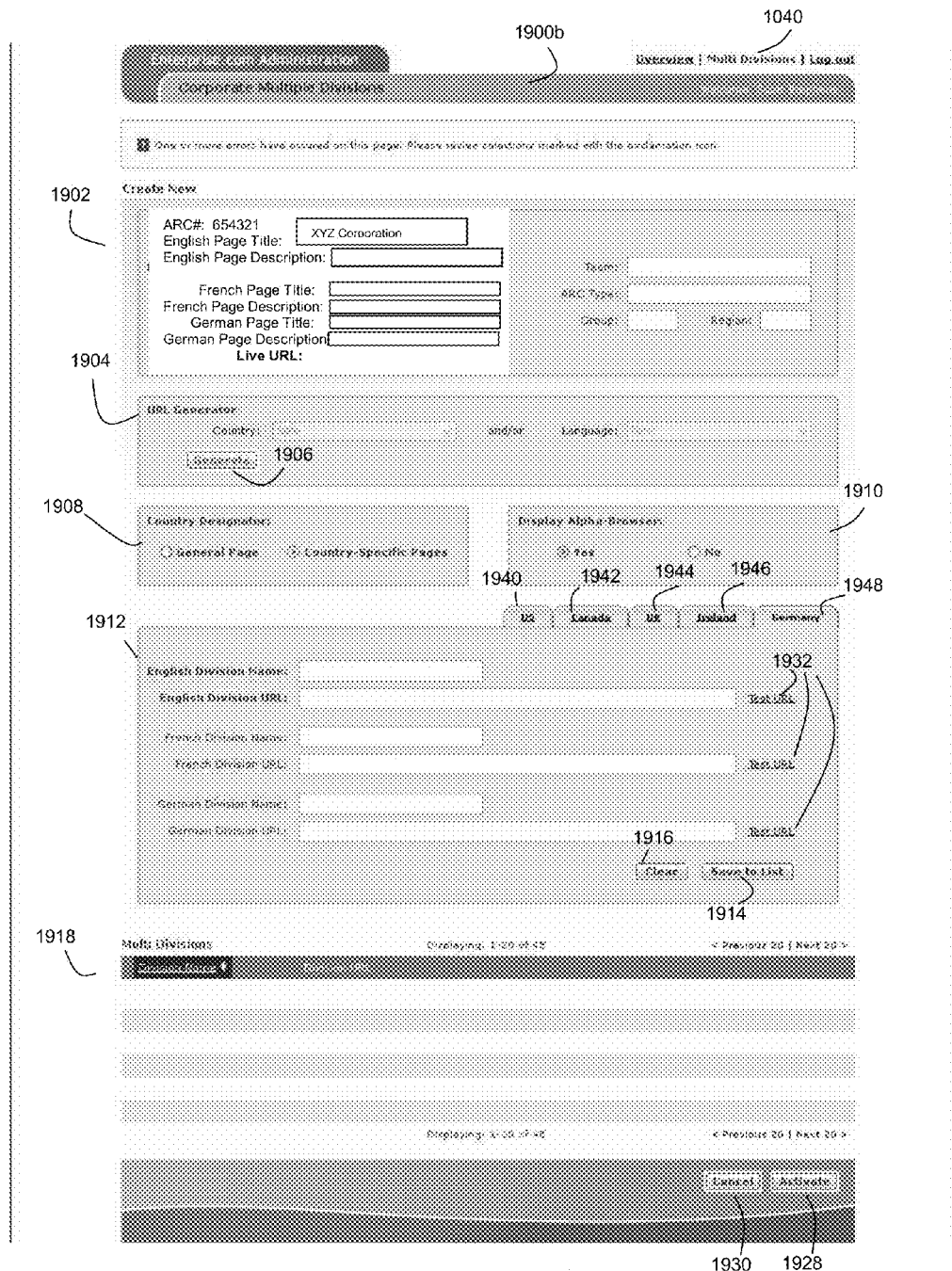
Figure 19C:
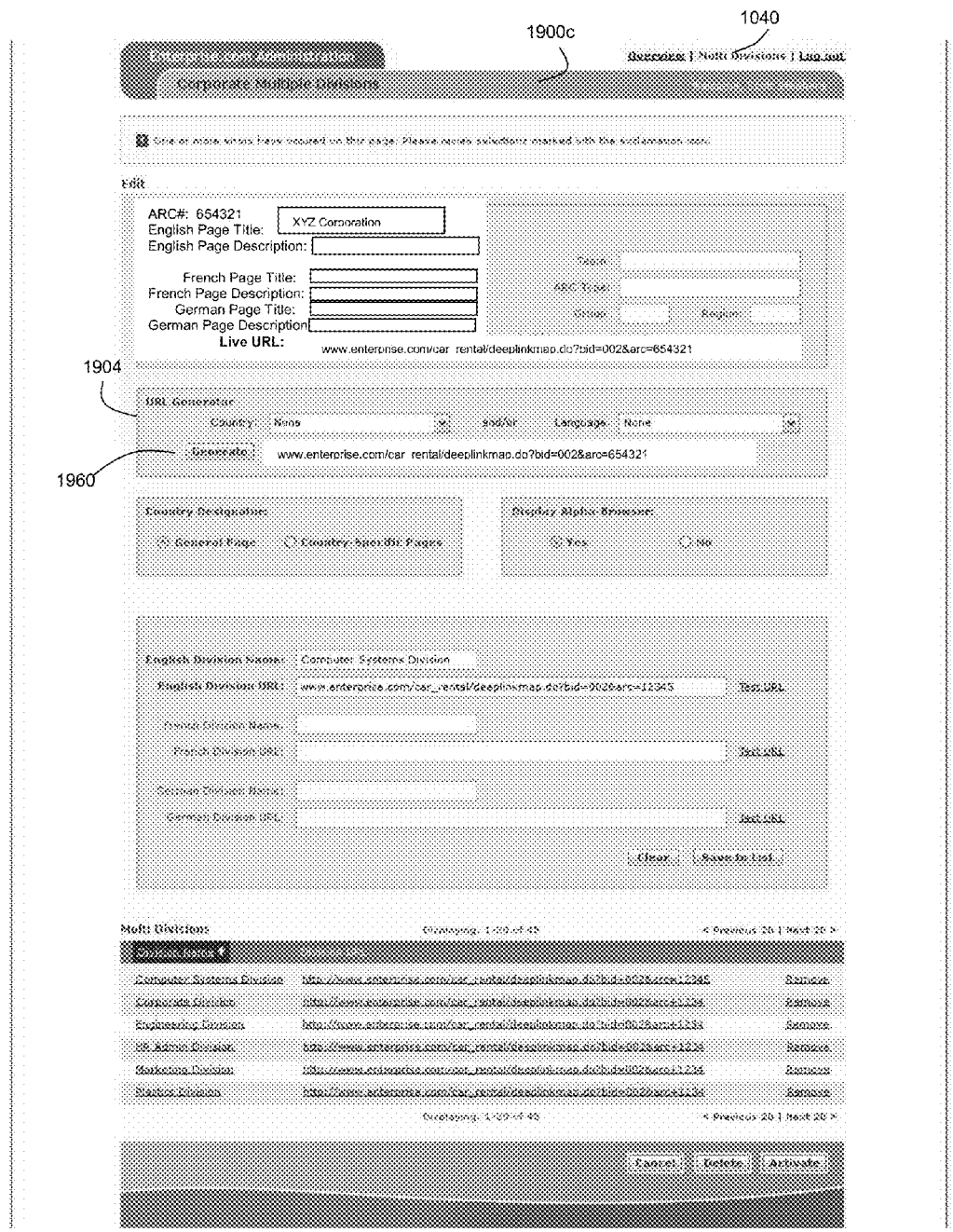

Upon administrator selection of the "create new" option in section 1804, the GUI page 1900*a* of FIG. 19(*a*) is displayed on the administrator computer. Through section 1902, the administrator can define the title for the multi-division page in any of a variety of languages. The text entered by the administrator in section 1902 will be the content that populates section 408 of the multi-division page (see FIGS. 4, 6 and 8). Preferably fields are provided not only for the displayed title of the page (e.g., the boldfaced and large font portion of the section 408 text) but also for a customized message for inclusion in section 508. Within section 1902, the administrator can also control the team, group/region, and ARC type (which can serve as a reporting label for related ARCs) that are associated with the multi-division page.

Through section 1904, the user can control the URL that will be used for the multi-division page on the website. Administrator selection of button 1906 is effective to create the URL using the coding techniques described in the incorporated patent application Ser. No. 10/505,685, wherein the ARC number serves as an additional distinguishing criteria in the URL for the multi-division page.

Through section 1908, the administrator can control the range of countries designated by the multi-division page.

Preferably section 1908 defaults as a general page applicable to all countries, but the user has the option of creating country-specific versions of the multi-division page (see GUI page 1900*b* of FIG. 19(*b*) that allows the administrator to create different versions of the page for different countries using tabs 1940, 1942, 1944, 1946, and 1948).

Through section 1910, the administrator can control whether section 406 of the multi-division page will include an alphabet navigation browser (see FIGS. 4, 6, and 8).

Through section 1912, the administrator can add divisions to be listed in sections 402 and links 404 of the multi-division page (see FIGS. 4, 6 and 8). The divisions that are to be added in section 1912 are preferably customer profile divisions that were previously created via the flow of GUI pages 1100-1600 as described in connection with FIG. 9. The text entered by the administrator in the "division name" field of section 1912 will be the text that appears in section 402 of the multi-division page. The URL entered in the division URL field of section 1912 will be the URL corresponding to link 404 in the multi-division page. Optionally, section 1912 can be configured with a browsing feature that will allow the administrator to search for existing division URL's for loading into the URL field of section 1912. The "test URL" links 1932 are preferably selectable to display the deep-linked page corresponding to the URL entered in the URL field of section 1912, thereby confirming for the administrator that the proper URL has been entered. Once the administrator has completed the entries in section 1912, selection of the "save to list" button 1914 will be effective to add that division and URL to the multi-division page. Administrator selection of the "clear" button 1916 is effective to clear the entries from section 1912.

It should be noted that it is preferred that the administrator not be limited to entering previously created customer profile divisions and customer profile division URLs in section 1912. The administrator can also use the URL for another multi-division page as the URL in section 1912, in which case the multi-division page will include a link to another multi-division page, as described above in connection with FIGS. 4 and 6 where the multi-division page of FIG. 4 includes a link to the multi-division page of FIG. 6. This functionality can be achieved through GUI page 1900*a* as follows: when the administrator is adding the division names and URLs to the multi-division page of FIG. 4, the administrator can add an entry in section 1912 with the name "St. Louis Office" and with the URL being a URL to the multi-division page of FIG. 6. Administrators can also include deep-links to promotional offers in section 1912. Further still, the administrator can preferably add links for other websites to the multi-division page, as described in connection with FIG. 6 wherein a link to an airline ticket website is included. This functionality can be achieved through GUI page 1900*a* as follows: when the administrator is adding the division names and URLs to the multi-division page of FIG. 6, the administrator can add an entry in section 1912 with the name "Airline Tickets" and with the URL being a URL to airline ticket reservation website.

Upon selection of button 1914, the division and its URL are added to the list of section 1918. Section 1918 lists as entries 1920 all divisions and their corresponding URLs that are to be included on the multi-division page. Each entry 1920 includes a field 1922 that identifies the division name (i.e., the content of section 402), a field 1924 that identifies the division URL (i.e., the URL for link 404), and a link 1926 that is selectable to remove the corresponding division and URL from the list.

To add additional divisions and URLs to the list in section 1918, the administrator can enter additional division names and URLs in section 1912 and once again select button 1914. Once the administrator has completed the process of adding divisions and URLs to the multi-division page, he/she can select the activate button 1928 to store the settings for the multi-division page in database 108 and make it active for use by users. Administrator selection of the cancel button 1930 will be effective to cancel the entries made via page 1900*a*.

GUI page 1900*c* of FIG. 19(*c*) will be displayed on the administrator computer upon selection of an existing multi-division page for editing via section 1802. Page 1900*c* differs from page 1900*a* in that the administrator can create a plurality of duplicate multi-division pages for each country and/or language identified in the country and language fields of section 1904. Thereafter, the administrator can adjust the duplicated page as appropriate to correspond to the applicable country/language. Otherwise, page 1900*c* operates in the same manner as page 1900*a*.

Figure 20:
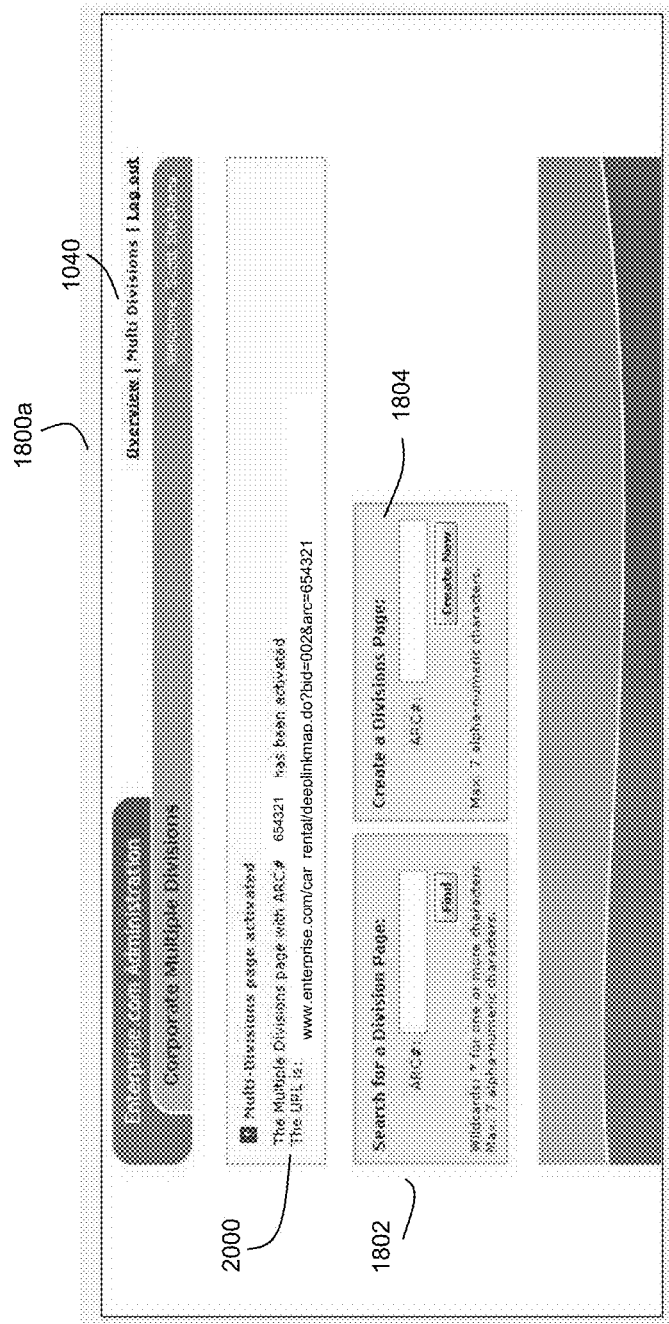
FIG. 20 depicts an exemplary GUI page displayed after an administrator has activated a multi-division page.

Upon administrator activation of a multi-division page via button 1928, page 1800*a* is once again displayed with an additional section 2000 that notifies the administrator of the activation, as shown in FIG. 20. Once activated, the rental vehicle service provider can provide the URL for the multi-division page to the relevant customer entity. Thereafter, the customer entity can provide this URL to its personnel who need to book rental vehicle reservations by making the URL available an intranet site operated by the customer entity. Thereafter, users with access to the customer entity's customer profile can take advantage of the multi-division page when booking rental vehicle reservations as described in the flow of FIG. 3.

Figure 21:
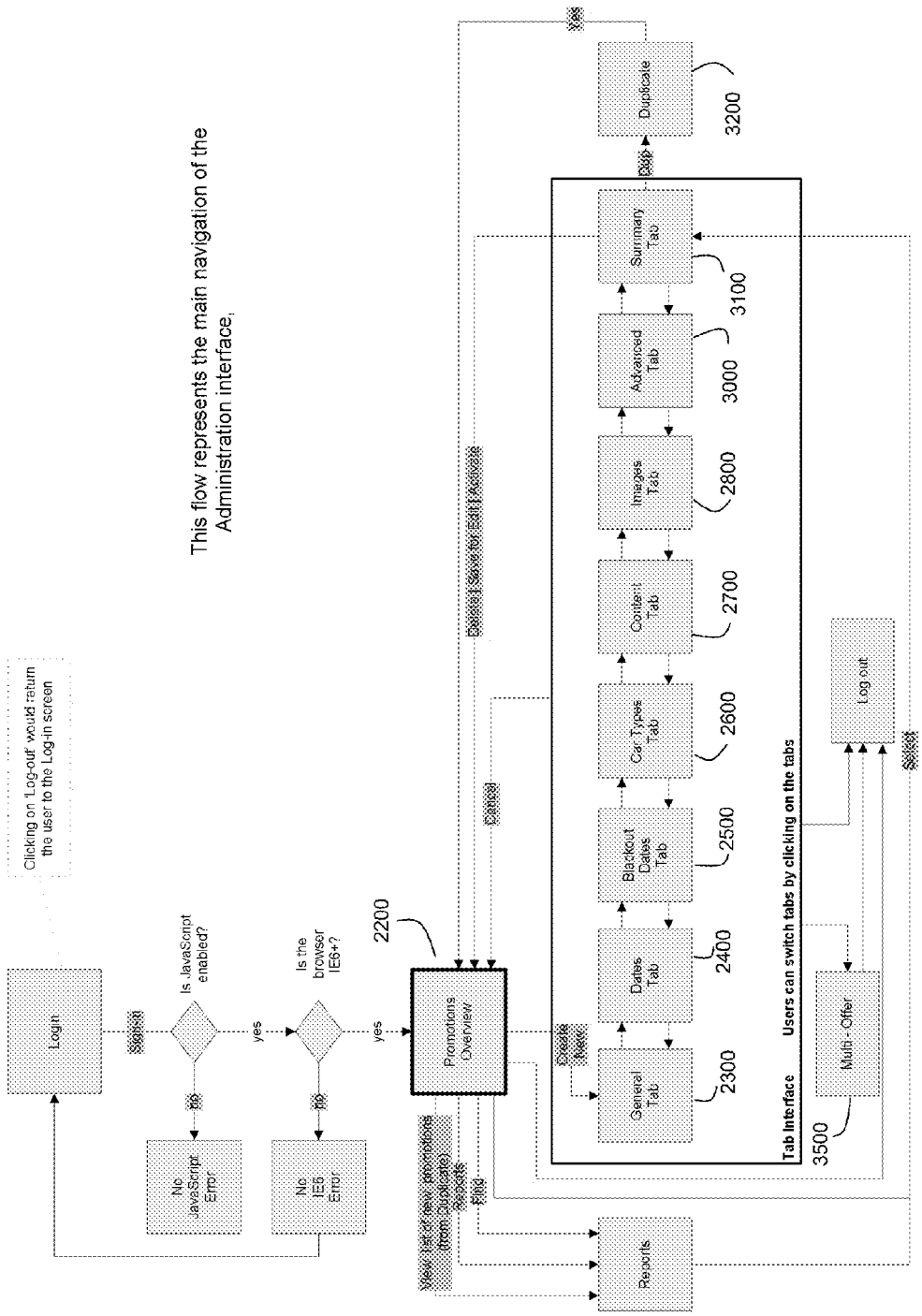
FIG. 21 is an exemplary high level flow diagram for the process of creating and administering promotional offer deep-links and multi-offer pages.

In addition to providing administrative control over customer profile divisions and multi-division pages, the present invention can also be used to provide administrative control over promotional offers and multi-offer pages. FIG. 21 describes the administrative flow for this process. After the administrator has signed in to establish his/her authorization to administer promotional offers, the administrator reaches page 2200.

Figure 22:
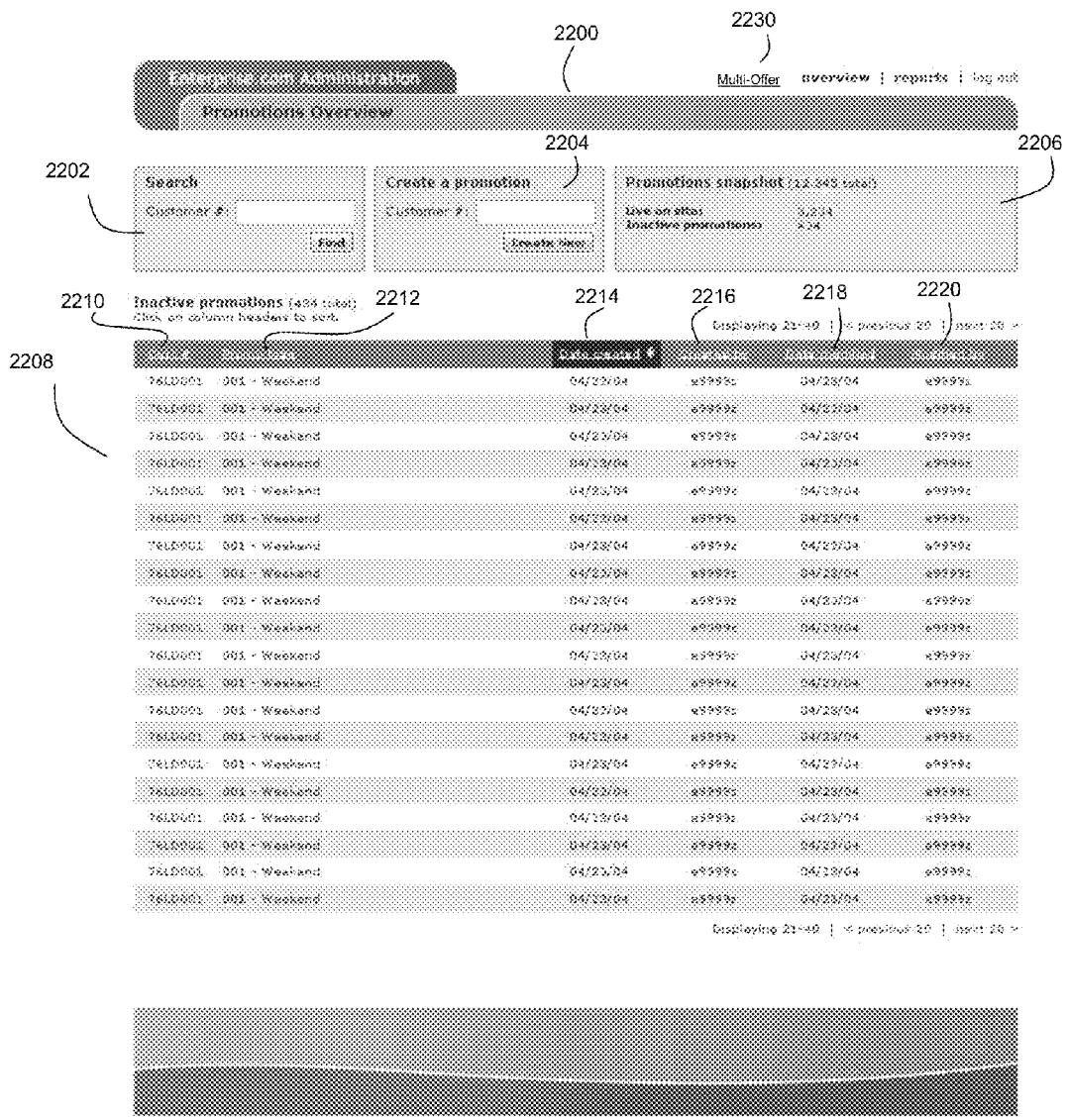
FIG. 22 is an exemplary GUI page providing an administrator with an overview of existing promotional offers.

FIG. 22 shows an exemplary GUI page 2200 that is configured to provide an overview of the promotional offers stored in database 108. Through section 2202, an administrator can search for existing promotional offers by an offer number. While the example of FIG. 22 labels this offer number as a customer number, it should be noted that the customer number in this context is an identifier for a promotional offer. Through section 2204, the administrator can also initiate the creation of a new offer by entering a number for the new offer. Section 2206 provides the administrator with a snapshot of promotional offers stored in database 108, both active and inactive.

Section 2208 lists the promotional offers stored in database 108. Each entry on the list is a promotional offer, including a field 2210 for the promotional offer number, a field 2212 for identifying each offer's promotion type, a field 2214 for identifying the date on which each promotional offer was created, a field 2216 for identifying the person who created each promotional offer, a field 2218 for identifying the last date on which each promotional offer was modified, and a field 2220 for identifying the person who last modified each promotional offer.

Figure 23:
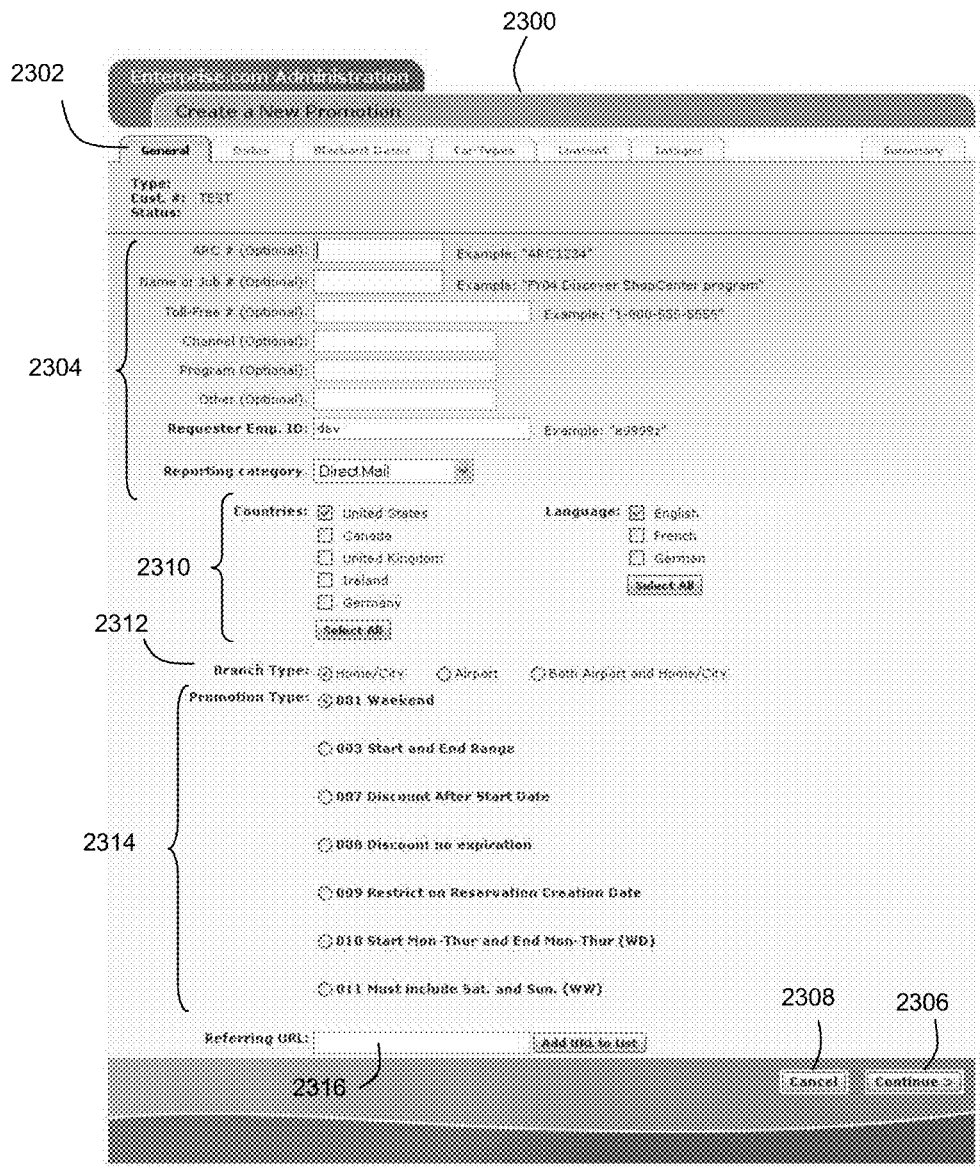
FIG. 23 depicts an exemplary GUI page for administrative control of various general settings for a promotional offer.

Upon administrator selection of either an existing offer or the creation of a new offer, the GUI page 2300 of FIG. 23 is displayed. Folder tab 2302 is active when page 2300 is displayed. Through section 2304, the administrator can control a variety of aspects of a promotional offer that can be used for internal reporting purposes.

Through section 2310, the administrator can control the applicable country and/or language for the promotional offer.

Through section 2312, the administrator can define the pre-selected branch location for the promotional offer.

Through section 2314, the administrator can define the type for the promotional offer. Preferably, the rental vehicle service provider will offer a plurality of different types of promotional offers, each typically having some form of restriction on the dates of use. Section 2314 lists a plurality of exemplary reservation types, whose characteristics can in turn be controlled through the GUI pages of FIGS. 24(*a*)-(*g*).

Through section 2316, the administrator can define the URL from which a user who is attempting to accept a promotional offer must be referred for the promotional offer to be validly accepted by the user. In this manner, the administrator can restrict the range of potential users who book a promotional offer reservation by restricting the promotional offer reservation to only those users who are referred to the deep-linked page for the promotional offer from the specified URL.

Figures 24A, 24B:
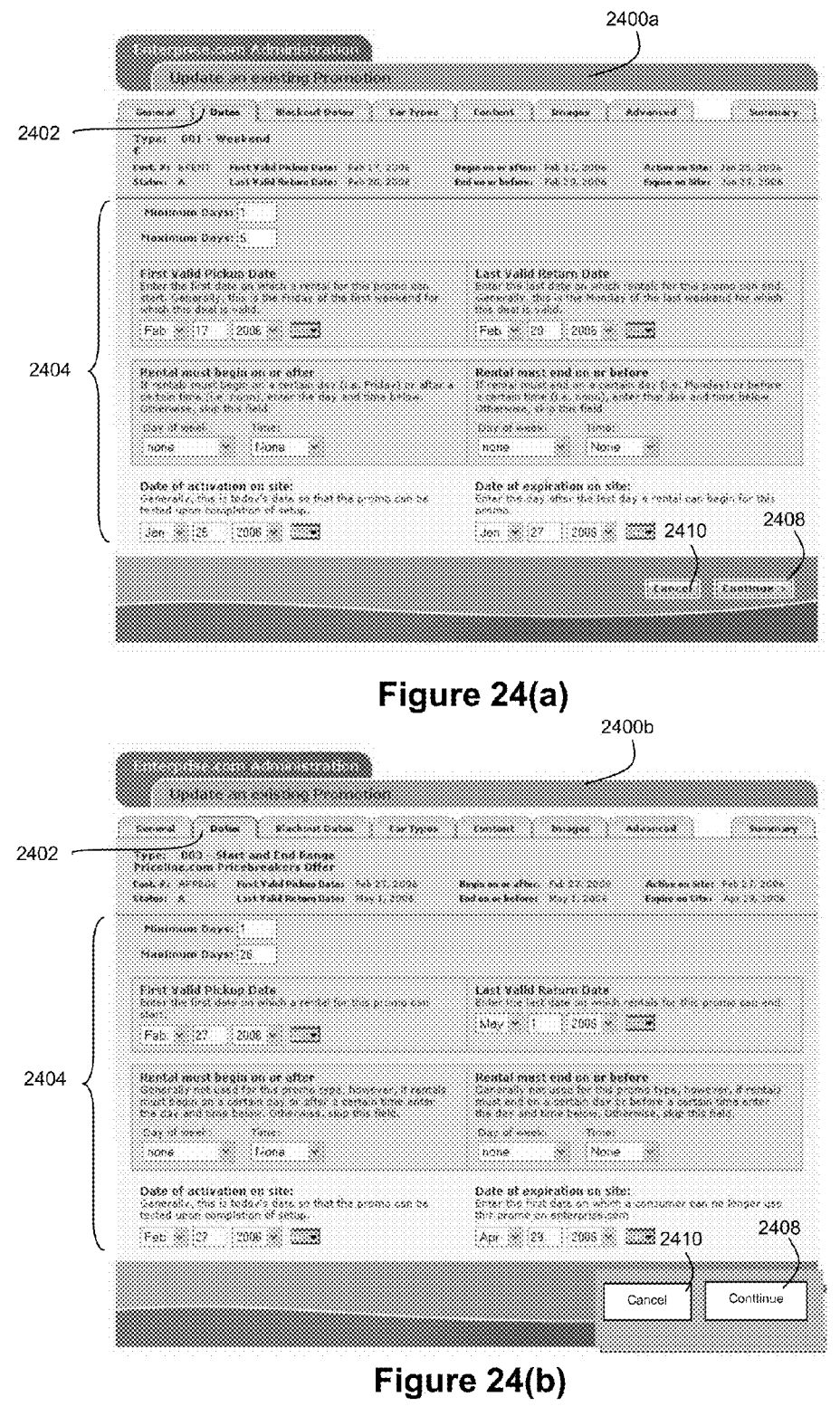
Figure 24C:
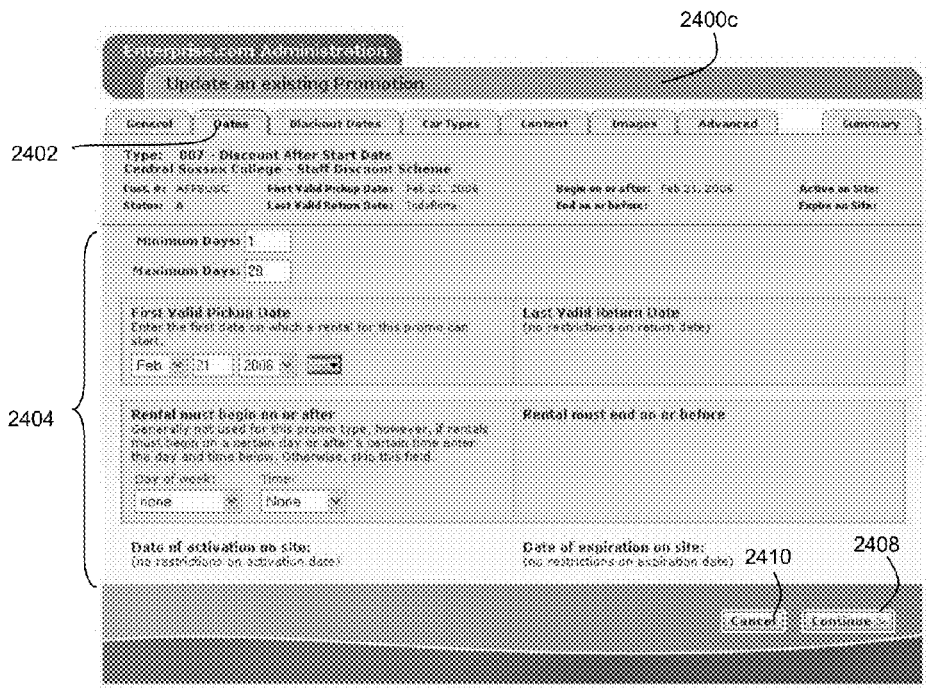
Figure 24D:
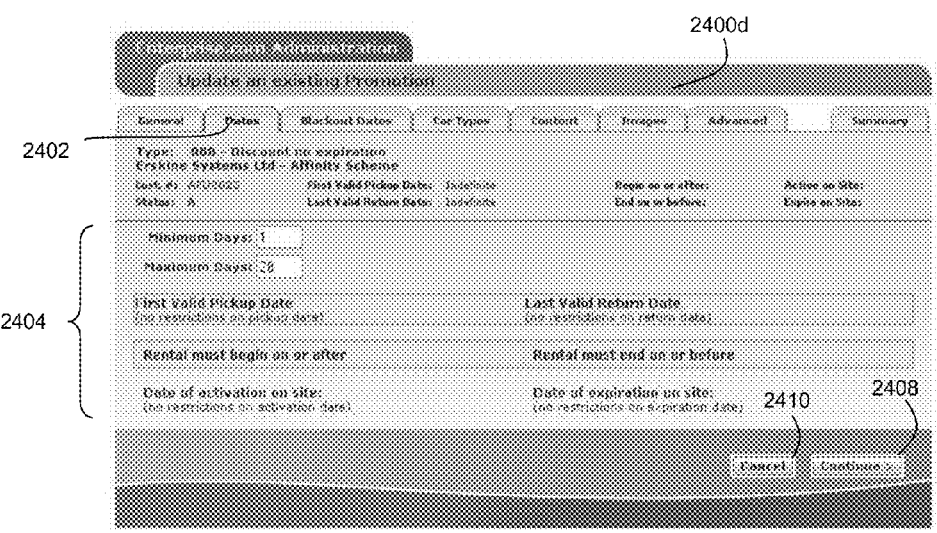
Figures 24E, 24F:
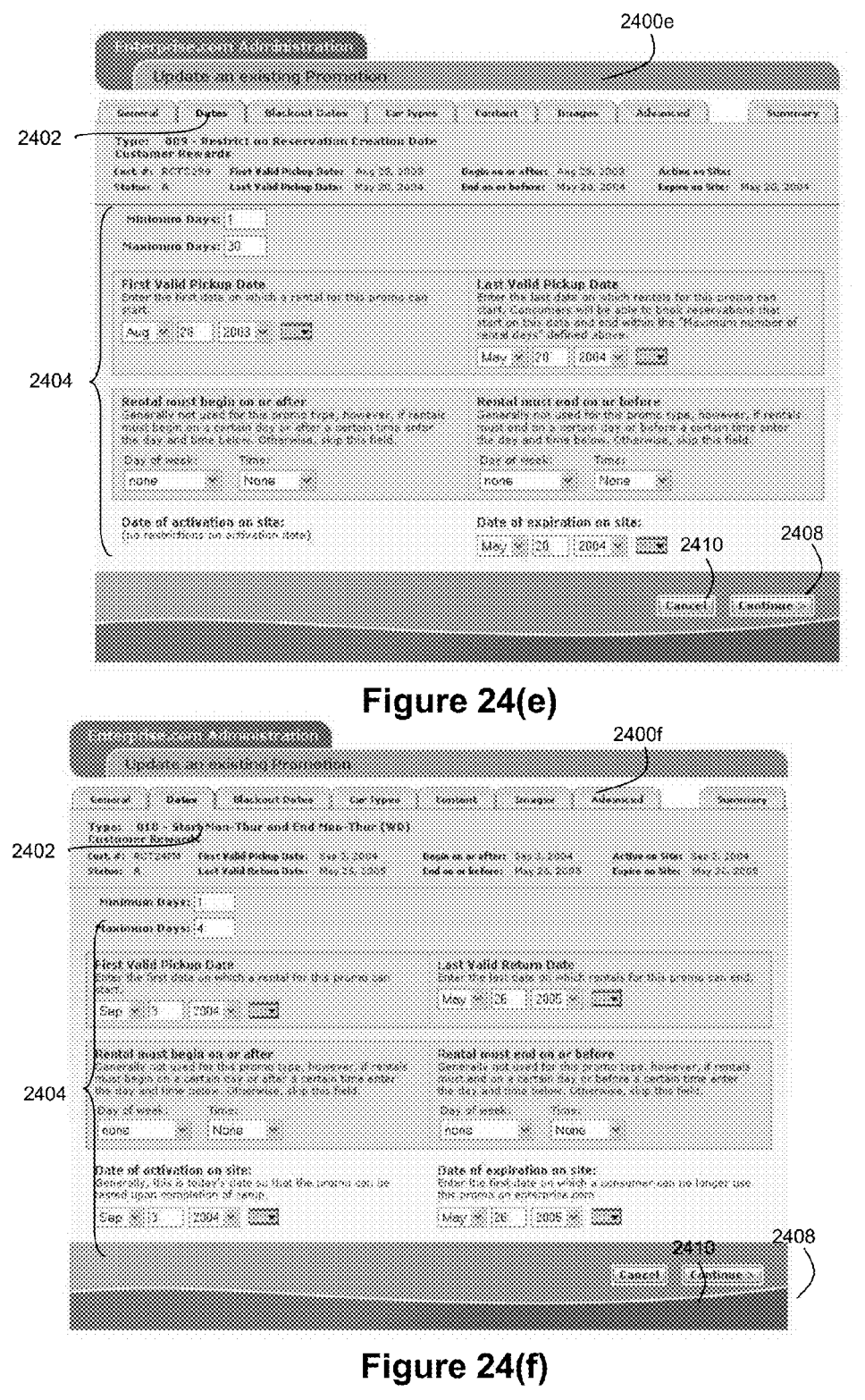
Figure 24G:
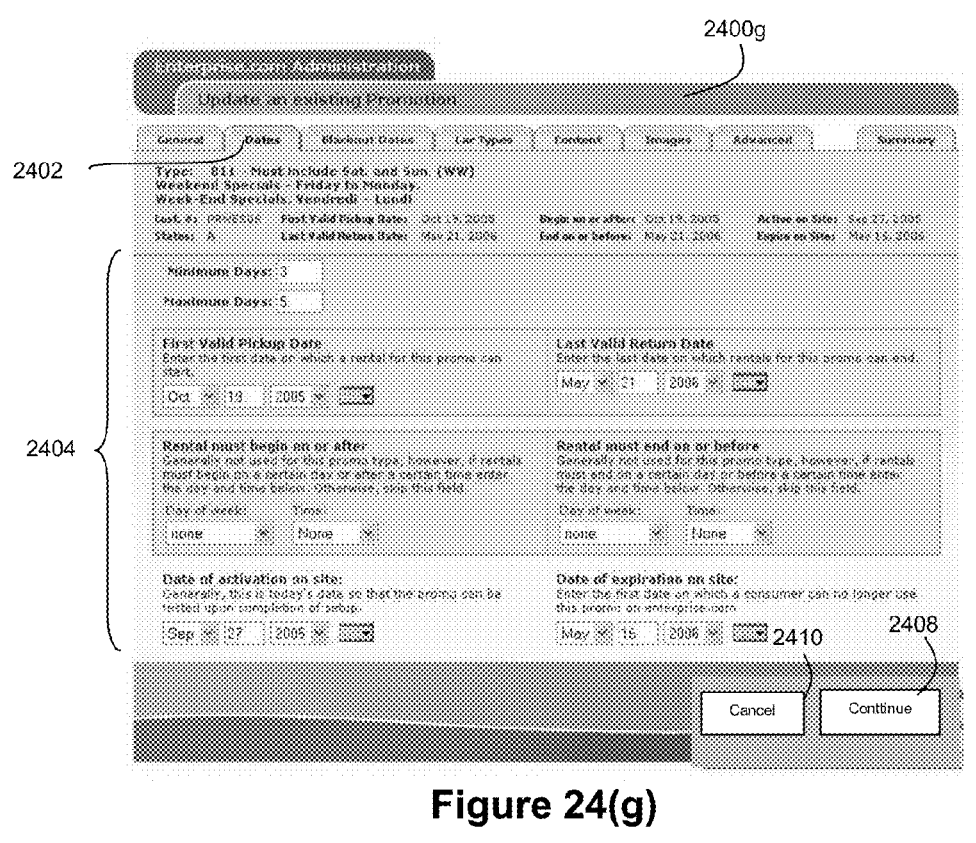

Once the administrator has entered the necessary offer parameters in section 2304, "continue" button 2306 can be selected to advance to page 2400 of FIG. 24. Otherwise, the administrator can select "cancel" button 2308.

FIGS. 24(*a*)-(*g*) depict GUI pages 2400*a-g* through which the administrator can control the applicable dates for a promotional offer. Each page 2400 of FIGS. 24(*a*)-(*g*) corresponds to a different promotional offer type and would be reached if the administrator has selected the corresponding promotional offer type via section 2314 of page 2300. When page 2400 is displayed, folder tab 2402 is active.

Through section 2404, the administrator can control the minimum/maximum number of on-rent days for a reservation meeting the promotional offer's conditions, the earliest and latest starting and ending dates that are within the promotional offer's conditions, the days (and/or times) of the week that a reservation must begin and/or end on to be within the promotional offer's conditions, and the activation/expiration dates for the promotional offer on the website. It should be understood that by restricting the available dates for the promotional offer to a single day, a deep-link for that promotional offer can have a pre-selected temporal characteristic that would allow the user to bypass a page requiring user entry of a starting/ending date for the reservation (although the user may still have to provide a start and end time for the reservation).

Figure 25:
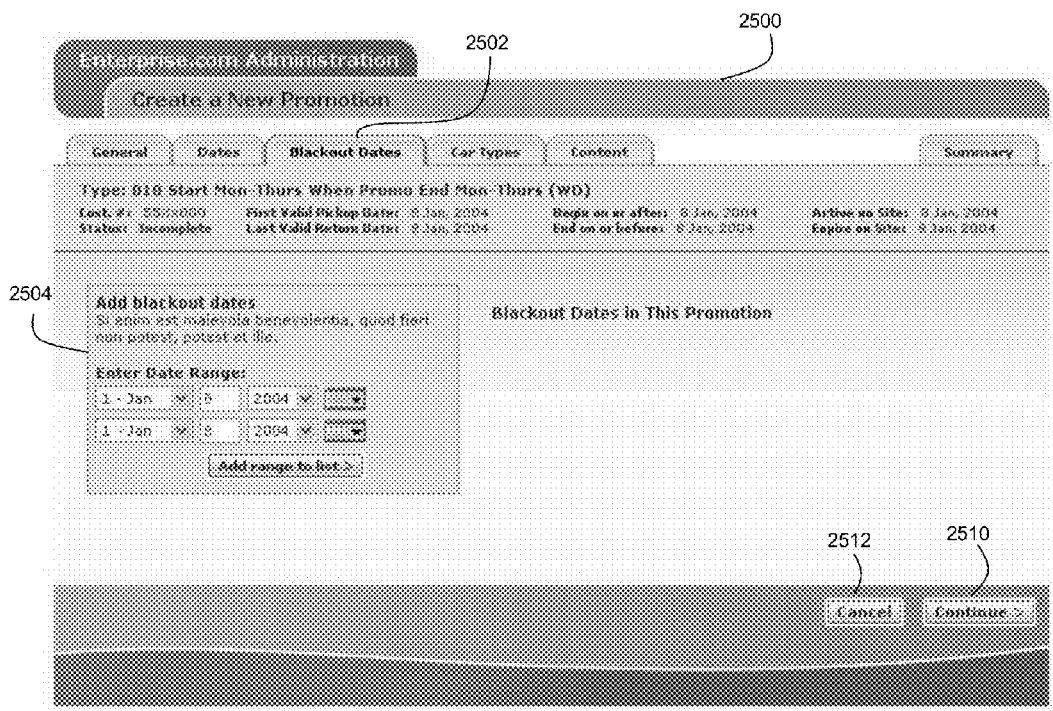
FIG. 25 depicts an exemplary GUI page for administrative control of various blackout date settings for a promotional offer.

Administrator selection of the "continue" button 2408 is effective to advance the administrator to page 2500 of FIG. 25. Otherwise, the administrator can cancel his/her entries on page 2400 via selection of the "cancel" button 2410.

FIG. 25 depicts a GUI page 2500 (wherein folder tab 2502 is active when page 2500 is displayed) for administrative control of various promotional offer's blackout dates, wherein a blackout date is a date within the promotional offer's validity range that is nevertheless a date on which the promotional offer is not available to users. The administrator can define the blackout date(s) for a promotional offer via section 2504 of page 2500. After the administrator has added the appropriate blackout date(s) to the promotional offer, then the administrator can advance to page 2600 via selection of "continue" button 2510. Otherwise, the administrator can cancel his/her entries on page 2500 via selection of "cancel" button 2512.

Figure 26:
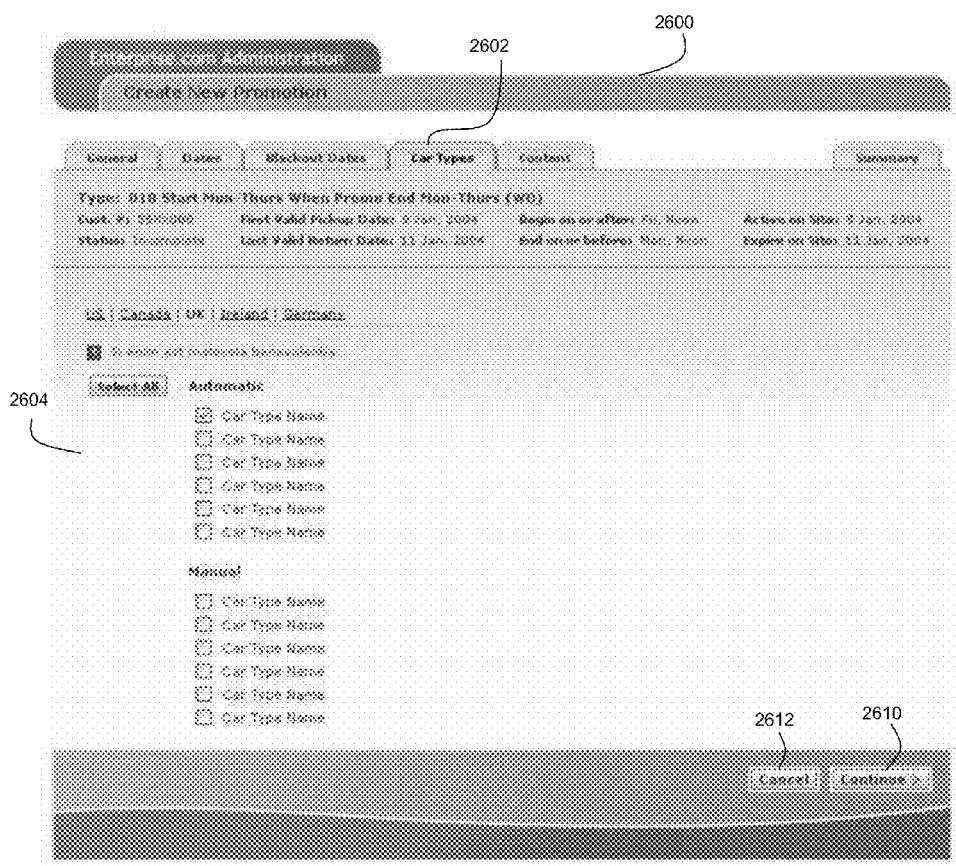
FIG. 26 depicts an exemplary GUI page for administrative control of various vehicle type settings for a promotional offer.

FIG. 26 depicts a GUI page 2600 (wherein folder tab 2602 is active when page 2600 is displayed) for administrative control of vehicle type settings for the promotional offer. Within section 2604, the administrator can define, on a country-specific basis, which vehicle types will be included within the promotional offer. It should be understood that by restricting the vehicle type for the promotional offer to a single vehicle type, the deep-link for that promotional offer will have a pre-selected vehicle type characteristic that would allow the user to bypass a choose vehicle page. After the administrator has selected the appropriate vehicle type(s) for the promotional offer, then the administrator can advance to page 2700 via selection of "continue" button 2610. Otherwise, the administrator can cancel his/her entries on page 2600 via selection of "cancel" button 2612.

Figure 27:
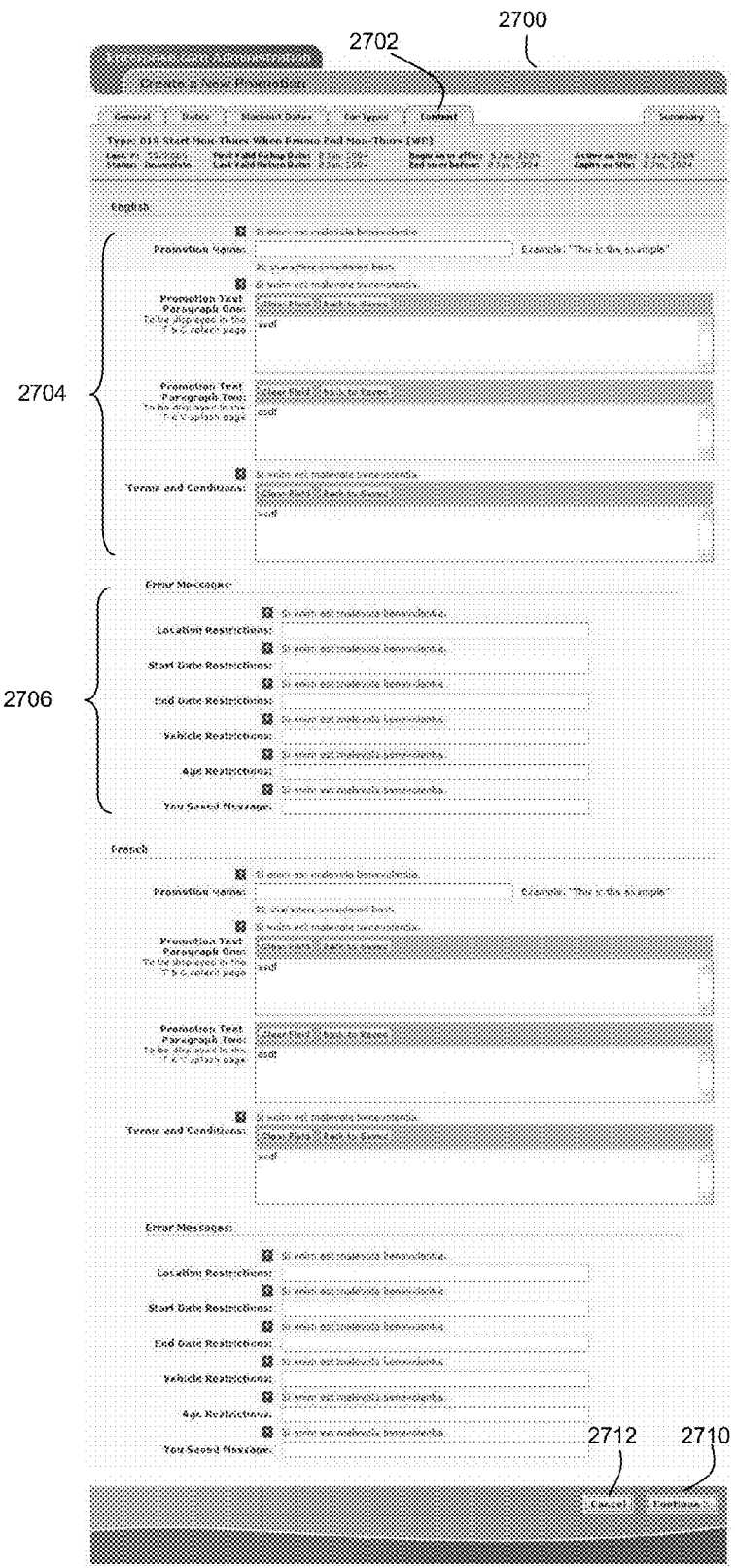
FIG. 27 depicts an exemplary GUI page for administrative control of various message content settings for a promotional offer.
Figure 28A:
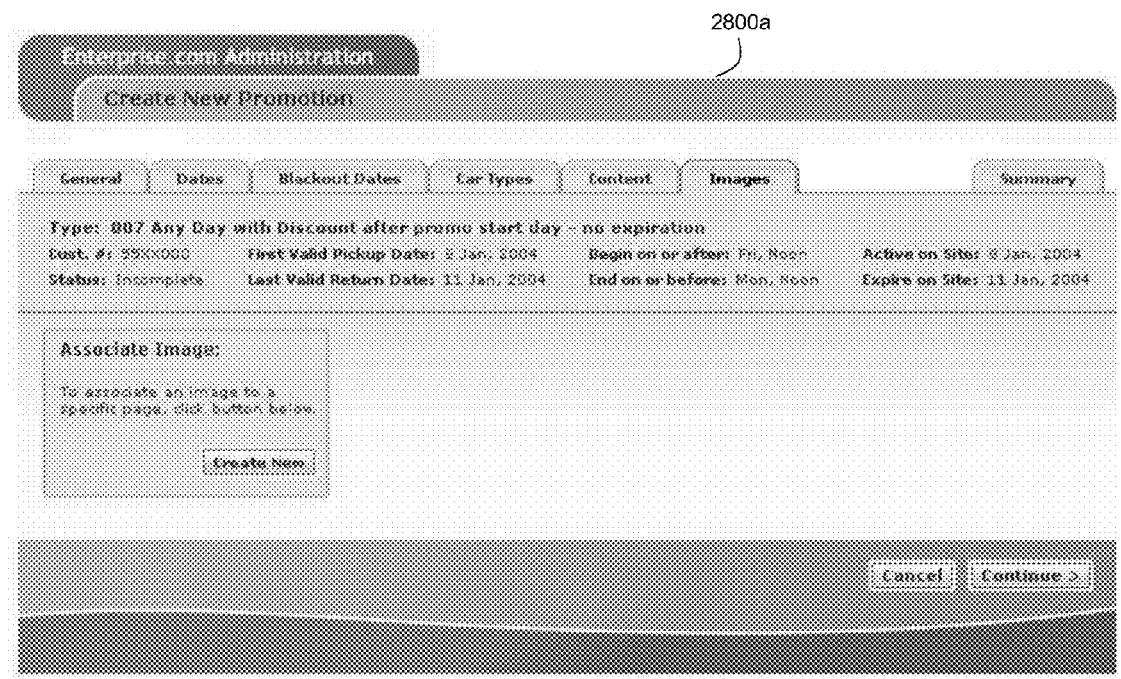
Figure 28B:
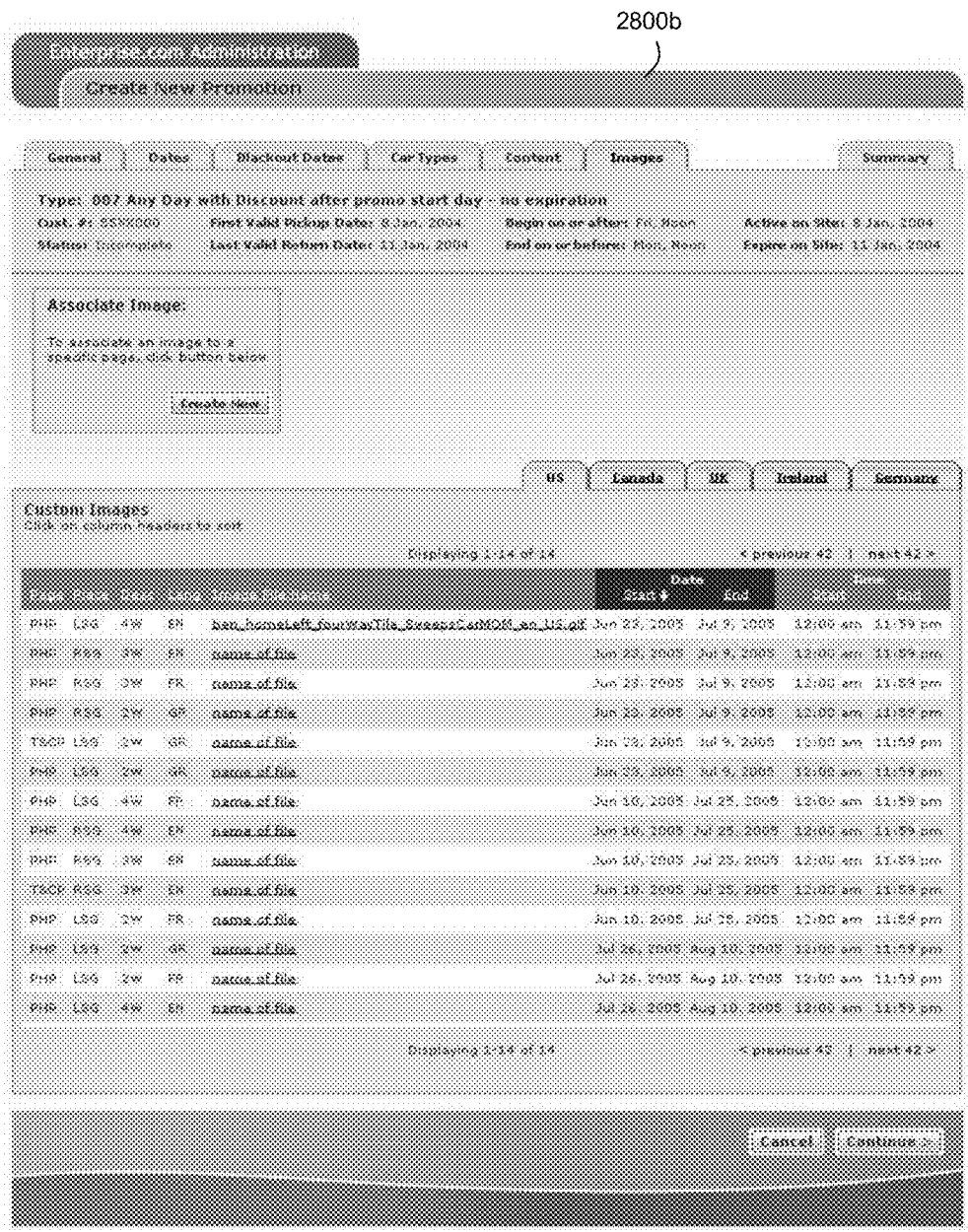

FIG. 27 depicts a GUI page 2700 (wherein folder tab 2702 is active when page 2700 is displayed) for administrative control of vehicle message content settings for the promotional offer. Within section 2704, the administrator can enter a name for the promotional offer, message text describing the promotional offer, and text for the terms and conditions of the promotional offer. This content (or user-selectable links to this content) can be displayed on a deep-linked page that would be reached by a user after selection of a deep-link for that promotional offer. Through section 2706, the administrator can enter the text for various messages to the user that are displayed to the user after the user makes a reservation characteristic selection that falls outside the scope of the promotional offer (e.g., a selected location that falls outside of the eligible locations for the promotional offer, a selected start/end date that falls outside the eligible start/end dates for the promotional offer, selected a vehicle type that falls outside the eligible vehicle type(s) for the promotional offer, etc.) These messages can then be displayed on a Decisions, Decisions, Decisions (DDD) page such as that shown in FIG. 63(*a*) in the incorporated patent application Ser. No. 10/505,685. Also, these messages can be displayed on the page prior to the DDD page before the user has entered the reservation characteristic (to possibly avoid the need to advance to the DDD page). If the user does enter a value for a reservation characteristic that is outside the promotion offer boundaries, then the DDD can display these messages in some highlighted manner (e.g., red text).

After the administrator has selected the appropriate message content for responding to user input outside the scope of the promotional offer, then the administrator can advance to page 2800*a* or 2800*b* via selection of "continue" button 2710. Otherwise, the administrator can cancel his/her entries on page 2700 via selection of "cancel" button 2712.

The GUI pages 2800*a*, 2800*b* and 2900 will operate to provide the administrator with control over the images that are displayed on website pages within the reservation path reached following user selection of the promotional offer in the same manner described for the pages of FIGS. 15(*a*), 15(*b*) and 16 in connection with the customer profile divisions.

Figure 30:
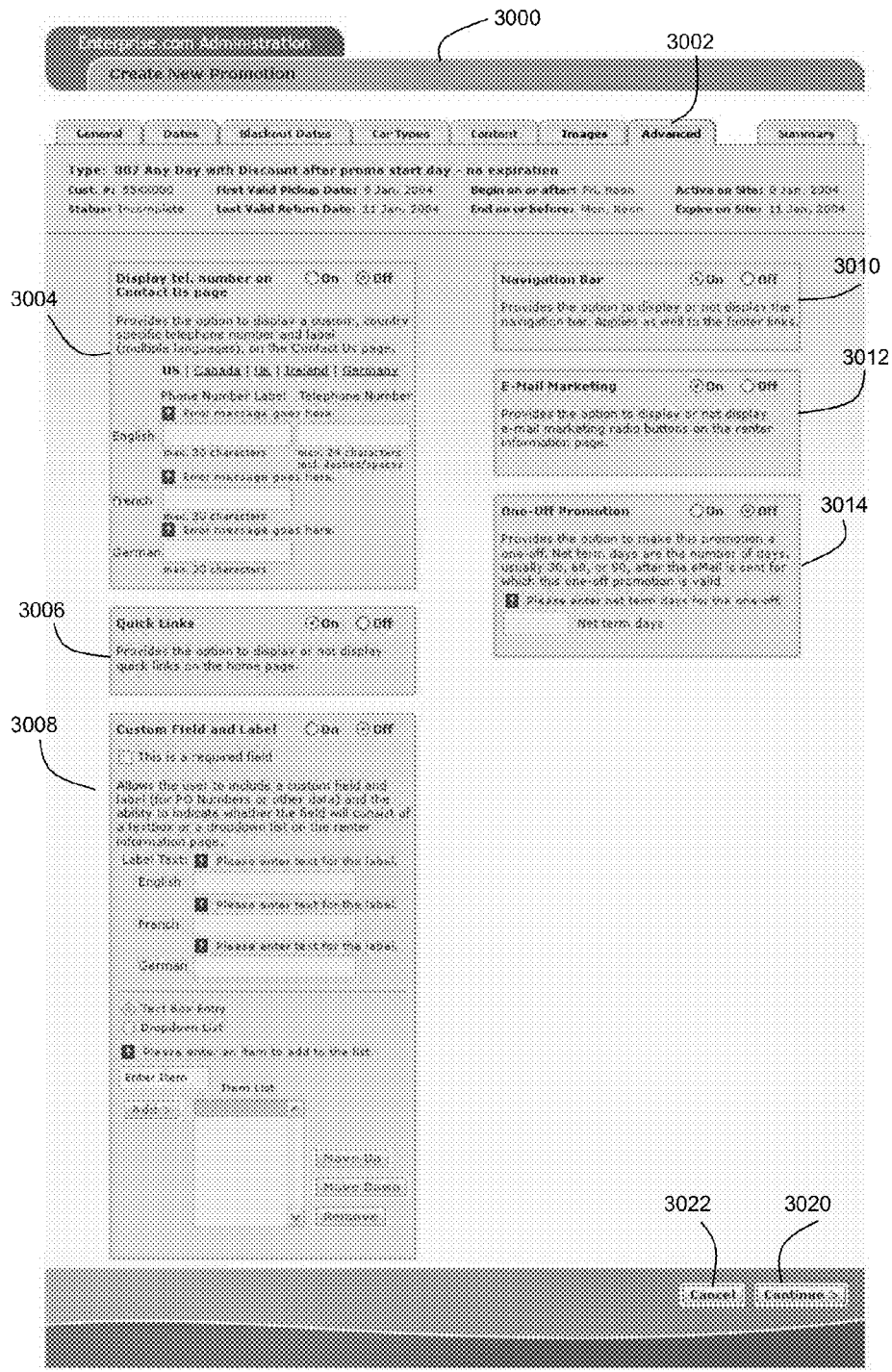
FIG. 30 depicts an exemplary GUI page for administrative control of various other settings for a promotional offer.

Next, the administrator advances to page 3000 of FIG. 30 to control a variety of other page settings within the promotional offer reservation path. Through section 3004, the administrator can define the telephone number that will appear on a contact us page for the promotional offer. Sections 3006, 3008, 3010, and 3012 of page 3000 are analogous to sections 1208 of page 1200, 1406 of page 1400, 1212 of page 1200, and 1436 of page 1400, respectively. Through section 3014, the administrator can control whether the promotion is a one-off promotion. A one-off promotion preferably comprises a promotion that can be accepted only once by a user.

After the administrator has selected the appropriate settings for the promotional offer through page 3000, then the administrator can advance to page 3100 via selection of "continue" button 3020. Otherwise, the administrator can cancel his/her entries on page 3000 via selection of "cancel" button 3022.

Figure 31A:
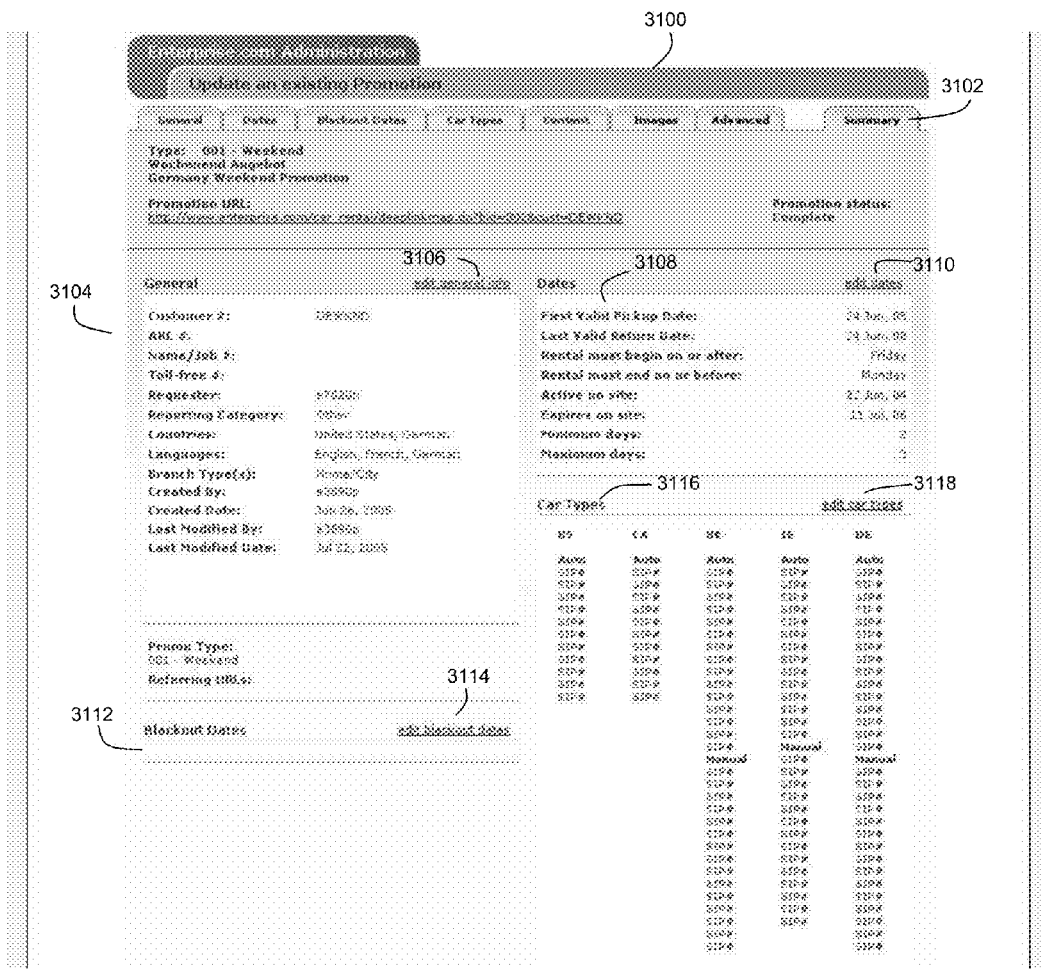
Figure 31B:
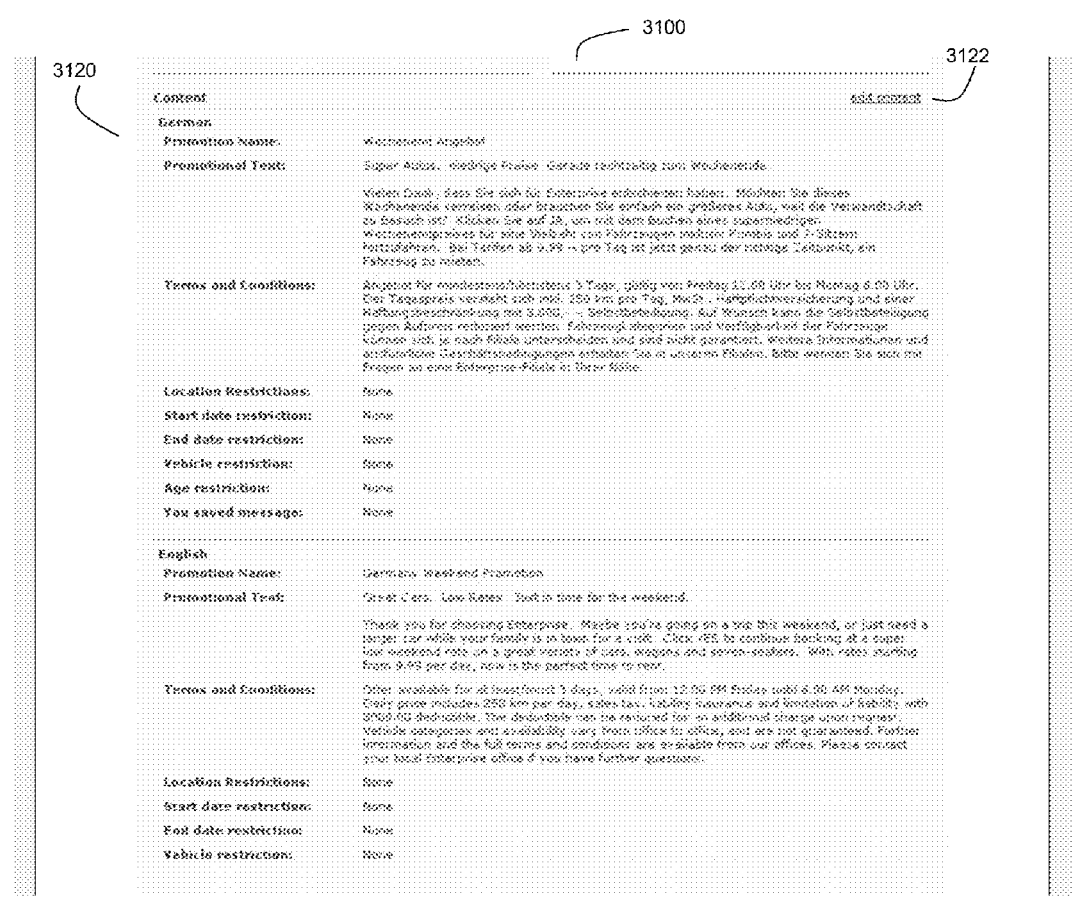
Figure 31C:
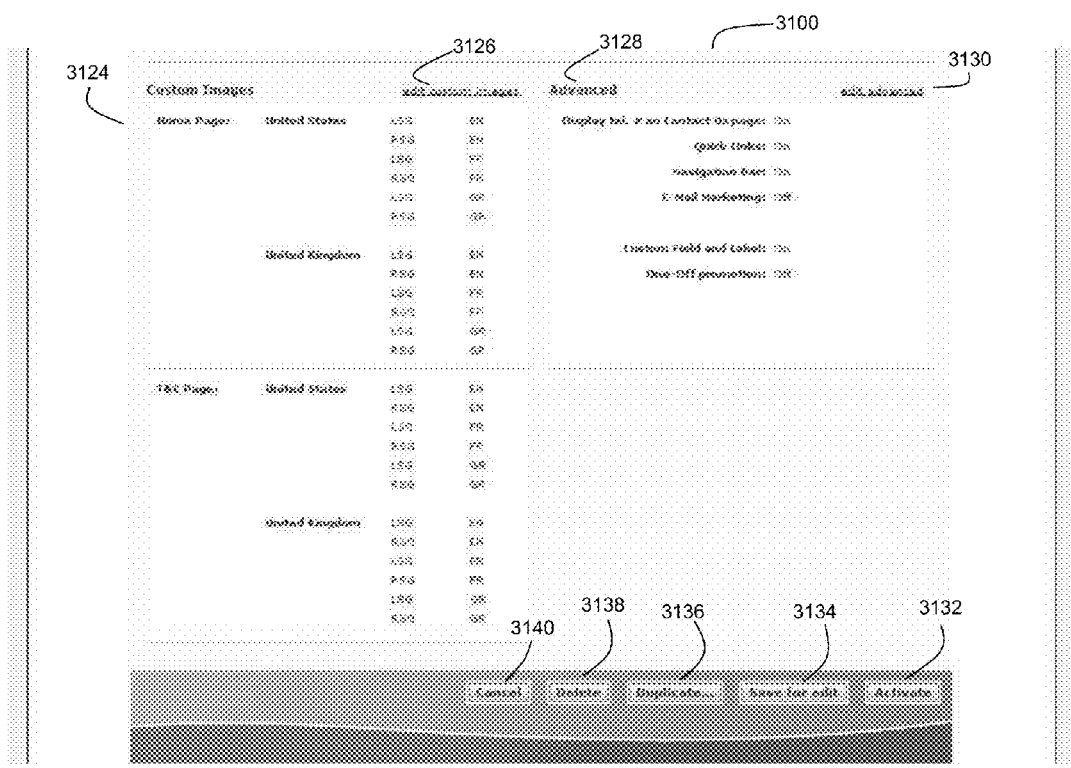

FIGS. 31(*a*)-(*c*) depict the GUI page 3100 that summarizes the previously-entered settings for the promotional offer. Page 3100 can also be reached from the overview page 2200 of FIG. 22 by choosing to edit an existing promotional offer. Section 3104 lists the settings for the promotional offer entered through page 2300 (with edit link 3106 being selectable to recall page 2300 for editing of one or more of those settings). Section 3108 lists the settings for the promotional offer entered through page 2400 (with edit link 3110 being selectable to recall page 2400 for editing of one or more of those settings). Section 3112 lists the settings for the promotional offer entered through page 2500 (with edit link 3114 being selectable to recall page 2500 for editing of one or more of those settings). Section 3116 lists the settings for the promotional offer entered through page 2600 (with edit link 3118 being selectable to recall page 2600 for editing of one or more of those settings). Section 3120 lists the settings for the promotional offer entered through page 2700 (with edit link 3122 being selectable to recall page 2700 for editing of one or more of those settings). Section 3124 lists the settings for the promotional offer entered through pages 2800 and 2900 (with edit link 3126 being selectable to recall page 2800 for editing of one or more of those settings), and section 3128 lists the settings for the promotional offer entered through page 3000 (with edit link 3130 being selectable to recall page 3000 for editing of one or more of those settings).

Figure 34:
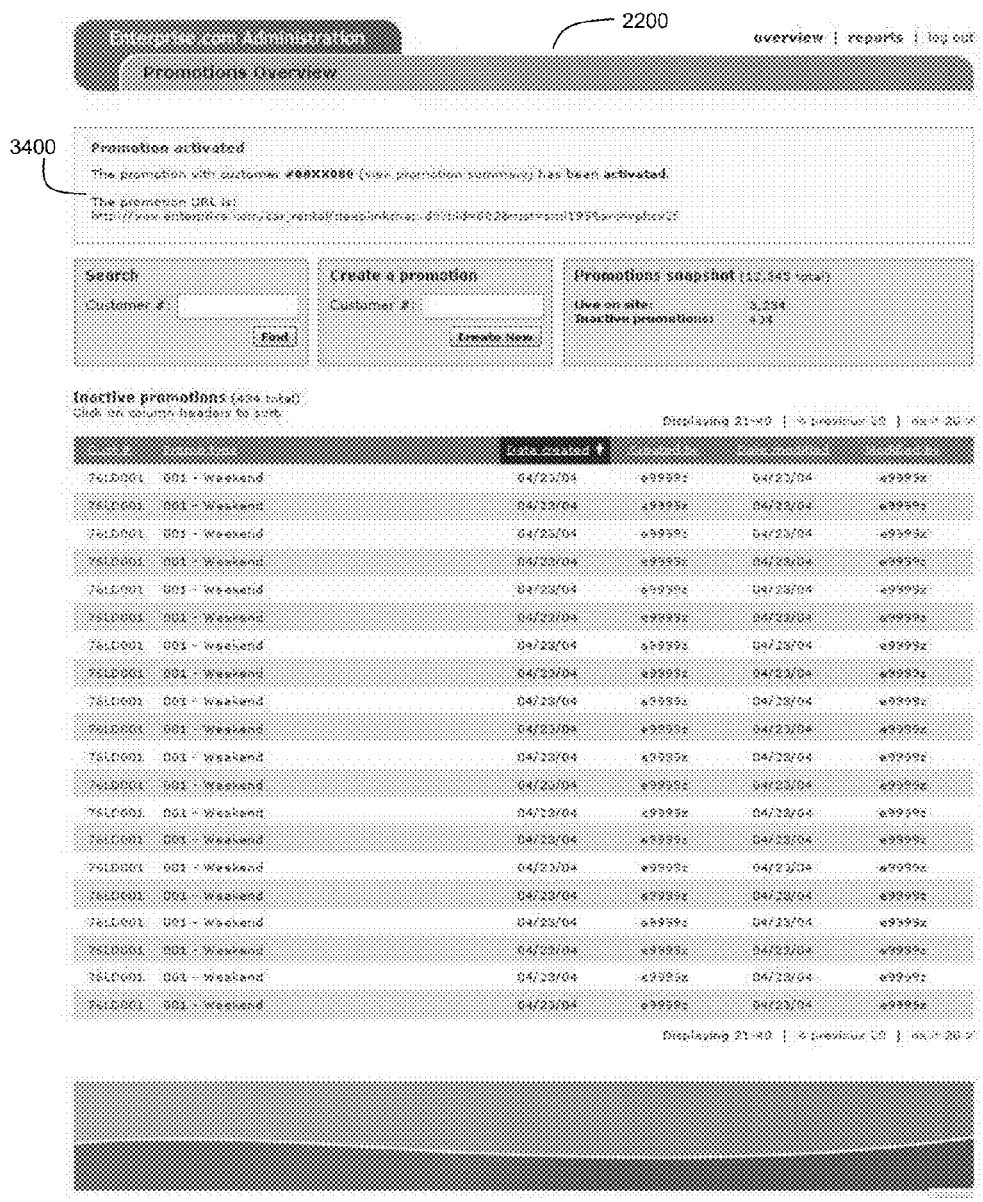

If the administrator approves the settings for the promotional offer, he/she can activate that promotional offer through selection of the "activate" button 3132. Upon activation, page 2200 of FIG. 34 is displayed (which includes a section 3400 notifying the administrator of the activation), and a URL for the promotional offer can be distributed through marketing efforts. Thereafter, user selection of a deep-link associated with that URL will be effective to deep-link a user into the website commensurate with the pre-selected characteristics of the promotional offer. If the administrator wants to save the promotional offer's settings for later editing, he/she can select the "save for edit" button 3134. To delete the promotional offer, the administrator can select the "delete" button 3138. To cancel any unsaved edits made to the promotional offer, the administrator can select the "cancel" button 3140.

Because often times it will be desirable to create numerous promotional offers with largely identical settings (perhaps only one or two differences), a need exists for an efficient way of duplication promotional offers. After creating a duplicate promotional offer, the administrator can then edit the duplicated promotional offer to tweak it as desired.

Figure 32:
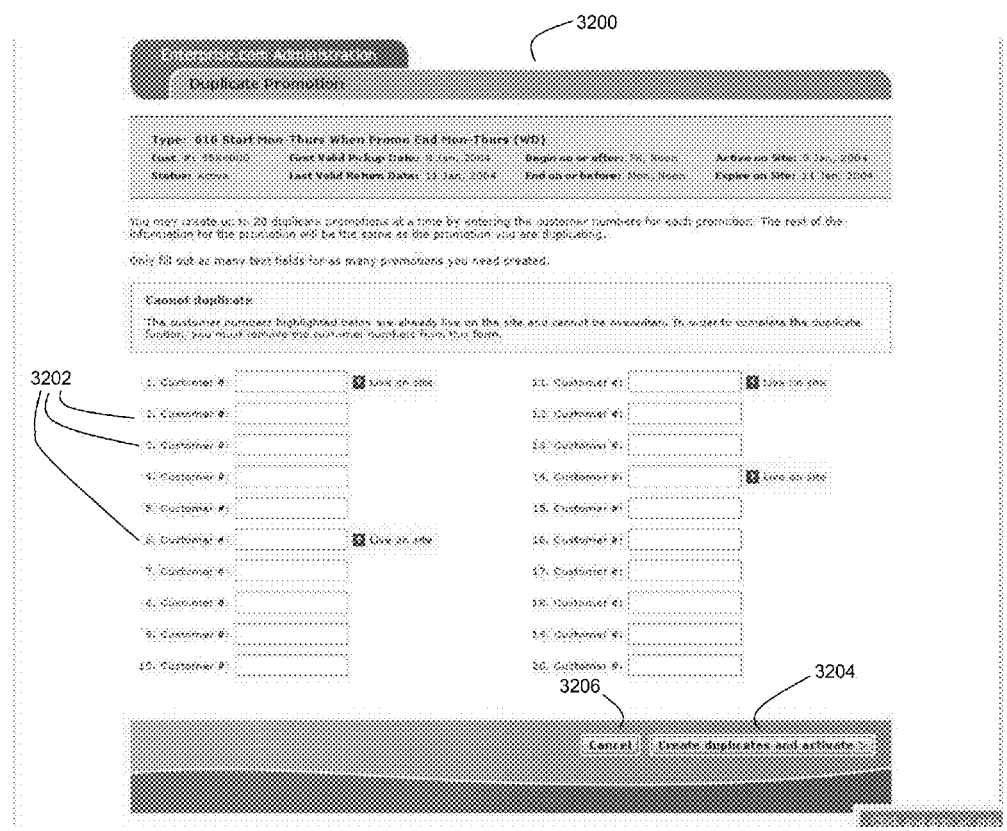
FIG. 32 depicts an exemplary GUI page for creating duplicate promotional offers.
Figure 33:
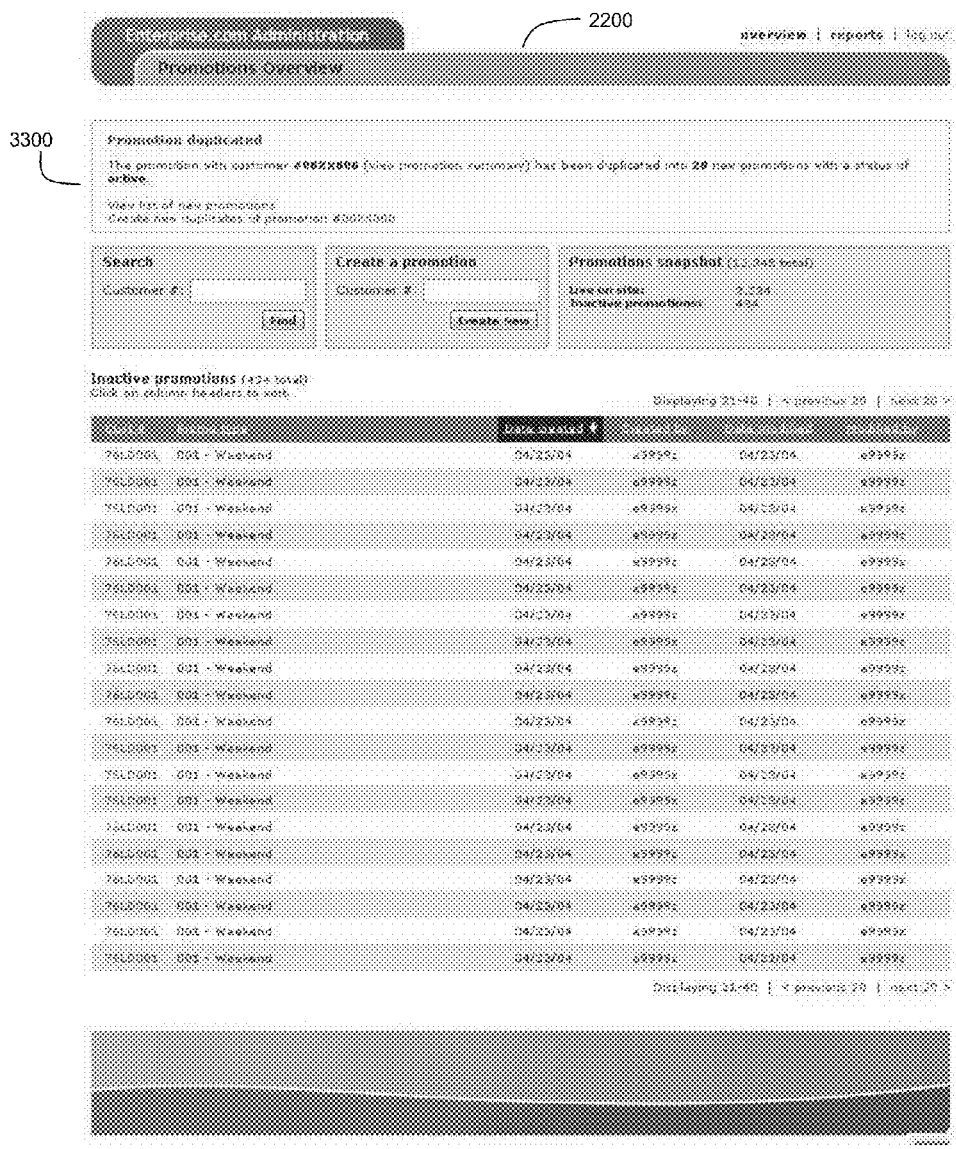
FIGS. 33 and 34 depict exemplary promotional offer overview pages following duplication and activation respectively.

The administrator can initiate this duplication process by selecting the "duplicate" button 3136 on page 3100. Selection of button 3136 will cause page 3200 of FIG. 32 to be displayed. The administrator can enter promotion numbers in fields 3202 for multiple (e.g., up to 20) duplicate promotional offers to be created from the current promotional offer. After entering these numbers in fields 3203, the administrator can create the duplicates by selecting button 3204. Otherwise, the administrator can select the "cancel" button 3206. If the administrator were to enter numbers in sections 3202 that are already in use, error messages to that effect can be displayed on page 3200 to allow the administrator to enter new numbers therefor. If all numbers in fields 3202 are available, then page 2200 of FIG. 33 is displayed after selection of button 3204, wherein section 3300 includes a notification to the administrator of the duplicates that have been created.

Figure 35A:
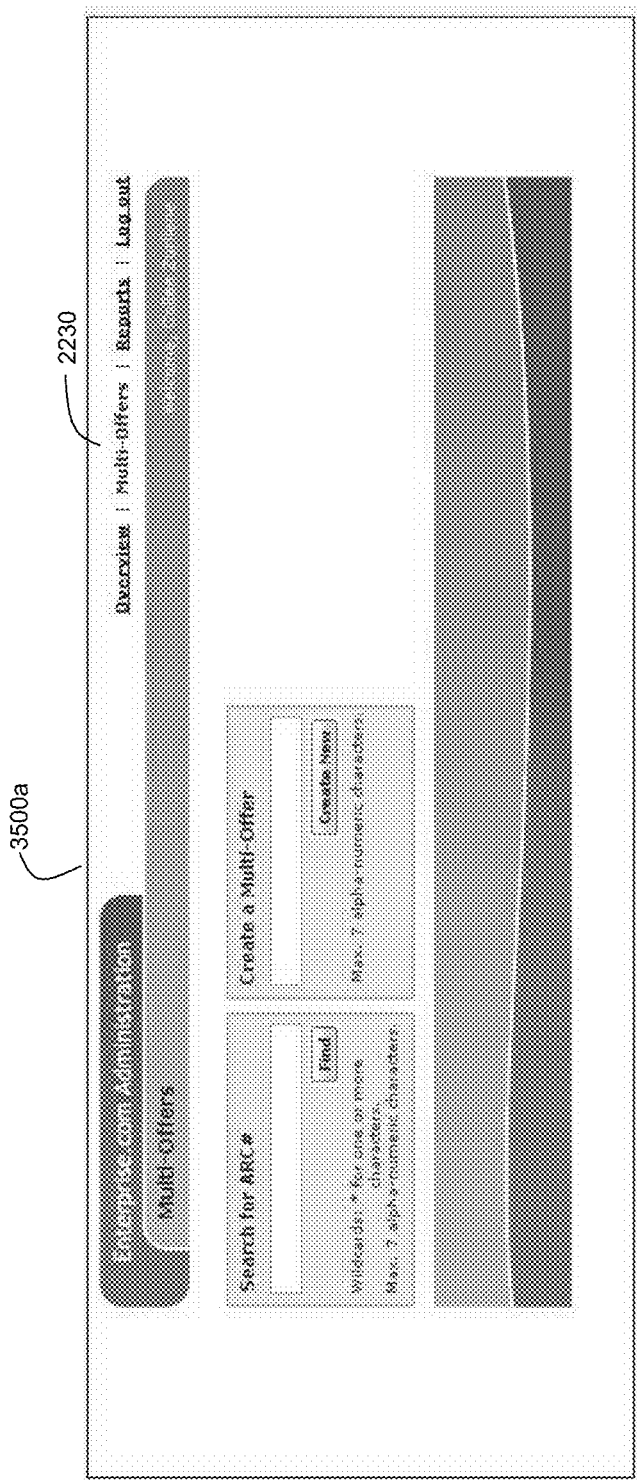
FIGS. 35(a) and (b) depict exemplary multi-offer page creation overview GUI pages.
Figure 35B:
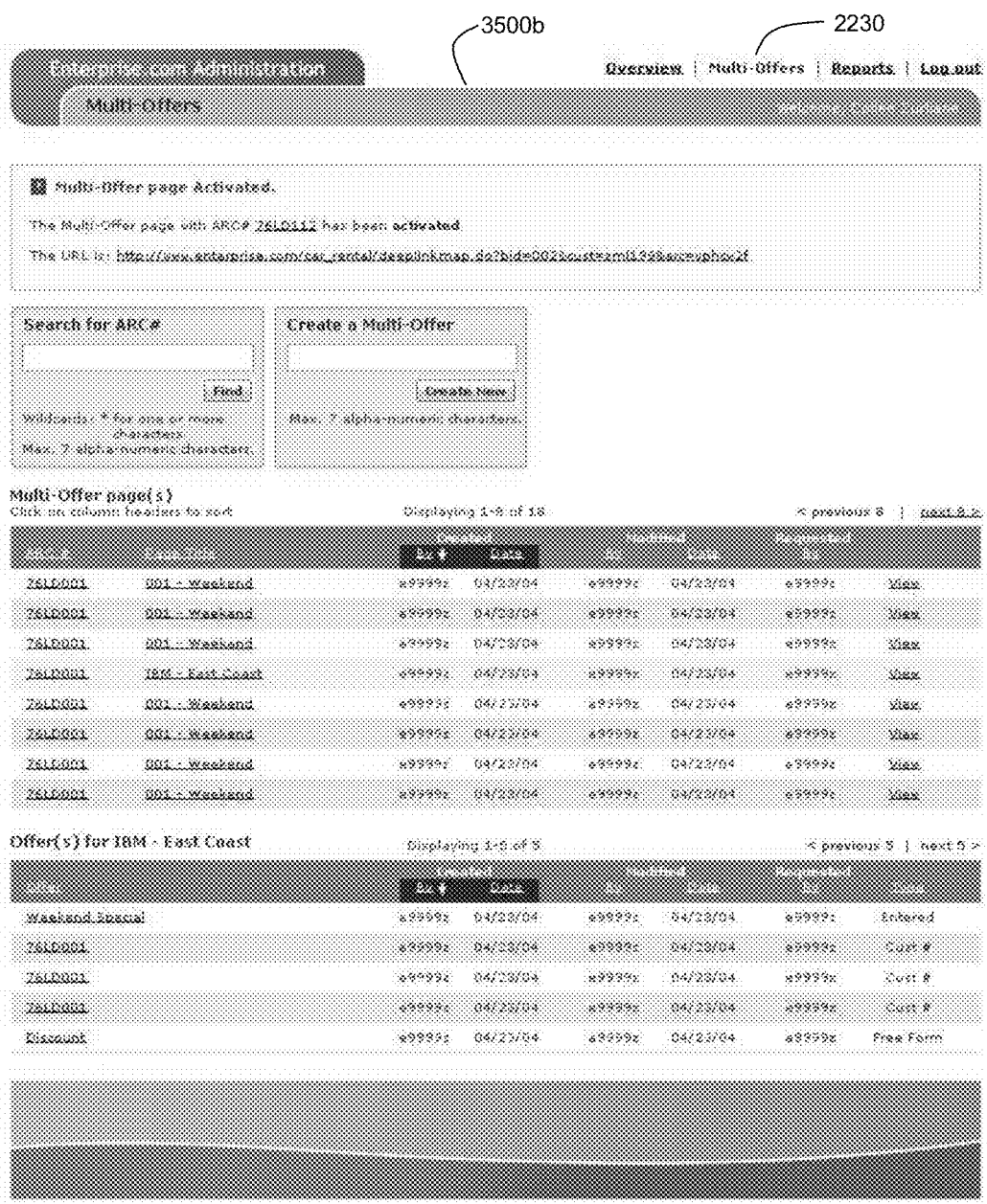
Figure 36A:
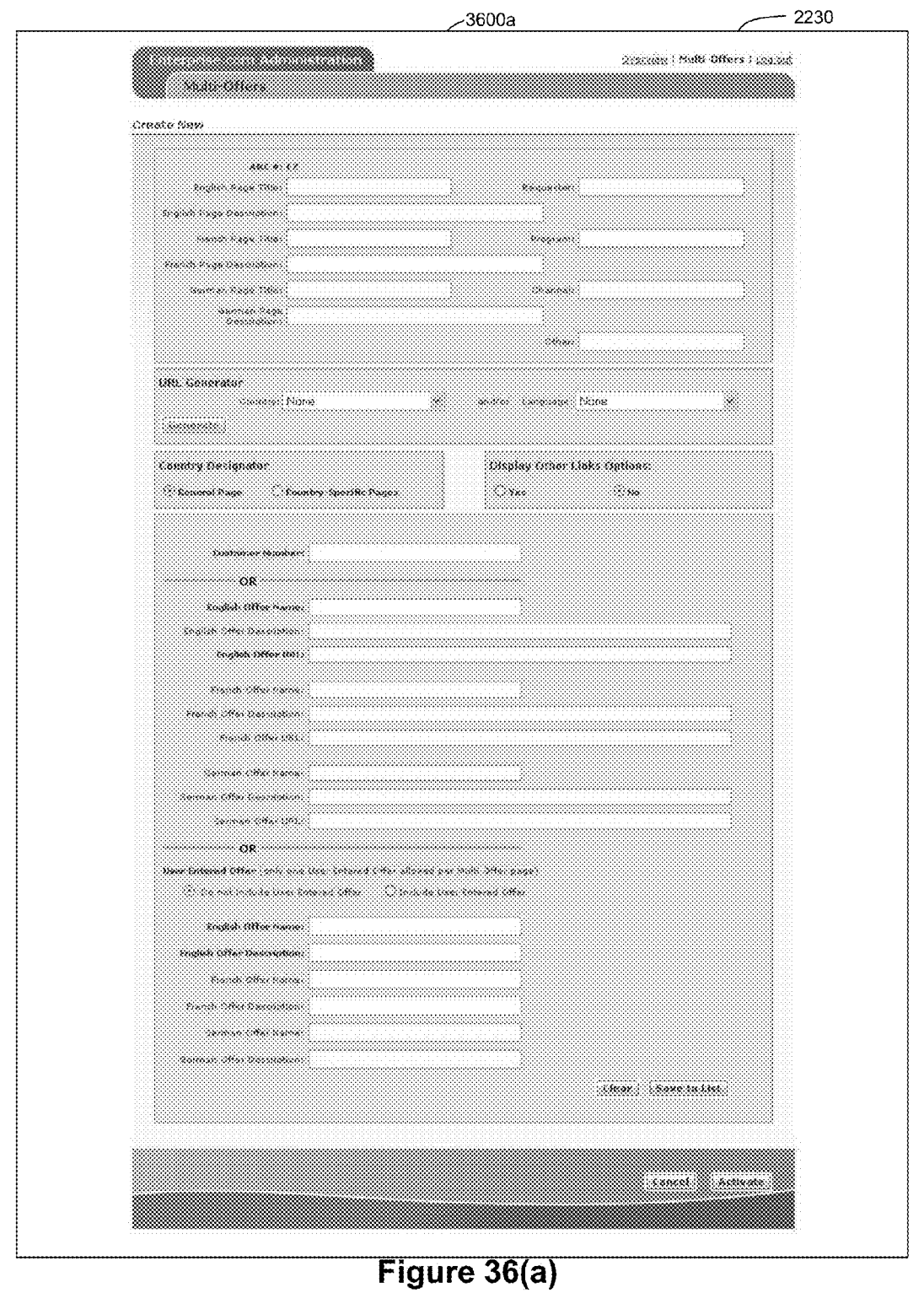
Figure 36B:
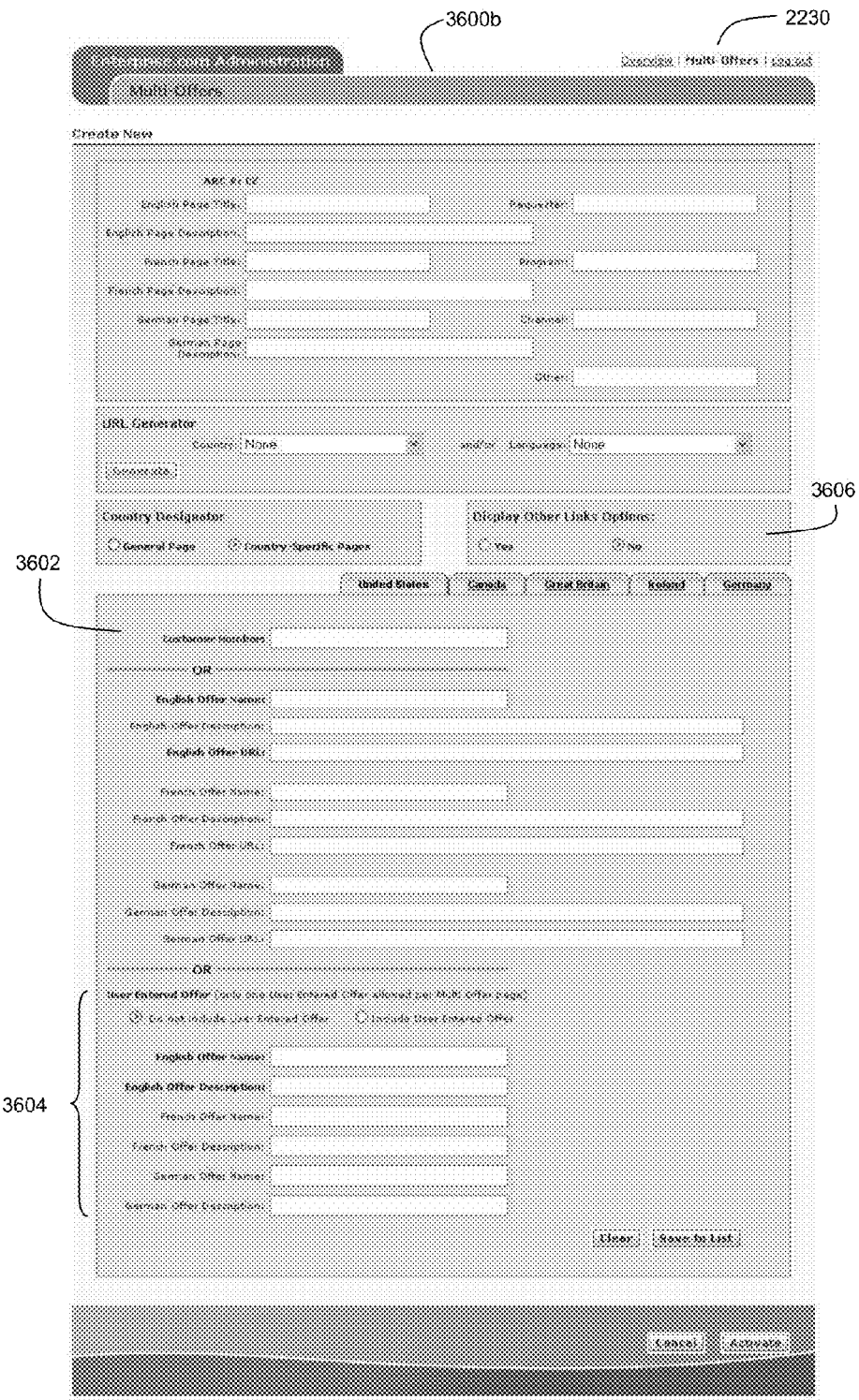
Figure 36C:
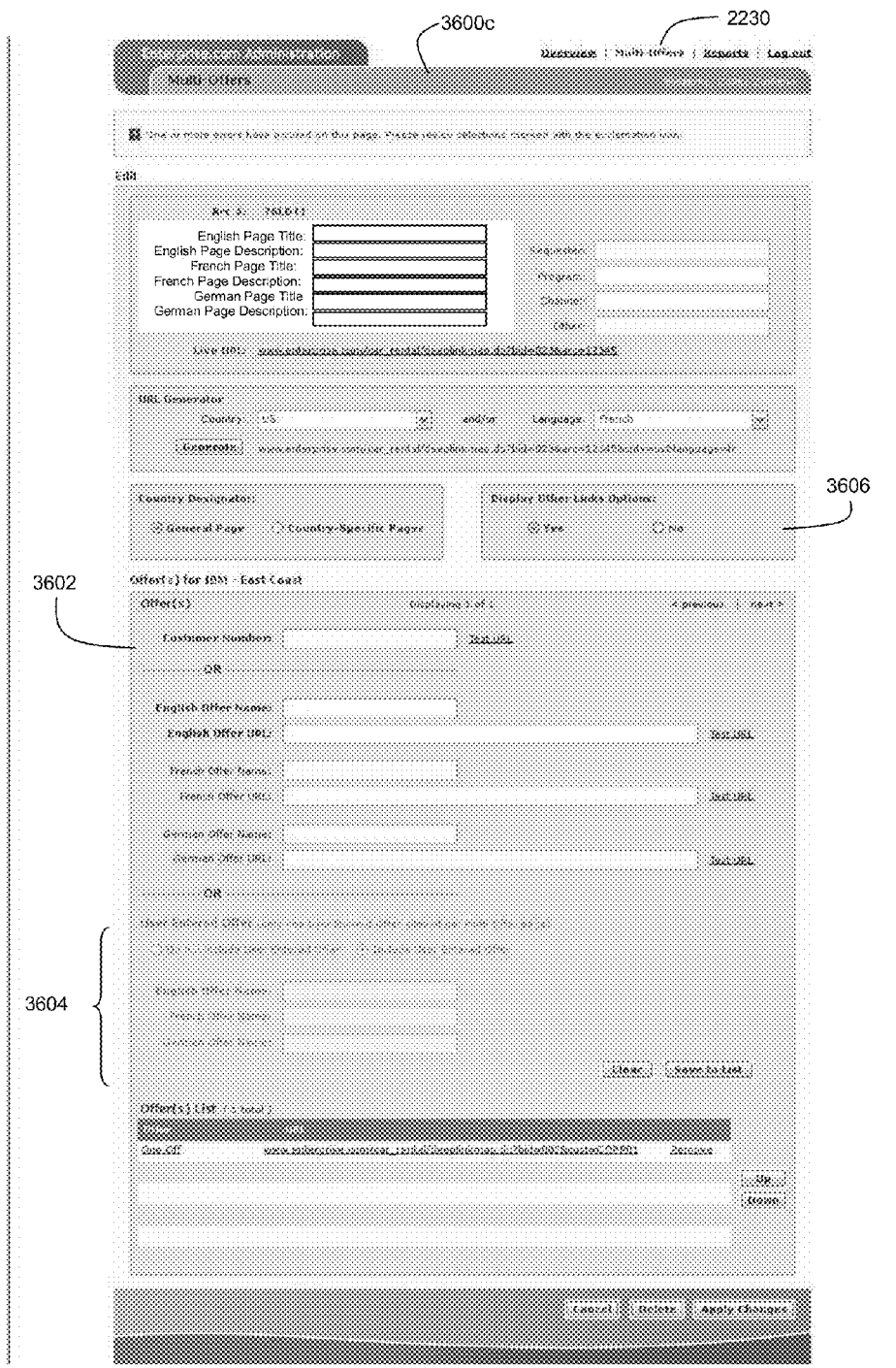
Figure 37:
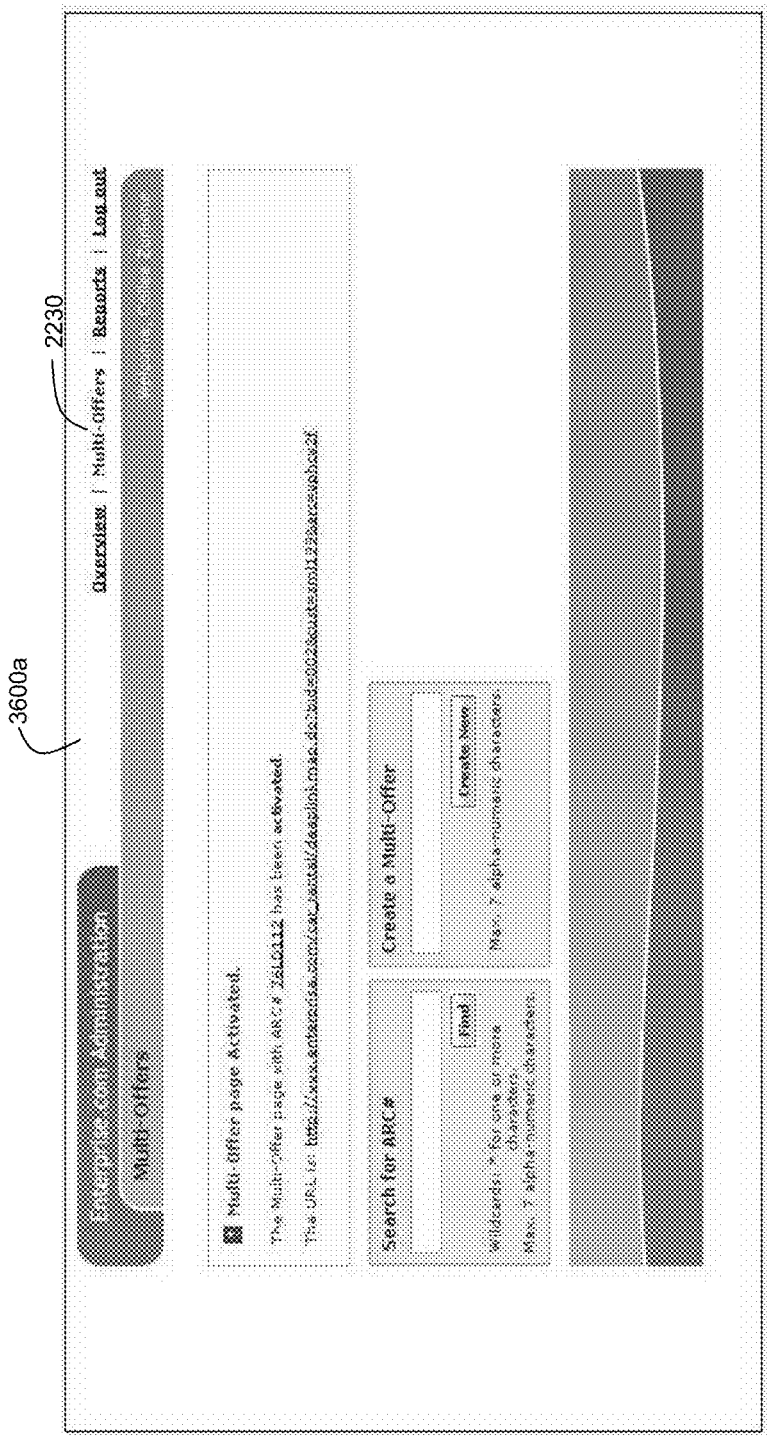
FIG. 37 depicts an exemplary GUI page displayed after an administrator has activated a multi-offer page.

Administrators can also create multi-offer pages for promotional offers that are analogous to the multi-division pages described above. The flow of FIG. 17 can be used to create such multi-offer pages. Upon administrator selection of the multi-offer link 2230 shown on page 2200, the administrator is advanced to pages 3500*a* or 3500*b* of FIGS. 35(*a*) and (*b*). Pages 3500*a* and 3500*b* operate as described for multi-divisions in connection with FIGS. 18(*a*) and 18(*b*), and pages 3600*a*, 3600*b* and 3600*c* of FIGS. 36(*a*)-(*c*) operate as described for multi-divisions in connection with FIGS. 19(*a*)-(*c*). However, these pages may also include a field 3602 in which the administrator can identify the promotional offer to be added to the multi-offer page via promotion number. Pages 3600*a-c* may also include a section 3604 through which the administrator can define a listed promotional offer for the multi-offer page where section 402 includes a field for user entry of a promotion number such as the promotion codes that are often mailed to customers as part of a mass mailing campaign (see the topmost section 402 of FIG. 39). Further still, pages 3600*a-c* may include a section 3606 through which the administrator can control whether links will be displayed in section 3802 of the multi-offer page (see FIGS. 38 and 39). After a new multi-offer page has been activated (or an edited multi-offer page is activated), page 3500*a* of FIG. 37 is displayed.

Figure 38:
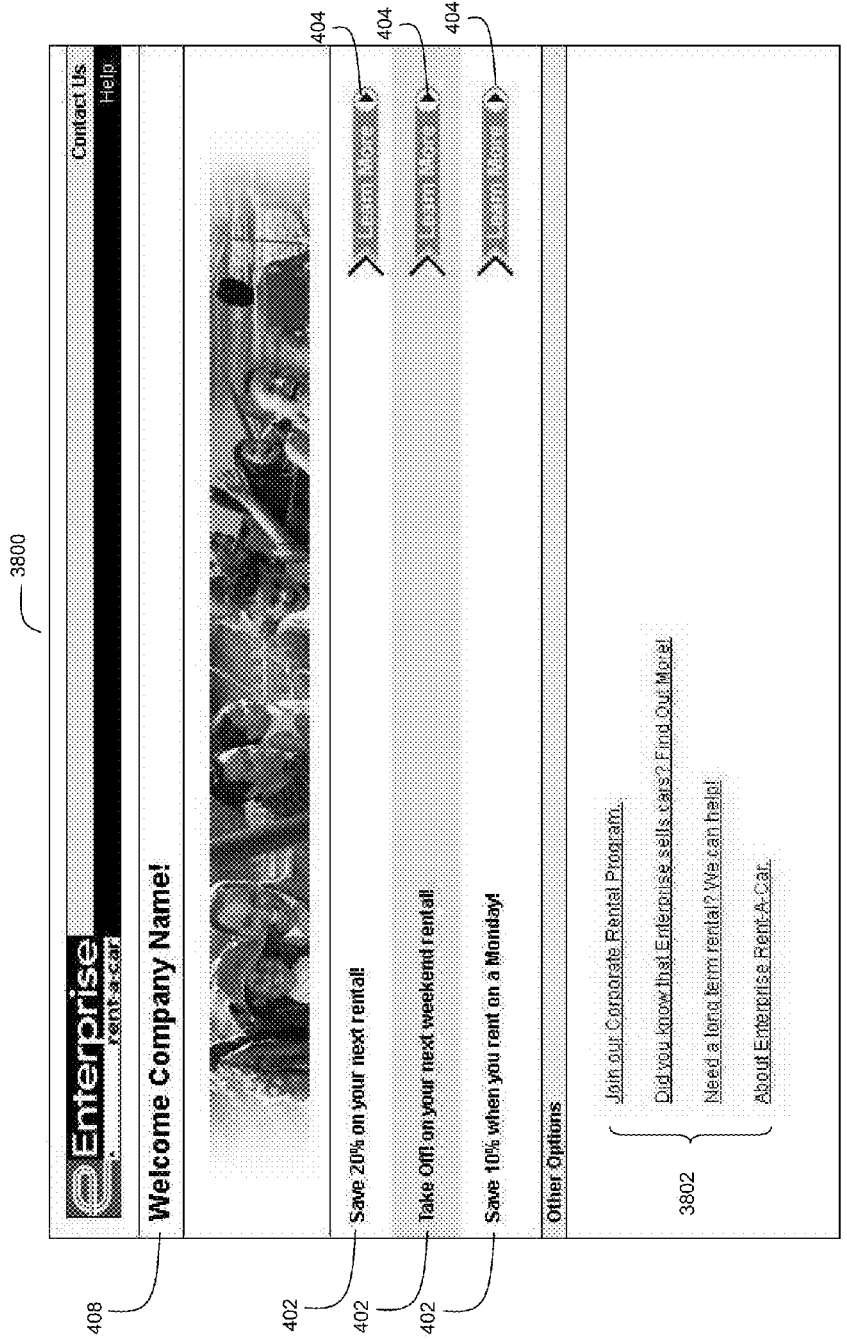
FIGS. 38 and 39 depict exemplary multi-offer pages.
Figure 39:
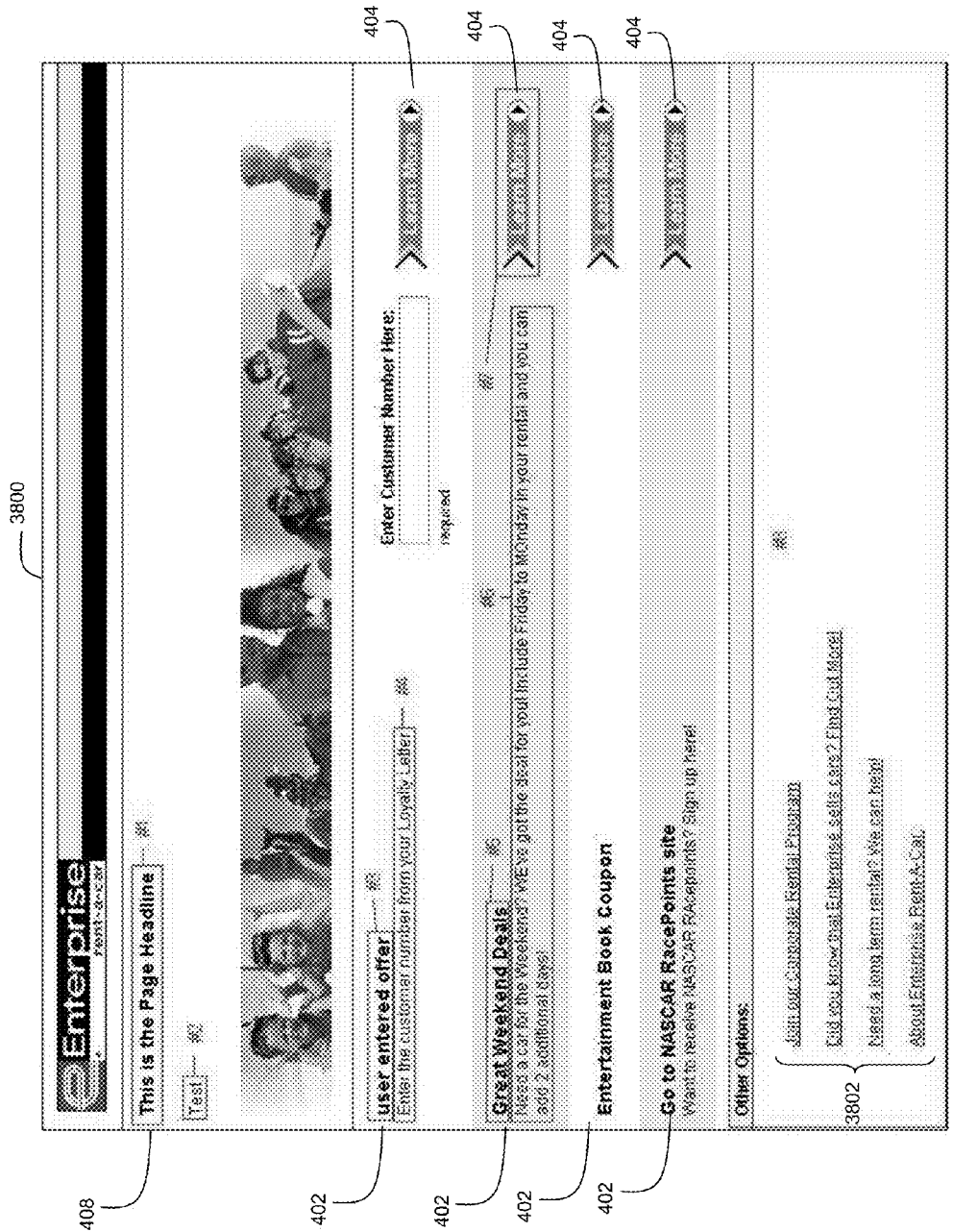

The end result of creating a multi-offer page is a page that appears like the multi-division pages of FIGS. 4, 6 and 8 except that multiple offers are listed, although a links section 3802 may optionally be included. FIG. 38 depicts an example of a multi-offer page 3800 created via the methodology of FIG. 17. As can be seen in FIG. 38, sections 402 of page 3800 include a plurality of promotional offers and links 404 are deep-links corresponding to those promotional offers. FIG. 39 depicts another example of a multi-offer page 3900 created via the methodology of FIG. 17.

While the present invention has been described above in relation to its preferred embodiment, various modifications may be made thereto that still fall within the invention's scope, as would be recognized by those of ordinary skill in the art. Such modifications to the invention will be recognizable upon review of the teachings herein. For example, the administrative tool of the present invention can also be configured to provide the administrator with control over the rates that are applied to a deep-linked reservation (e.g., a rate (or range of rates) that is to be applied to a reservation booked through a customer profile division or a promotional offer). Further still, while the exemplary administrative tool described herein described an embodiment where the administrator can pre-select a particular branch or type of branch location for a customer profile division or promotional offer, it should be understood that the administrator can also be provided with the ability to define a range of particular branch locations as being eligible for selection in a reservation booked through a customer profile division and/or a promotional offer. Further still, it should be noted that any images appearing on the multi-division pages and/or multi-offer pages described herein can also be customizable through the administrative tool of the present invention. As such, the full scope of the present invention is to be defined solely by the appended claims and their legal equivalents.

What is claimed is:

1. A method for providing a service to book a rental vehicle reservation, the rental vehicle reservation comprising a plurality of characteristics that need to be defined for booking, the method comprising:

communicating a plurality of deep-link uniform resource locators (URLs) to a remote computer to populate a multiple deep-link graphical user interface (GUI) for display on the remote computer such that the multiple deep-link GUI includes a plurality of the communicated deep-link URLs, each deep-link URL being associated with a specialized rental vehicle reservation profile such that a plurality of the deep-link URLs are associated with a plurality of specialized rental vehicle reservation profiles, each specialized rental vehicle reservation profile comprising a rental vehicle reservation characteristic, and wherein each deep-link URL is user-selectable to navigate the user to a deep-linked GUI that is configured to solicit input for booking a rental vehicle reservation that has the characteristic of the deep-link URL's associated specialized rental vehicle reservation profile pre-defined for it;

receiving input from the remote computer corresponding to a selection of one of the deep-link URLs included on the multiple deep-link GUI;

automatically defining a rental vehicle reservation transaction to include the characteristic of the specialized rental vehicle profile associated with the selected deep-link URL; and communicating data to the remote computer to solicit additional input from the user for booking the rental vehicle reservation transaction; and wherein the method steps are performed by a processor; and wherein the rental vehicle reservation transaction is for a customer entity having a plurality of divisions, each of a plurality of the divisions having an associated specialized rental vehicle reservation profile, and wherein a plurality of the deep-link URLs are associated with a division of the customer such that the plurality of deep-link URLs comprise a plurality of division-specific deep-link URLS.

2. The method of claim 1 further comprising:

accessing a data structure stored in a memory, wherein the data structure associates the division-specific deep-link URLs and their associated specialized rental vehicle reservation profiles with the customer entity; and in response to the accessing step, identifying the division-specific deep-link URLs associated with the customer entity for inclusion in the multiple deep-link GUI.

3. The method of claim 2 wherein the data structure further comprises a plurality of text labels, each text label being associated with a division-specific deep-link URL, the method further comprising:

in response to the accessing step, the processor identifying the text labels associated with the identified deep-link URLs; and the processor communicating the identified text labels to the remote computer to populate the multiple deep-link GUI.

4. The method of claim 1 wherein the deep-link URLs communicating step further comprises the processor providing the multiple deep-link GUI to the remote computer for display thereon, the multiple deep-link GUI including the communicated deep-link URLs.

5. The method of claim 1 wherein at least one rental vehicle reservation characteristic of at least one specialized rental vehicle reservation profile comprises a pickup location.

6. The method of claim 5 wherein the pickup location comprises a range of eligible pickup locations.

7. The method of claim 1 wherein at least one rental vehicle reservation characteristic of at least one specialized rental vehicle reservation profile comprises a vehicle type.

8. The method of claim 7 wherein the vehicle type comprises a range of eligible vehicle types.

9. The method of claim 2 wherein at least one rental vehicle reservation characteristic of at least one specialized rental vehicle reservation profile comprises a pickup location.

10. The method of claim 2 wherein at least one rental vehicle reservation characteristic of at least one specialized rental vehicle reservation profile comprises a vehicle type.

11. An apparatus for providing a service to book a rental vehicle reservation, the rental vehicle reservation comprising a plurality of characteristics that need to be defined for booking, the apparatus comprising:

a processor; and a memory;

wherein the processor and memory are configured to (1) communicate a plurality of deep-link uniform resource locators (URLs) to a remote computer to populate a multiple deep-link graphical user interface (GUI) for display on the remote computer such that the multiple deep-link GUI includes a plurality of the communicated deep-link URLs, each deep-link URL being associated with a specialized rental vehicle reservation profile such that a plurality of the deep-link URLs are associated with a plurality of specialized rental vehicle reservation profiles, each specialized rental vehicle reservation profile comprising a rental vehicle reservation characteristic, and wherein each deep-link URL is user-selectable to navigate the user to a deep-linked GUI that is configured to solicit input for booking a rental vehicle reservation that has the characteristic of the deep-link URL's associated specialized rental vehicle reservation profile pre-defined for it, (2) receive input from the remote computer corresponding to a selection of one of the deep-link URLs included on the multiple deep-link GUI, (3) automatically define a rental vehicle reservation transaction to include the characteristic of the specialized rental vehicle profile associated with the selected deep-link URL, and (4) communicate data to the remote computer to solicit additional input from the user for booking the rental vehicle reservation transaction; and wherein the rental vehicle reservation transaction is for a customer entity having a plurality of divisions, each of a plurality of the divisions having an associated specialized rental vehicle reservation profile, and wherein a plurality of the deep-link URLs are associated with a division of the customer such that the plurality of deep-link URLs comprise a plurality of division-specific deep-link URLS.

12. The apparatus of claim 11 wherein the memory is further configured to store a data structure that associates the division-specific deep-link URLs and their associated specialized rental vehicle reservation profiles with the customer entity; and wherein the processor is further configured to (1) access the data structure in the memory, and (2) identify the division-specific deep-link URLs associated with the customer entity for inclusion in the multiple deep-link GUI.

13. The apparatus of claim 12 wherein the data structure further comprises a plurality of text labels, each text label being associated with a division-specific deep-link URL, and wherein the processor is further configured to interact with the memory to (1) identify the text labels associated with the identified deep-link URLs, and (2) communicate the identified text labels to the remote computer to populate the multiple deep-link GUI.

14. The apparatus of claim 11 wherein the processor and memory are further configured to provide the multiple deep-link GUI to the remote computer for display thereon, the multiple deep-link GUI including the communicated deep-link URLs.

15. The apparatus of claim 11 wherein at least one rental vehicle reservation characteristic of at least one specialized rental vehicle reservation profile comprises a pickup location.

16. The apparatus of claim 15 wherein the pickup location comprises a range of eligible pickup locations.

17. The apparatus of claim 11 wherein at least one rental vehicle reservation characteristic of at least one specialized rental vehicle reservation profile comprises a vehicle type.

18. The apparatus of claim 17 wherein the vehicle type comprises a range of eligible vehicle types.

19. The apparatus of claim 12 wherein at least one rental vehicle reservation characteristic of at least one specialized rental vehicle reservation profile comprises a pickup location.

20. The apparatus of claim 12 wherein at least one rental vehicle reservation characteristic of at least one specialized rental vehicle reservation profile comprises a vehicle type.

\* \* \* \* \*